United States Patent [19]
Funada et al.

[11] Patent Number: 5,463,469
[45] Date of Patent: Oct. 31, 1995

[54] IMAGE PROCESSING APPARATUS CAPABLE OF DISCRIMINATING A PREDETERMINED IMAGE

[75] Inventors: Masahiro Funada, Yokohama; Ken-ichi Ohta, Kawasaki; Yoichi Takaragi, Yokohama; Eiji Ohta, Fujisawa, all of Japan

[73] Assignee: Canon Kabushiki Kaisha, Tokyo, Japan

[21] Appl. No.: 402,984

[22] Filed: Mar. 13, 1995

Related U.S. Application Data

[60] Continuation of Ser. No. 980,299, Nov. 23, 1992, abandoned, which is a division of Ser. No. 799,608, Nov. 27, 1991, Pat. No. 5,227,871.

[30] Foreign Application Priority Data

| Nov. 30, 1990 | [JP] | Japan | 2-330883 |
| Nov. 30, 1990 | [JP] | Japan | 2-330884 |
| Nov. 30, 1990 | [JP] | Japan | 2-330886 |
| Nov. 30, 1990 | [JP] | Japan | 2-330888 |
| Nov. 30, 1990 | [JP] | Japan | 2-330889 |
| Nov. 30, 1990 | [JP] | Japan | 2-330890 |

[51] Int. Cl.$^6$ ............ H04N 1/387; H04N 1/56; H04H 5/00
[52] U.S. Cl. .......... 358/296; 358/518; 358/523; 382/135
[58] Field of Search ........ 358/296, 450, 358/453, 461, 462, 515, 518, 523, 524, 538; 382/7, 17, 22, 55, 57

[56] References Cited

U.S. PATENT DOCUMENTS

| 4,642,681 | 2/1987 | Ikeda | 358/79 |
| 4,908,873 | 3/1990 | Philibert et al. | 340/825.34 X |
| 4,953,012 | 8/1990 | Abe | 358/462 X |
| 5,032,904 | 7/1991 | Murai et al. | 382/17 X |
| 5,075,767 | 12/1991 | Takarazi | 358/75 |
| 5,227,871 | 7/1993 | Funada et al. | 358/462 X |

FOREIGN PATENT DOCUMENTS

| 0295876 | 12/1988 | European Pat. Off. | G06K 9/64 |
| 0342060 | 11/1989 | European Pat. Off. | G03G 21/00 |
| 64-61777 | 3/1989 | Japan | H04N 1/23 |
| 1181178 | 7/1989 | Japan | G06K 9/62 |

*Primary Examiner*—Peter S. Wong
*Assistant Examiner*—Eric Frahm
*Attorney, Agent, or Firm*—Fitzpatrick, Cella, Harper & Scinto

[57] ABSTRACT

An image processing apparatus includes an input device for inputting image data representing an image. A first discriminating device discriminates whether the image represented by the input image data is a first predetermined image, and a second discriminating device discriminates whether the image represented by the input image data is a second predetermined image different from the first predetermined image. An output device combines discrimination results of the first and second discriminating devices and outputs a discrimination signal. The first and second discriminating devices perform the discriminating operations in parallel.

5 Claims, 72 Drawing Sheets

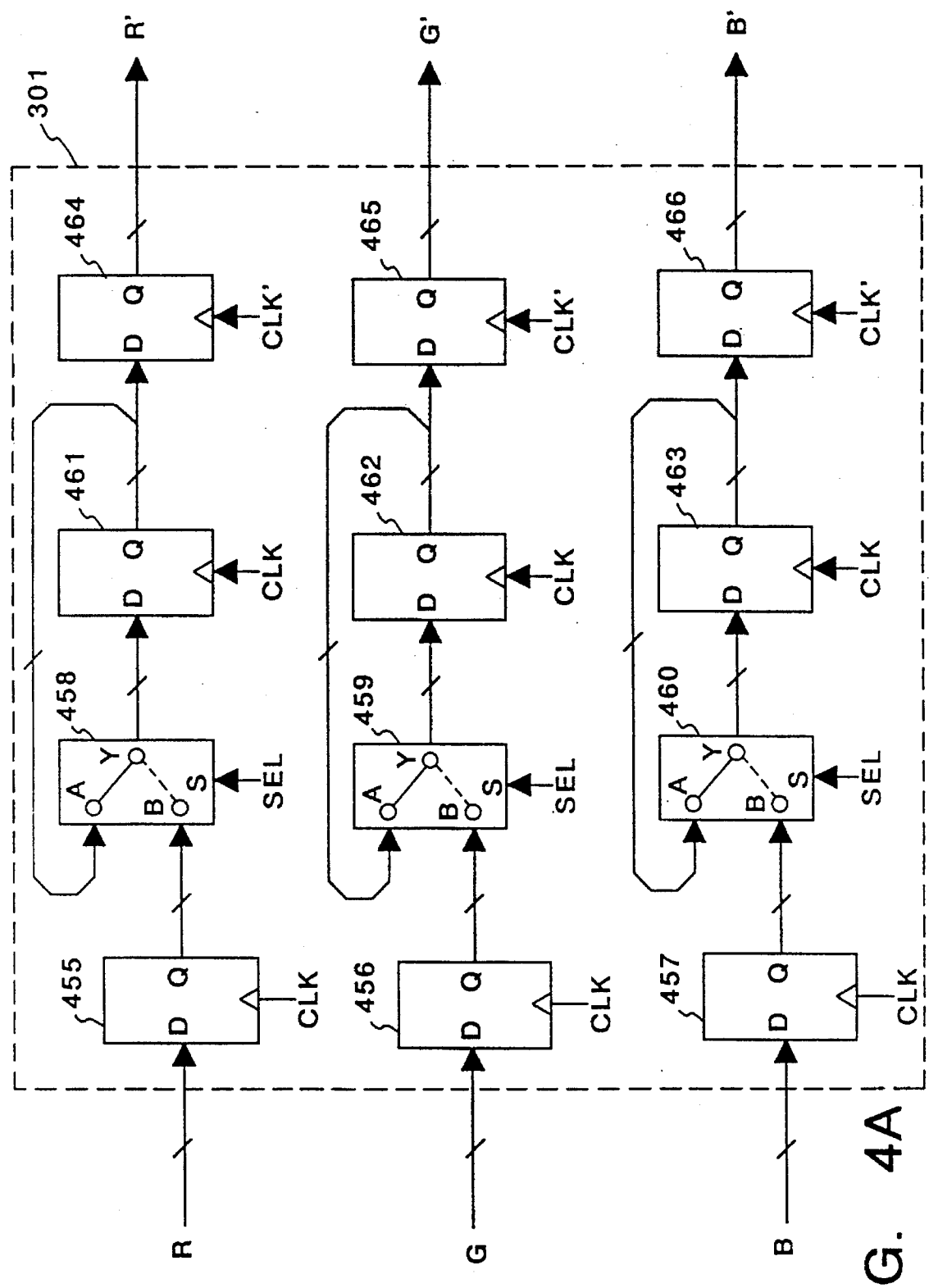
F I G. 4A

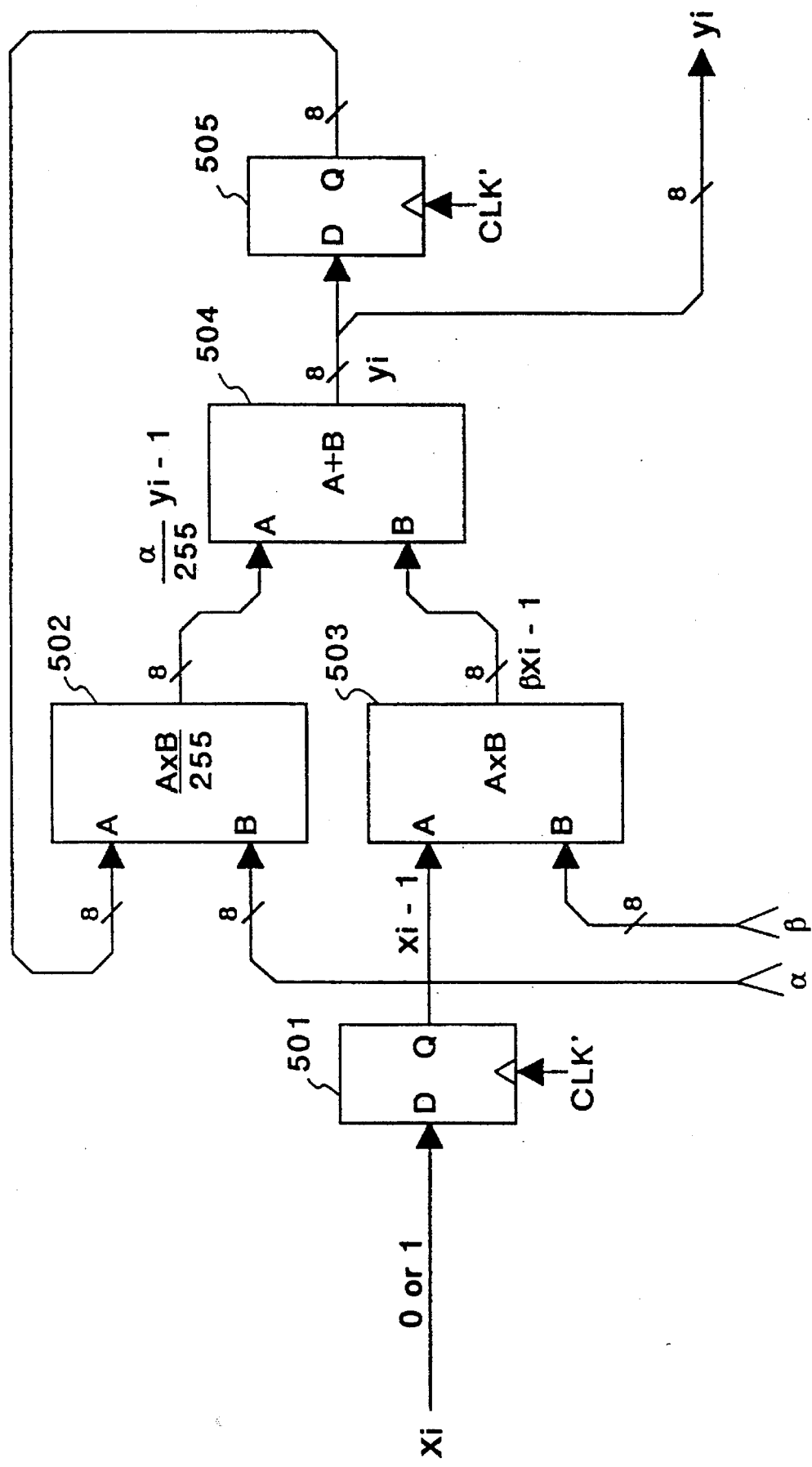
F I G. 5

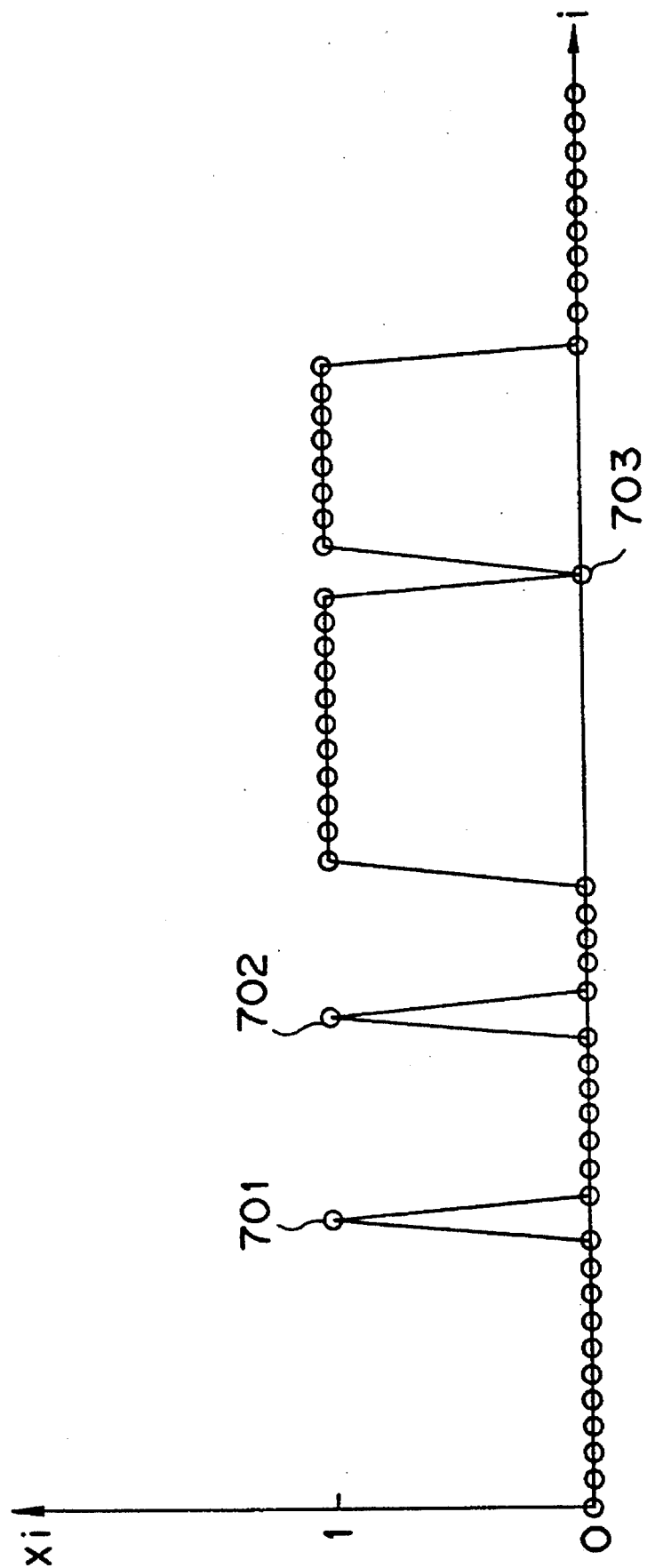

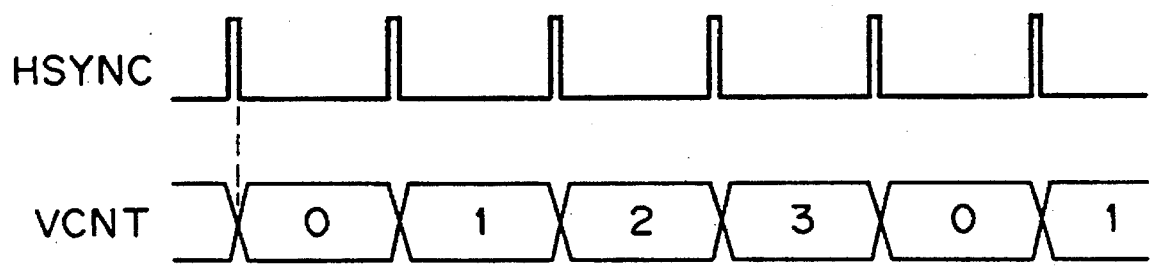
F I G. 15A
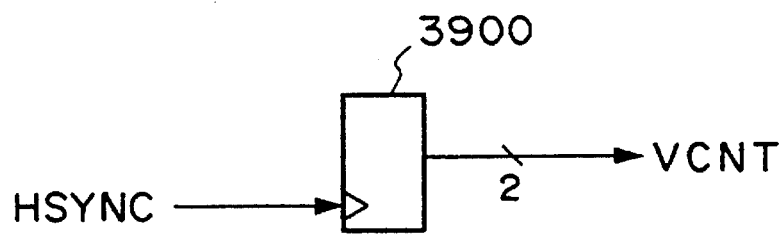
F I G. 15B

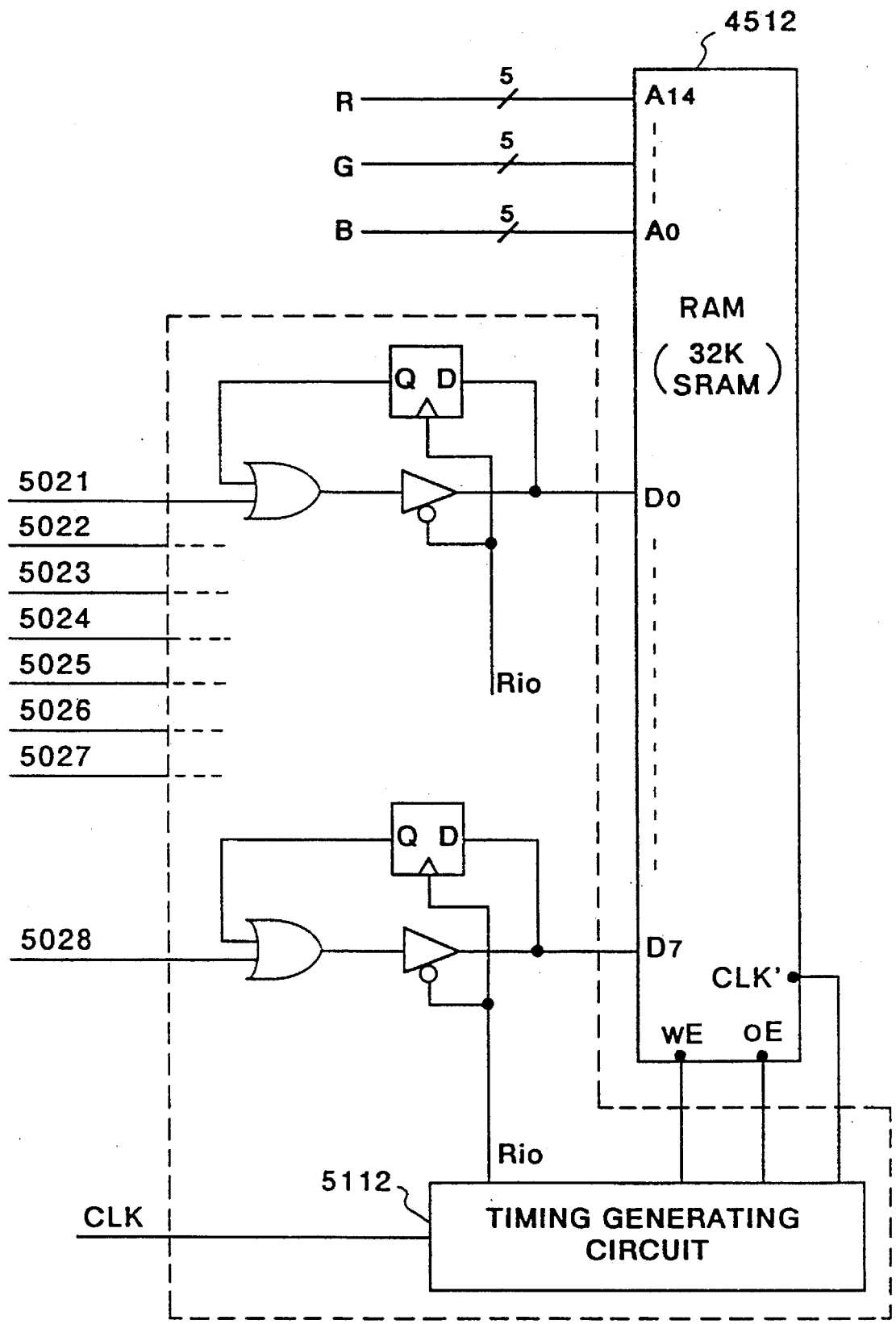
F I G. 21C

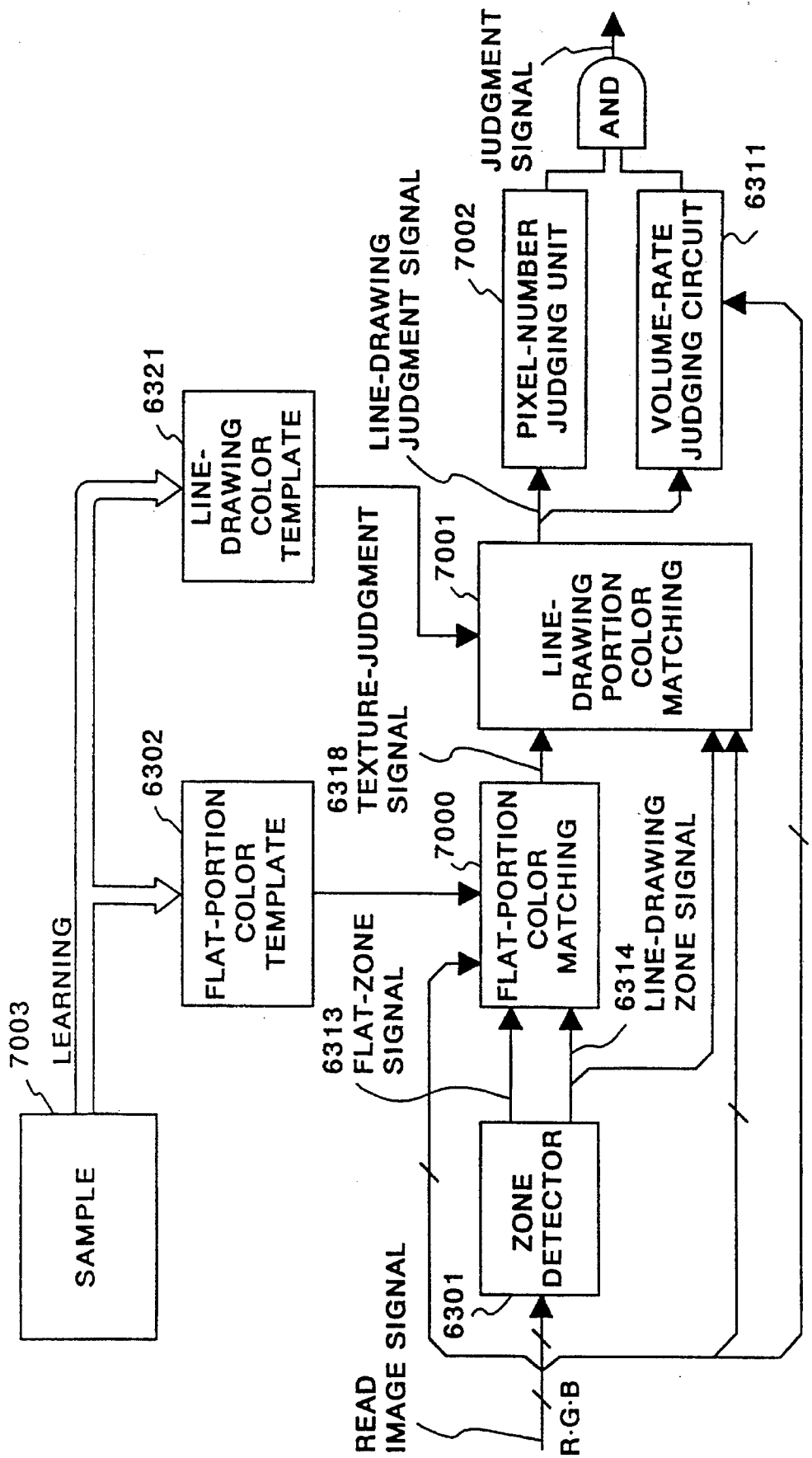
F I G. 30

FIG. 32

| LINE-DRAWING COLOR MATCHING SIGNAL 6316 | LINE-DRAWING ZONE SIGNAL 6314 | TEXTURE JUDGMENT SIGNAL 6318 = 1 | TEXTURE JUDGMENT SIGNAL 6318 = 0 |
|---|---|---|---|
| 1 | 1 | $\gamma = \gamma_1$, $\delta = \delta_1$ | $\gamma = \gamma_1$, $\delta = 0$ |
| 1 | 0 | $\gamma = \gamma_2$, $\delta = \delta_2$ | $\gamma = \gamma_1$, $\delta = 0$ |
| 0 | 1 | $\gamma = \gamma_2$, $\delta = 0$ | $\gamma = \gamma_1$, $\delta_2 = 0$ |
| 0 | 0 | $\gamma = 1$, $\delta = 0$ | $\gamma = \gamma_1$, $\delta = 0$ |

$$Z_{i+1} = \gamma \times Z_i + \delta$$

$s_i$ : LINE-DRAWING COLOR MATCHING SIGNAL 6316

$\delta_1 = 255 \times (1 - \gamma_1)$ $\delta_2 = 255 \times (1 - \gamma_2)$ $( 1 > \gamma_1 > \gamma_2 > 0 )$

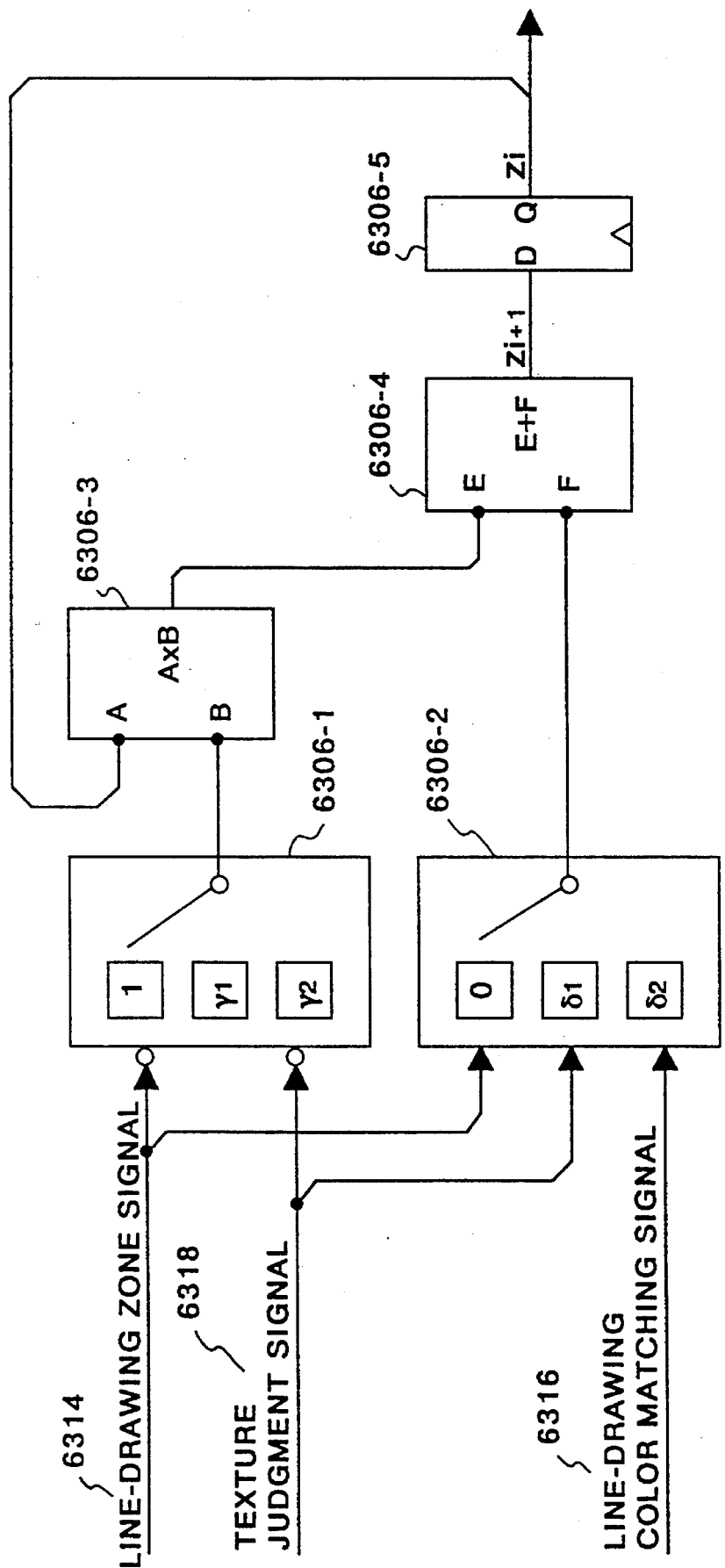
F I G. 34

$$\text{OUT} = \max(①,②,③,④) - \min(①,②,③,④)$$

① = (d) + (e)
② = (a) + (h)
③ = (b) + (g)
④ = (c) + (f)

| | | LINE-DRAWING COLOR MATCHING SIGNAL 8316 | FLAT-ZONE SIGNAL 8313 | |
|---|---|---|---|---|
| | | | 0 | 1 |
| LINE-DRAWING ZONE SIGNAL 8314 | 1 | si 1 | $\gamma = \gamma_1$<br>$\delta = \delta_1$ | $\gamma = 1$<br>$\delta = 0$ |
| | 0 | | $\gamma = \gamma_2$<br>$\delta = \delta_2$ | $\gamma = 1$<br>$\delta = 0$ |
| LINE-DRAWING ZONE SIGNAL 8314 | 1 | si 0 | $\gamma = \gamma_1$<br>$\delta = 0$ | $\gamma = 1$<br>$\delta = 0$ |
| | 0 | | $\gamma = \gamma_2$<br>$\delta = 0$ | $\gamma = 1$<br>$\delta = 0$ |

$$V_{i+1} = \gamma \times V_i + \delta$$

si : LINE-DRAWING COLOR MATCHING SIGNAL 8316

$$\delta_1 = 255 \times (1 - \gamma_1)$$
$$\delta_2 = 255 \times (1 - \gamma_2)$$

$$(1 > \gamma_1 > \gamma_2 > 0)$$

F I G. 46

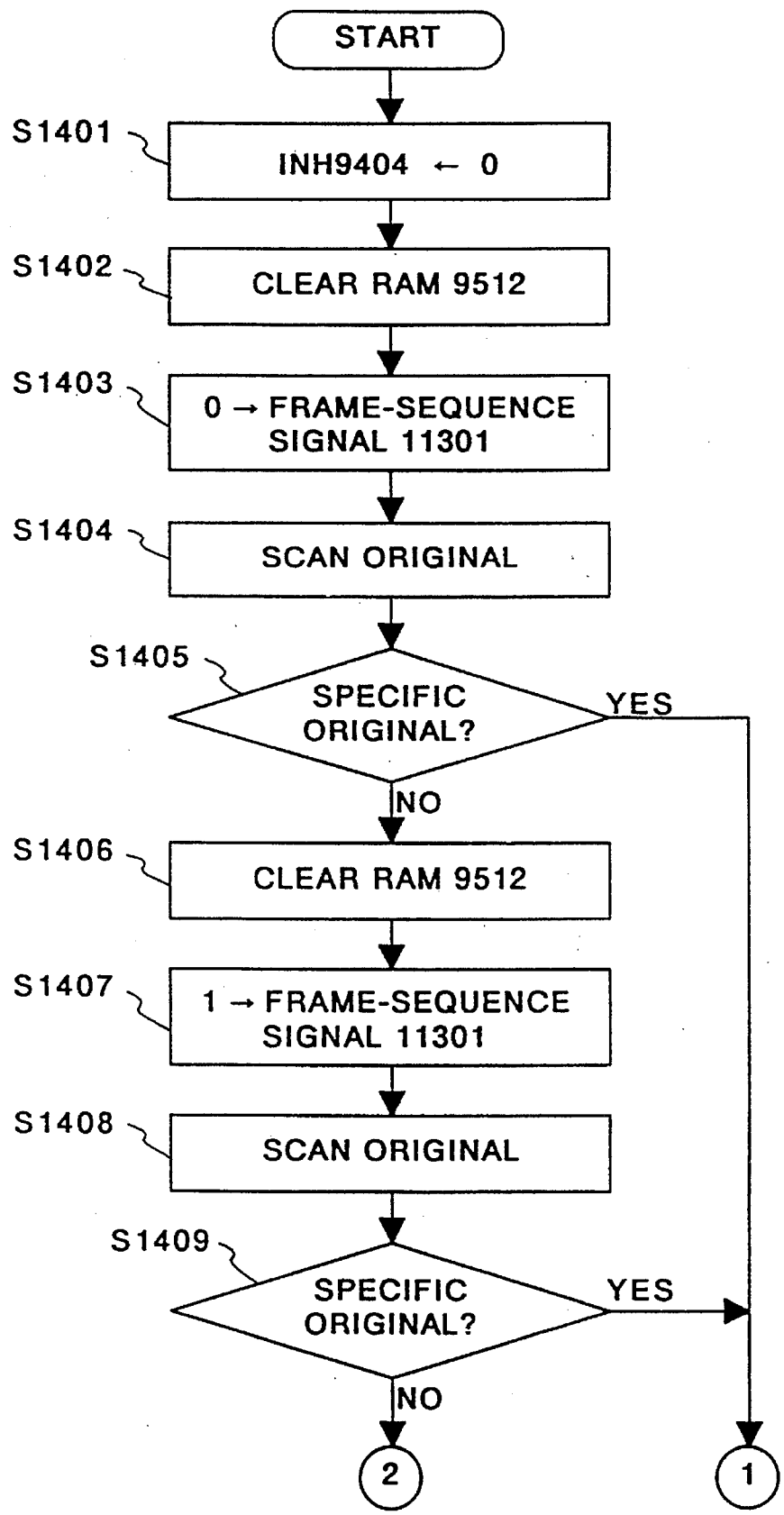
F I G. 50A

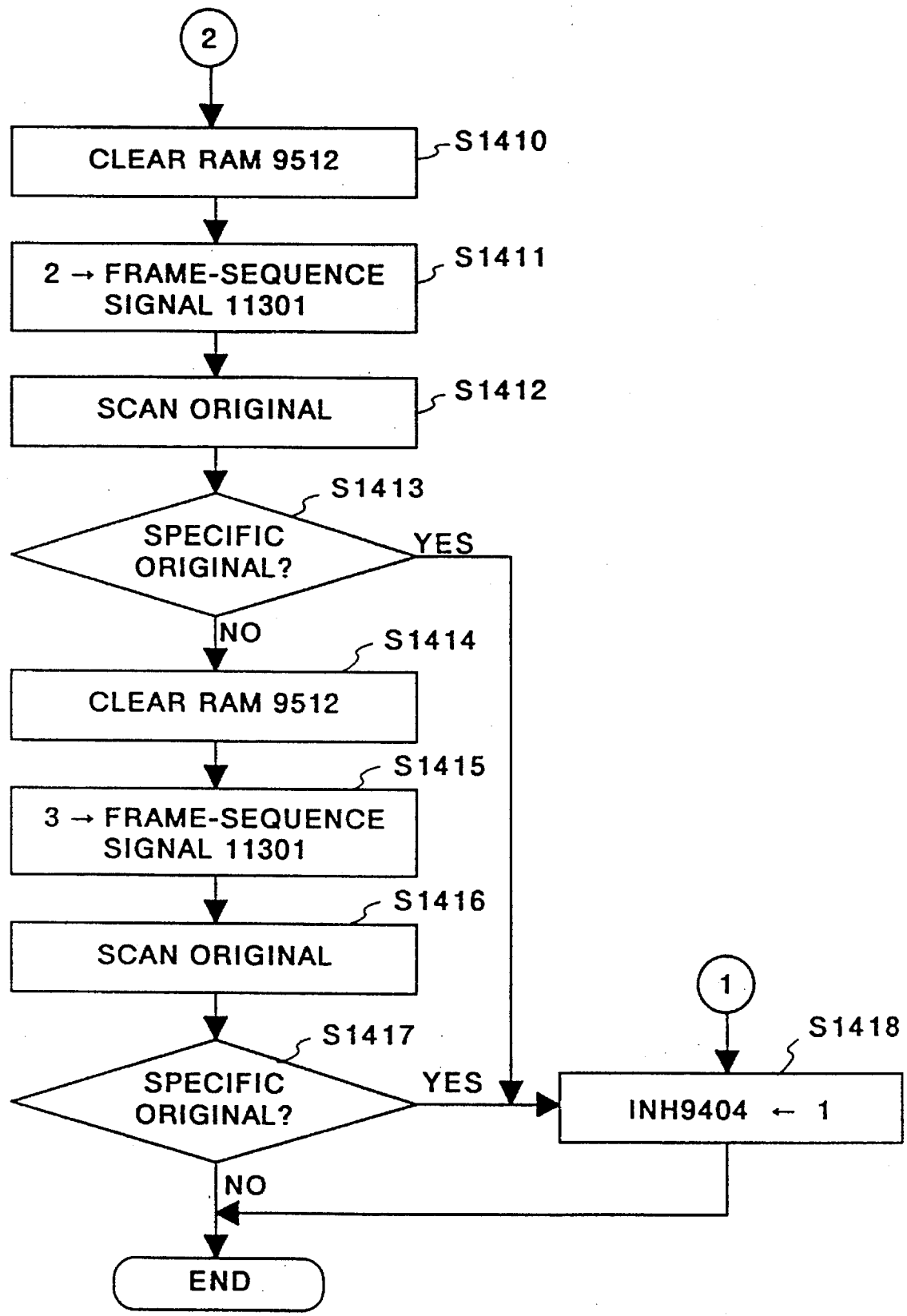
F I G. 50B

| FRAME-SEQUENCE SIGNAL 11301 | COLOR COMPONENT |
|---|---|
| 0 | M (MAGENTA) |
| 1 | C (CYAN) |
| 2 | Y (YELLOW) |
| 3 | K (BLACK) |

FIG. 51

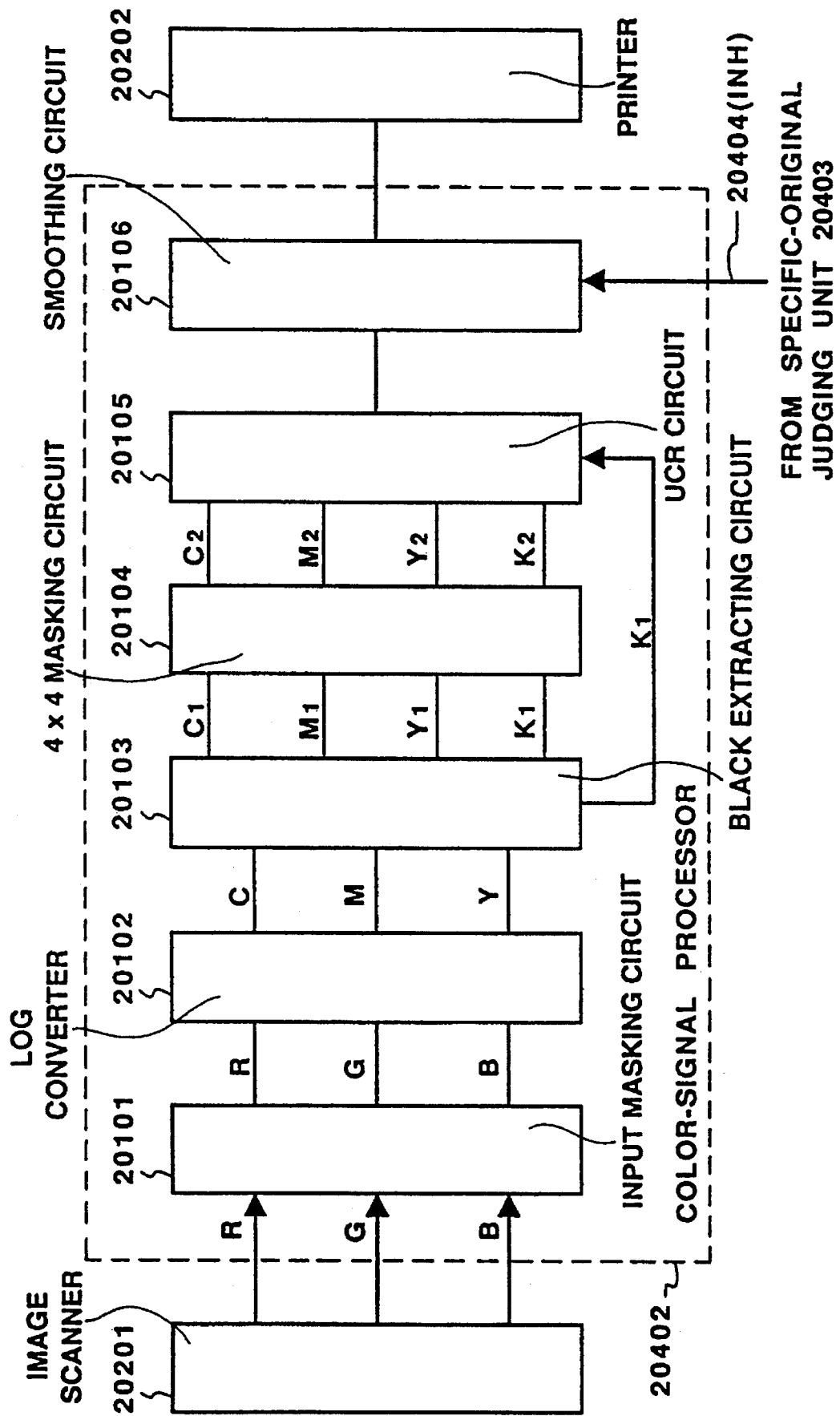
F I G. 55

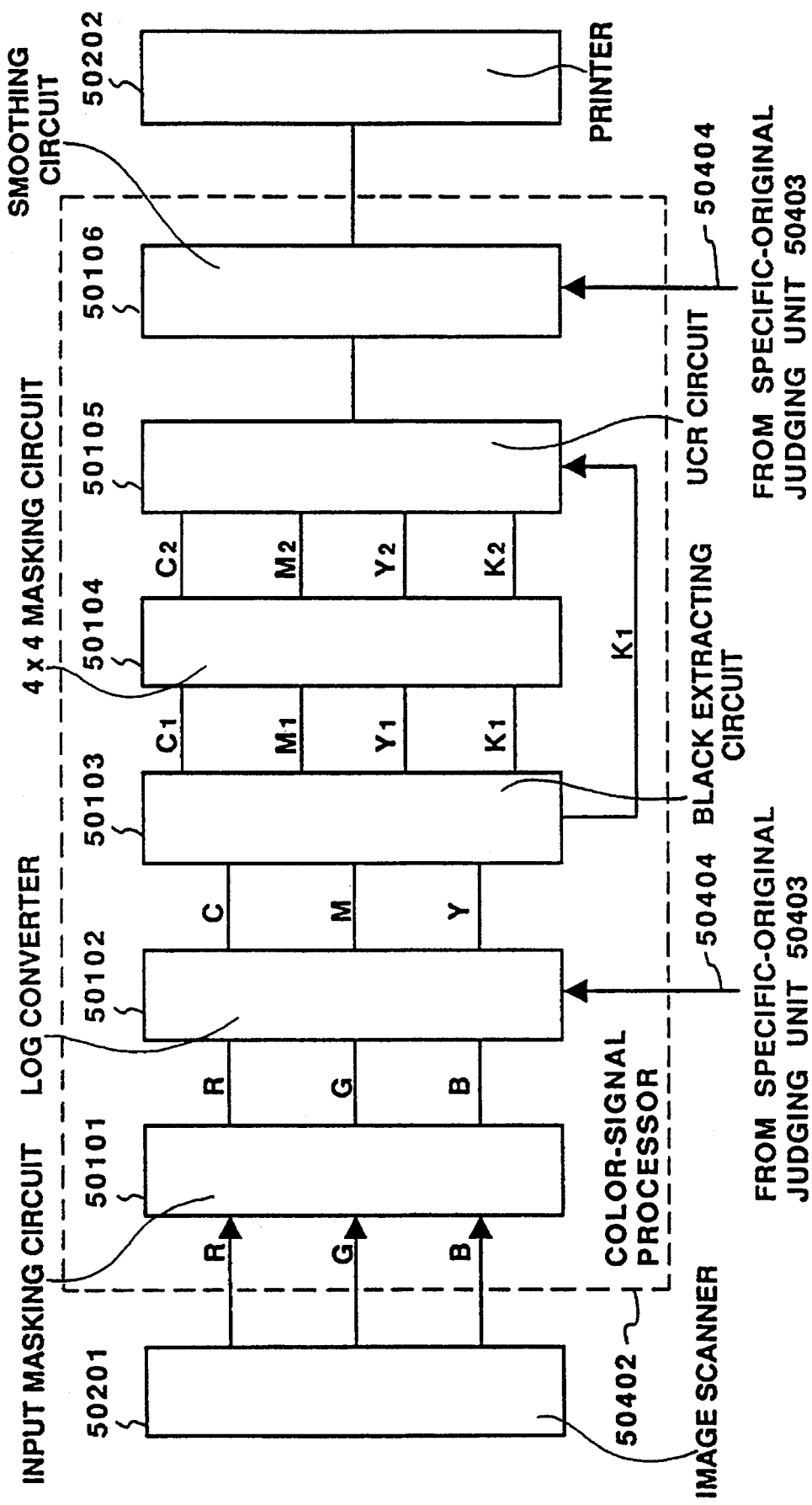
F I G. 58

IMAGE PROCESSING APPARATUS CAPABLE OF DISCRIMINATING A PREDETERMINED IMAGE

This application is a continuation of application Ser. No. 07/980,299 filed Nov. 23, 1992, now abandoned, which is a divisional of application Ser. No. 07/799,608 filed Nov. 27, 1991 which issued as U.S. Pat. No. 5,227,871 on Jul. 13, 1993.

BACKGROUND OF THE INVENTION

1. Field of the Invention

This invention relates to an image processing apparatus and, more particularly, to an image processing apparatus for detecting a specific original.

2. Description of the Related Art

Recent improvements in the picture quality of copying machines which now have a color capability have been accompanied by the fear of counterfeiting of specific originals such as bank notes and securities. In order to recognize a specific original in a copying machine or the like, a method such as pattern matching with the shape of an input image has been proposed. For example, in pattern matching, the inclination of an inputted original image is corrected and then the image is matched with an image pattern already registered.

In the example of the prior art described above, however, there is a limit on processing speed and it is difficult to deal with apparatus of higher speeds. In addition, when it is attempted to execute processing simultaneously with regard to a large variety of specific originals, this is difficult to accomplish for the same reason.

Further, in the example of the prior art described above, however, not only is there a limit upon processing speed, but the processing circuitry is complicated as well. As a consequence, it is difficult to deal with processing in a case where there is an increase in the kinds of specific originals to be judged.

One technique for preventing the counterfeiting of bank notes or the like is to register beforehand the data of a specific original in color space and provide means for comparing and collating this data with an input original image, whereby the specific original can be distinguished. Such a technique has been proposed by the present applicant in this application.

With this example of the technique, however, only comparison and collation in the color space are carried out. Consequently, there is the possibility that an image having substantially the same color but a different shape will be judged mistakenly to be the specific original.

Further, the prior-art example described above is such that pattern matching with a specific original is performed after the position and inclination of an original placed upon the platen have been investigated. As a result, high-speed processing is difficult and judgments cannot be made in real-time when the original is scanned.

In the example of the prior art described above, the degree of similarity between an input original and a previously registered specific original is investigated, and the input original is judged to be a specific original when the degree of similarity exceeds a threshold value. This means that an erroneous judgment is highly possible if an original similar to the specific original is inputted.

SUMMARY OF THE INVENTION

An object of the present invention is to provide an image processing apparatus capable of eliminating the aforementioned drawbacks of the prior art described above.

Another object of the present invention is to provide an image processing apparatus capable of applying discrimination processing to a specific original at the same time as an image read-in, operation or processing operation.

Another object of the present invention is to provide an image processing apparatus capable of discriminating a plurality of specific originals at a high speed and accuracy by a simple arrangement.

Another object of the present invention is to provide an image processing apparatus capable of raising the precision with which a specific original such as a bank note is discriminated.

Another object of the present invention is to provide an image processing apparatus capable of discriminating a specific original at high speed and inhibiting the duplication thereof.

Yet another object of the present invention is to provide an image processing apparatus capable of performing image reproduction processing in conformity with the possibility that an input original is a specific original.

Yet another object of the present invention is to provide an image processing apparatus capable of raising the probability that an especially important original will be discriminated when it is judged whether an original image contains a specific original.

Yet another object of the present invention is to provide an image processing apparatus comprising processing means for electrically processing an input image signal, and means for judging the degree of similarity between an image represented by the input image signal and an already registered specific original in parallel with the processing of the input image signal performed by the processing means, wherein the contents of processing performed by the processing means can be made different in conformity with the degree of similarity.

Yet another object of the present invention is to provide an image processing apparatus comprising processing means for electrically processing an input image signal, and means for judging the degree of similarity between an image represented by the input image signal and an already registered specific original, the contents of processing performed by the processing means being made different in conformity with the degree of similarity, wherein criteria for judging the degree of similarity in the judging means is capable of being changed over in time-shared fashion.

Yet another object of the present invention is to provide an image processing apparatus comprising input means for inputting image data, discriminating means for for discriminating the type of image based upon the image data inputted by the input means, and judging means for judging a specific original based upon the type of image discriminated by the discriminating means and color distribution information of the image data.

Yet another object of the present invention is to provide an image processing apparatus comprising input means for inputting image data, judging means for judging identity with a plurality of specific originals based upon the image data inputted by the input means, and processing means for processing the image data, which has been inputted by the input means, based upon identity judged by the judging means.

Yet another object of the present invention is to provide an image processing apparatus comprising input means for inputting image data representing an original, judging means for judging, based upon the image data inputted by the input means, the possibility that the original is a predetermined specific original, and processing means for executing reproduction processing of the image data, which has been inputted by the input means, upon changing the reproduction processing into a number of steps based upon the possibility judged by the judging means.

Yet another object of the present invention is to provide an image processing apparatus comprising input means for inputting image data representing an original, and judging means for judging identity between the original and first and second specific originals based upon the image data, wherein the judging means judges identity between the original and the first specific original and identity between the original and the second specific original using relative degrees of importance that are different.

Other features and advantages of the present invention will be apparent from the following description taken in conjunction with the accompanying drawings, in which like reference characters designate the same or similar parts throughout the figures.

BRIEF DESCRIPTION OF THE DRAWINGS

FIG. 4A is a block diagram showing a thinning-out circuit according to the first embodiment;

FIG. 5 is a block diagram showing an integrator 306 according to the first embodiment;

FIGS. 7A and 7B are diagrams for describing an example of the input/output of the integrator according to the first embodiment;

FIG. 15A is a timing chart of data according to the fifth embodiment;

FIG. 15B is a block diagram for describing a two-bit counter according to the fifth embodiment;

FIG. 21C is a block diagram showing the construction of an OR writing circuit according to the seventh embodiment;

FIG. 30 is a diagram for conceptually describing the construction of a copying machine;

FIG. 32 is a diagram illustrating the integration coefficients of the integrator according to the seventh embodiment;

FIGS. 33 and 34 are diagrams illustrating the circuit construction of the integrator according to the seventh embodiment;

FIG. 46 is a diagram for describing the integration coefficients of a line-drawing portion color integrator according to the eighth embodiment;

FIG. 50 is a flowchart for describing the flow of processing according to the 11th embodiment;

FIG. 51 is a diagram showing the relationship between frame-sequence signals and image-formation color according to the 11th embodiment;

FIG. 55 is a block diagram illustrating the construction of a signal processor according to a 15th embodiment;

FIG. 58 is a block diagram showing the construction of a signal processor according to the 17th embodiment;

DESCRIPTION OF THE PREFERRED EMBODIMENTS

Preferred embodiments of the present invention will now be described in detail with reference to the accompanying drawings.

It should be noted that the term "specific original" as used hereinafter refers to originals the duplication of which is prohibited, such as securities, gift certificates and bank notes, and includes also originals which are contrary to public order and good customs and originals for specific applications.

Though a copying machine is illustrated as an example of application of the present invention in each of the following embodiments, it goes without saying that this does not impose a limitation upon the invention, which can be applied also to various other apparatus, such as printers.

First Embodiment

Figure 2:
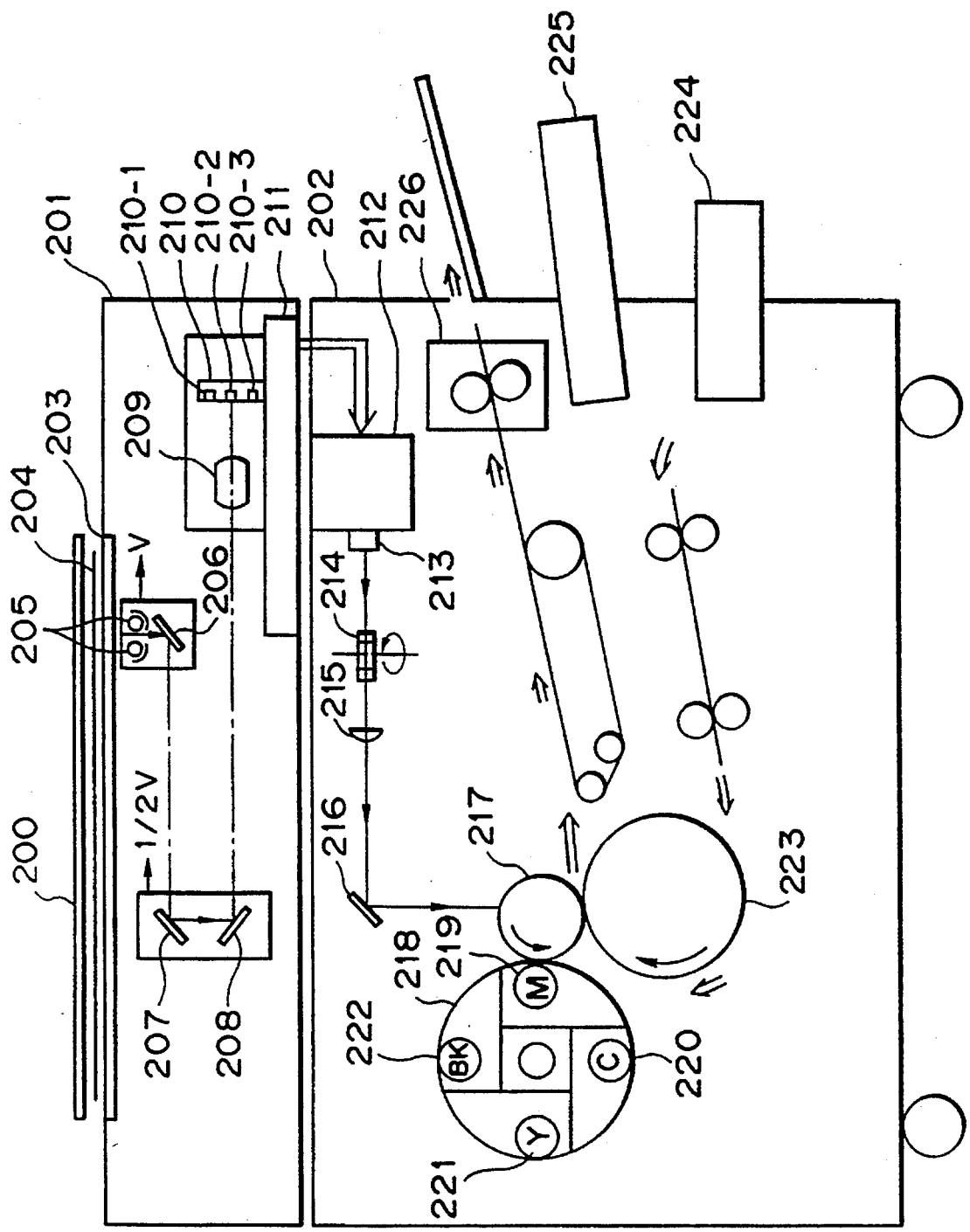
FIG. 2 is an external view showing a first embodiment of an image processing apparatus according to the present invention.

FIG. 2 is an external view showing a first embodiment of an image processing apparatus according to the present invention.

In FIG. 2, numeral 201 denotes an image scanning section for scanning an original and performing digital signal processing. Numeral 202 designates a printing section for printing out an image, which corresponds to the original image read by the scanning section 201, on paper in full color.

The image scanning section 201 includes a pressure plate 200 having a mirror surface. An original 204 on a glass platen 203 is irradiated by means of lamps 205, an image is formed on a three-line sensor (hereinafter referred to as a "CCD") 210 via mirrors 206, 207, 208 and a lens 209, and the image is sent to a signal processor 211 as full-color information red (R), green (G) and blue (B) components. The entire original is scanned by mechanically moving the lamps 205 and mirror 206 at a velocity v as well as the mirrors 207, 208 at a velocity ½ v in a direction perpendicular to the electrical scanning direction of the line sensor. The signal processor 211 electrically processes the read signal, separates the signal into magenta (M), cyan (C), yellow (Y) and black (Bk) components and sends these components to the printing section 202. At least one component among the M, C, Y, Bk components is sent to the printing section 202 per scan of the original in the image scanning section 201, and a signal print-out is completed by a total of four scans of the original.

The M, C, Y or Bk image signal received from the image scanning section 201 is sent to a laser driver 212. The laser driver 212 modulates and drives a semiconductor laser 213 in dependence upon the particular image signal. The laser light is made to scan across a photosensitive drum 217 via a polygonal mirror 214, an f-θ lens 215 and a mirror 216.

Numeral 218 denotes a revolving developer comprising a magenta developing section 219, a cyan developing section 220, a yellow developing section 221 and a black developing section 222. These four developers come into alternate contact with the photosensitive drum 217 so that an electrostatic latent image formed on the photosensitive drum 217 is developed by means of toners. Numeral 223 denotes a transfer drum upon which paper fed from a paper cassette 224 or 225 is wound so that the image developed on the photosensitive drum 217 may be transferred to .the paper.

After the four colors M, C, Y, Bk have thus been transferred successively, the paper is ejected through a fixing unit 226.

Image Scanner

Figure 1:
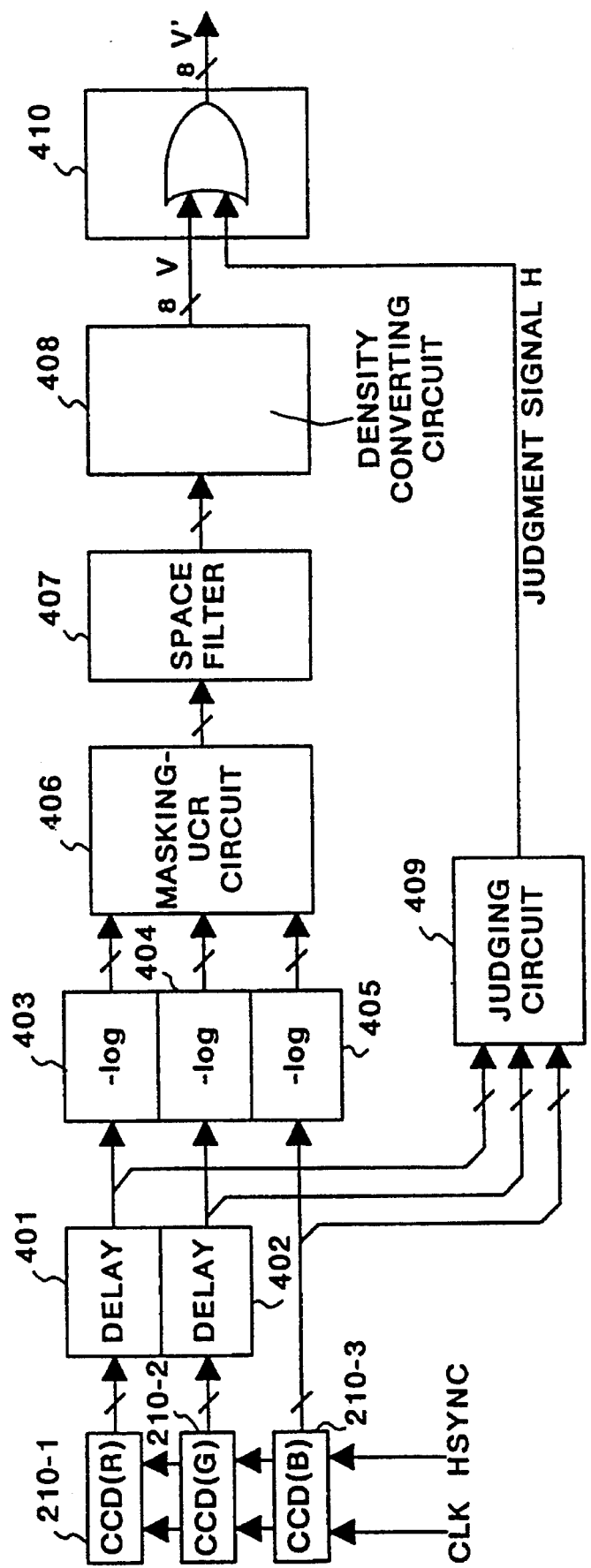
FIG. 1 is a block diagram showing the construction of an image scanner 201 according to a first embodiment of the present invention.

FIG. 1 is a block diagram showing the construction of an image scanner 201 according to a first embodiment of the present invention.

Numerals 210-1, 210-2, 210-3 denote CCDs having spectral sensitivity characteristics for red (R), green (G) and blue (B). Each CCD outputs a signal quantized to 0– 255 in eight bits. The sensors 210-1, 210-2, 210-3 used in the present embodiment are arranged so as to be spaced apart by fixed distances, and therefore a displacement in terms of time is corrected in delay elements 401 and 402.

Numerals 403, 404, 405 are log converters constituted by a look-up table ROM or RAM for converting a luminance signal into a density signal. Numeral 406 denotes a well-known masking-UCR circuit. Though a detailed description is omitted, the circuit 406, in accordance with three primary-color signals inputted thereto, sequentially outputs Y, M, C, Bk signals of a prescribed bit length, e.g., eight bits, whenever there is a reading operation.

Numeral 407 denotes a space filter which corrects the space frequency of the output signal from the circuit 406. Numeral 408 denotes a density converting circuit for correcting the density characteristic possessed by the printer 202. Like the log converters 403–405, this circuit is constituted by a look-up table ROM or RAM.

Shown at numeral 409 is a specific-original judging circuit for judging whether at least one of a plurality of specific originals is being read in, and for outputting a judgment signal H in the form of "0" or "1".

Numeral 410 represents an OR gate for taking the OR between the judgment signal H, which is the output of the judging circuit 409, and each bit of the eight-bit output V of the density converting circuit 408, and outputting V'. When the judgment signal H is logical "1", namely when it is judged that a specific original is being read, the output V' is equal to $FF_H$ irrespective of the value of the input signal V. When the judgment signal H is logical "0", namely when it is judged that a specific original is not being read, the value of the input signal V is outputted without change as the output V'.

Timing Chart

Figure 4B:
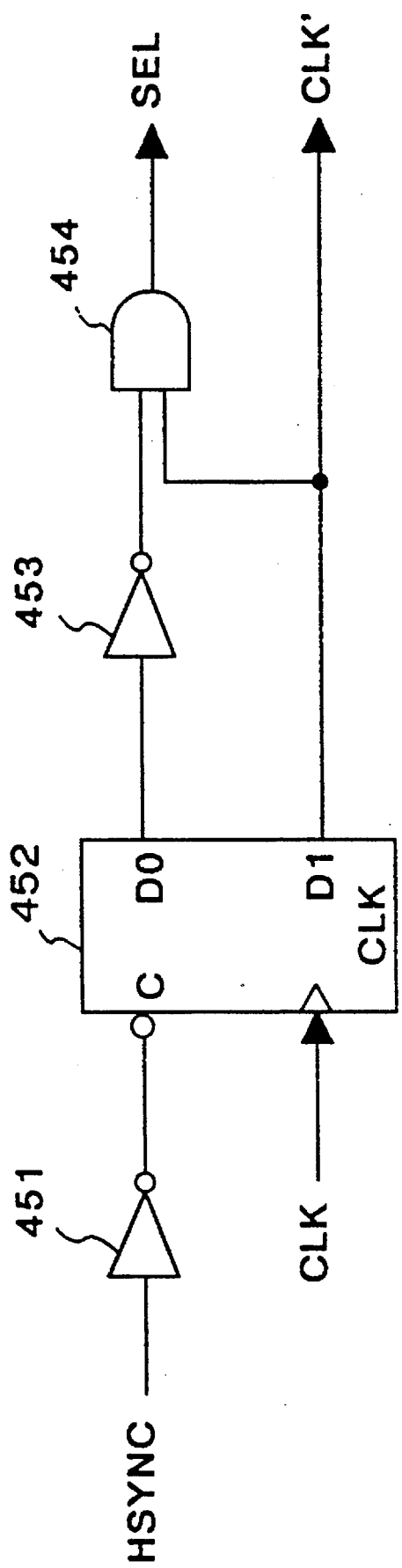
FIG. 4B is a block diagram showing a frequency diving circuit according to the first embodiment.
Figure 6:
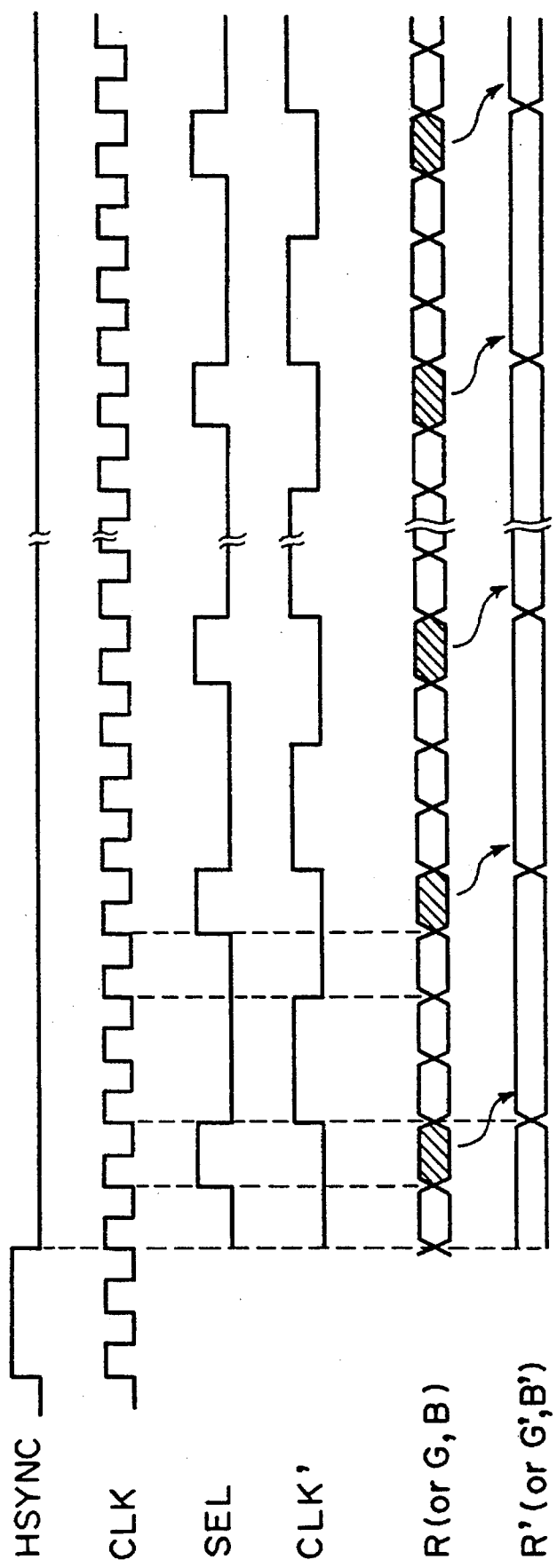
FIG. 6 is a timing chart for the main scanning direction according to the first embodiment.

FIG. 4A is a block diagram showing a thinning-out circuit according to the first embodiment, FIG. 4B is a block diagram showing a frequency diving circuit according to the first embodiment, and FIG. 6 is a timing chart for the main scanning direction according to the first embodiment.

In FIGS. 4A and 4B, HSYNC represents a main-scanning synchronizing signal for achieving synchronization with the start of main scanning. CLK is an image transfer clock which, in this embodiment, is a basic clock of a variety of image processing operations.

CLK' represents a clock obtained by frequency division of the CLK signal by four. This serves as the basic clock in the judging circuit 409. A SEL signal is a timing signal using in a thinning-out circuit 301, described above. This is generated by a circuit of the kind shown in FIG. 4B, which is constituted by an inverter 451, a two-bit counter 452, an inverter 453 and an AND gate 454. After being cleared (initialized) by the HSYNC signal, which is the main-scanning synchronizing signal, the two-bit counter 452 counts the CLK signal and outputs the counted value in the form of two bits. The higher order bit D1 of the counter 452 is outputted as the CLK' signal, and the result of taking the AND between this signal and a signal obtained by inverting the lower order bit D0 of the counter is outputted as the SEL signal.

As a result, data is held by the CLK signal in the thinning-out circuit 301 shown in FIG. 4A.

The thinning-out circuit 301 comprises flip-flops 455, 456, 457 and 461, 462, 463, selectors 458, 459 and 460, and flip-flops 464, 465, 466 which hold data by the CLK' signal.

By virtue of the construction described above, the R (or G, or B) signal transferred by the CLK signal is thinned out at a ratio of ¼, and an R' (or G', or B') signal synchronized to CLK' can be obtained.

Judging Circuit

Figure 3:
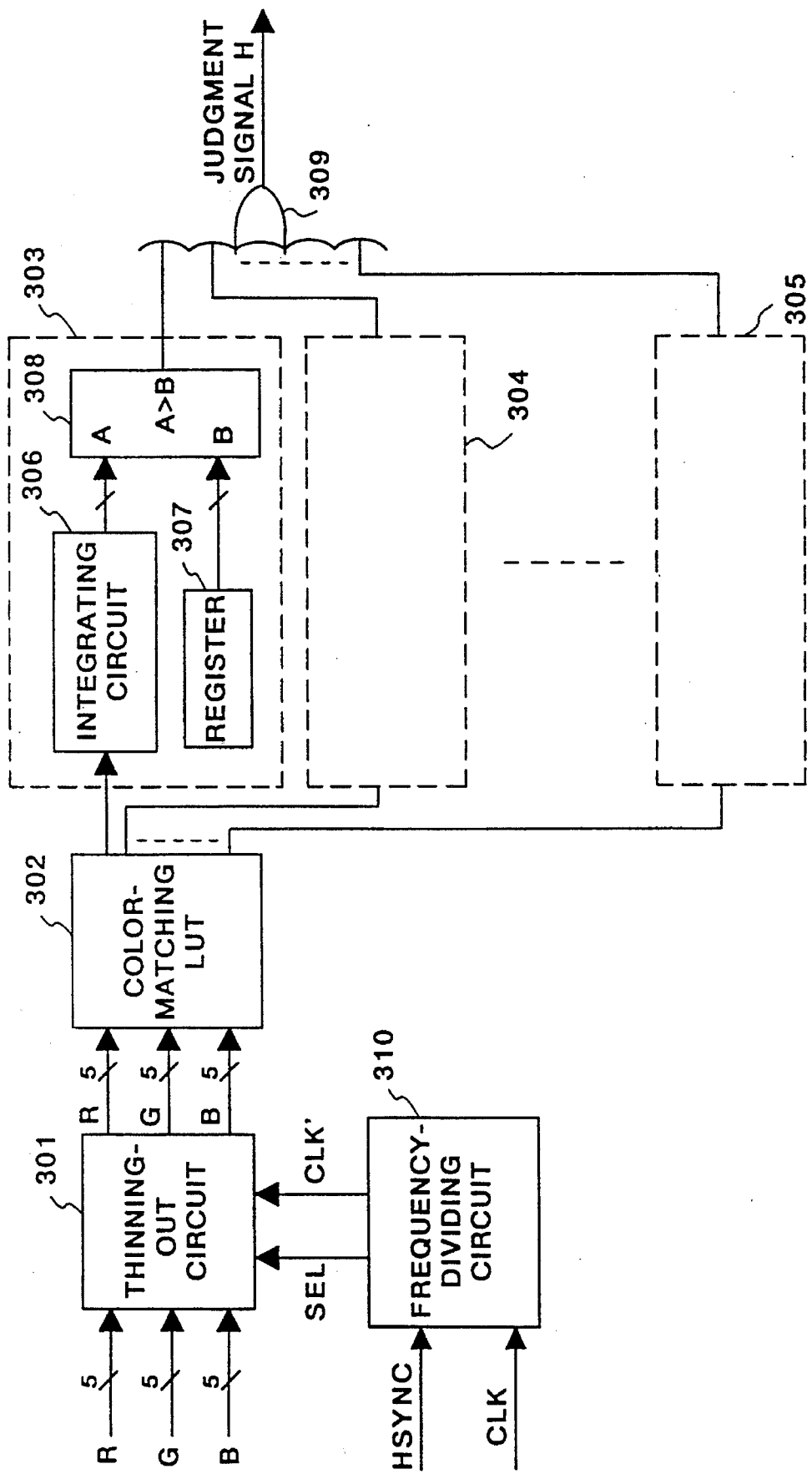
FIG. 3 is a block diagram showing the construction of a judging circuit 409 according to the first embodiment.

FIG. 3 is a block diagram showing the construction of the judging circuit 409 according to the first embodiment.

Numeral 301 represents the thinning-out circuit of the kind shown in FIG. 4A. This circuit thins out the data in order to lighten the processing load of the judging circuit. Numeral 302 denotes a color-matching look-up table (hereinafter referred to as a "color-matching LUT") for subjecting the thinned-out data to an operation for matching color, which is an image characteristic, using plural types of images of interest (images corresponding to specific originals, such as securities and bank notes) that have been prepared in advance. The color-matching LUT 302 is a read-only memory.

Numerals 303, 304, 305 denote color judging circuits, each of which is composed of an integrator 306 shown in FIG. 5, a register 307 and a comparator 308. These circuits independently judge whether a specific image is contained in an original in a plurality of specific originals.

Numeral 309 designates an OR circuit which, when it is judged that one or more outputs of the color judging circuits 303–305 contains an image of interest, delivers an output "1" as the judgment signal H. When it is judged that none of outputs of the color judging circuits 303–305 contains an image of interest, the OR circuit 309 delivers an output "0" as the judgment signal H.

Integrator

FIG. 5 is a block diagram showing the construction of the integrator 306 according to the first embodiment.

In FIG. 5, numerals 501, 505 denote flip-flops which hold data at the timing of the leading edge of the clock signal CLK'.

Numeral 502 denotes a multiplier to which two eight-bit signals (A, B) are inputted. The multiplier 502 multiplies these signals together and outputs an eight-bit signal $$\left(\frac{A \times B}{255}\right)$$

as the result. Numeral 503 denotes a multiplier to which a one-bit input signal (A) and an eight-bit input signal (B) are applied. The multiplier 503 multiplies these signals together and outputs an eight-bit signal (A×B) as the result. Numeral 504 denotes an adder to which two eight-bit signals (A, B) are inputted. The multiplier 504 adds these signals together and outputs an eight-bit signal (A+B) as the result.

Accordingly, in the integrator of this embodiment, an eight-bit output signal $y_i$ is expressed by the following equation when a two-valued input signal $x_1$ is applied:

$$y_i = (\alpha/255) y_{i-1} + \beta \cdot x_{i-1} \quad (1)$$

where $\alpha$ and $\beta$ represent constants that have been preset by the CPU. The various characteristics of the integrator are decided by the sizes of these values.

Figure 7B:
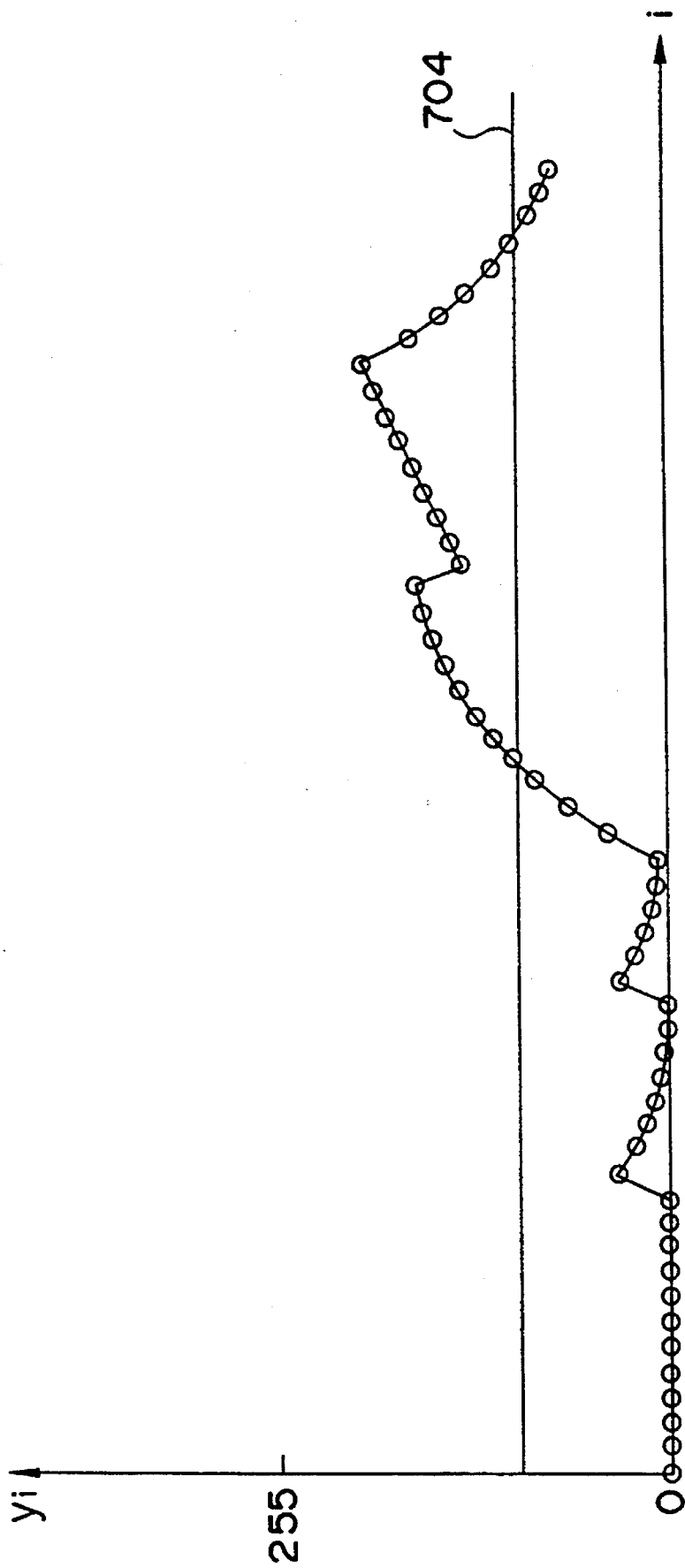

For example, in a case where $\alpha=247$, $\beta=8$ holds, examples of inputs-and outputs of the present integrator are as shown in FIGS. 7A, 7B. That is, an output $y_i$ of the kind shown in FIG. 7B is produced in response to an input $x_{i-1}$ of the kind shown in FIG. 7A.

Regardless of the fact that the periphery is almost "0", as in the manner of input $X_{i-1}$ indicated at 701, 702, an input of kind "1" is considered to be noise. Similarly, regardless of the fact that the periphery is almost "1", as in the manner of input $X_{i-1}$ indicated at 703, a input kind of "0" is considered to be noise. This is processed by the integrator so that an appropriate threshold value of the kind indicated at 704 is set in the register 307 of FIG. 3, and the output $y_i$ of the integrator is binarized based upon this threshold value, thereby making it possible to eliminate the noise.

Results of processing

Figure 8:
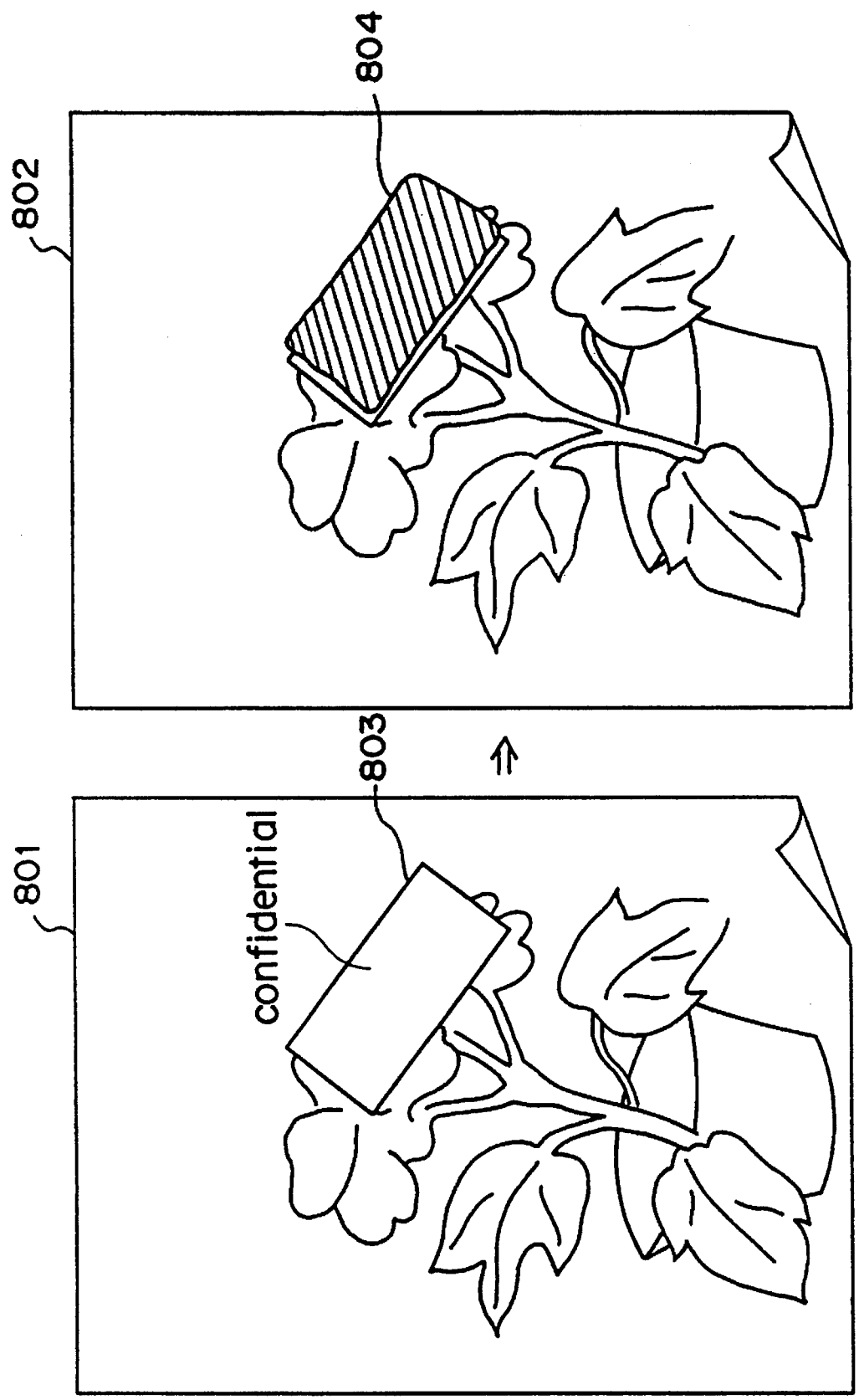
FIG. 8 is a diagram showing an example of processed results according to the first embodiment.

FIG. 8 is a diagram showing an example of the results of processing according to the first embodiment. In FIG. 8, numeral 801 denotes an original and numeral 803 designates a specific original which, in this apparatus, is to be judged as part of an image. Numeral 802 represents outputted results in a case where the original has been copied in this apparatus. The portion corresponding to the specific original 803 is painted out, as in a suppressed portion shown at 804. Thus, the portion of the specific original 803 cannot be copied.

In accordance with the first embodiment, as described above, judgment processing can be applied to a specific original at the same time that an image is read in or at the same time as an image processing operation.

Second Embodiment

Figure 9:
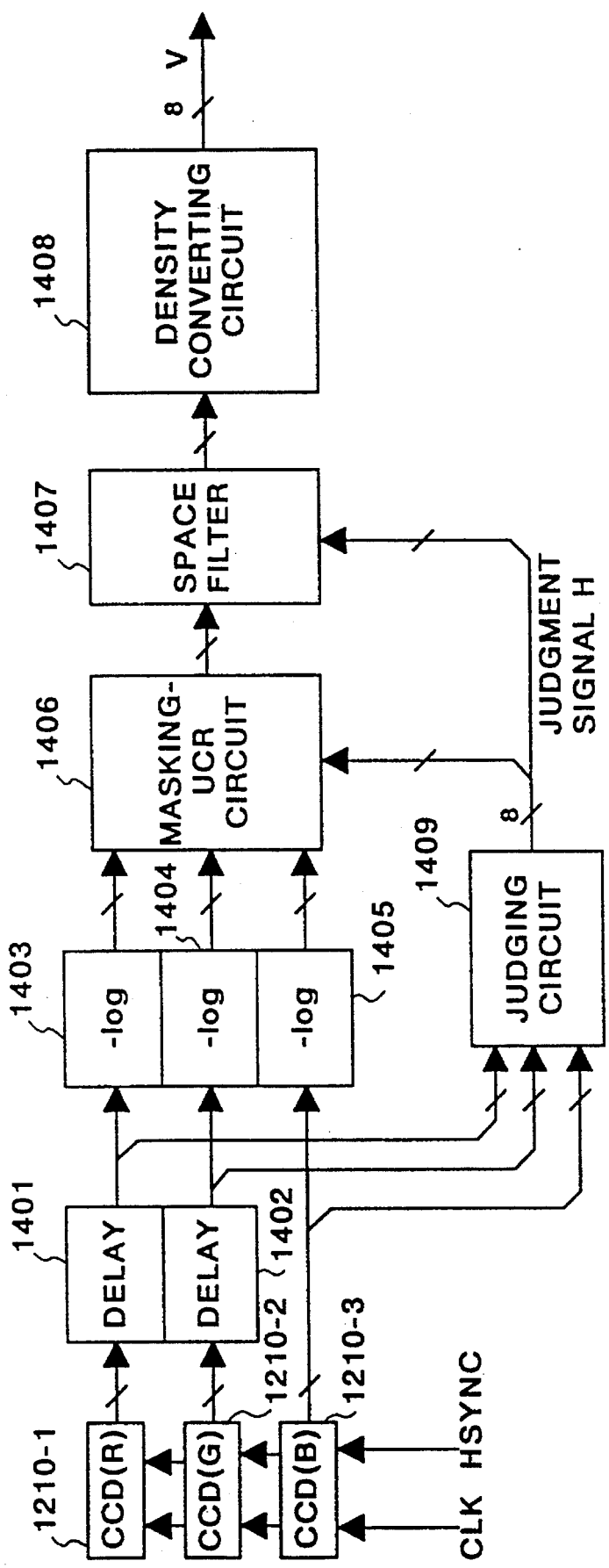
FIG. 9 is a block diagram showing the construction of an image scanner according to a second embodiment of the present invention.
Figure 10:
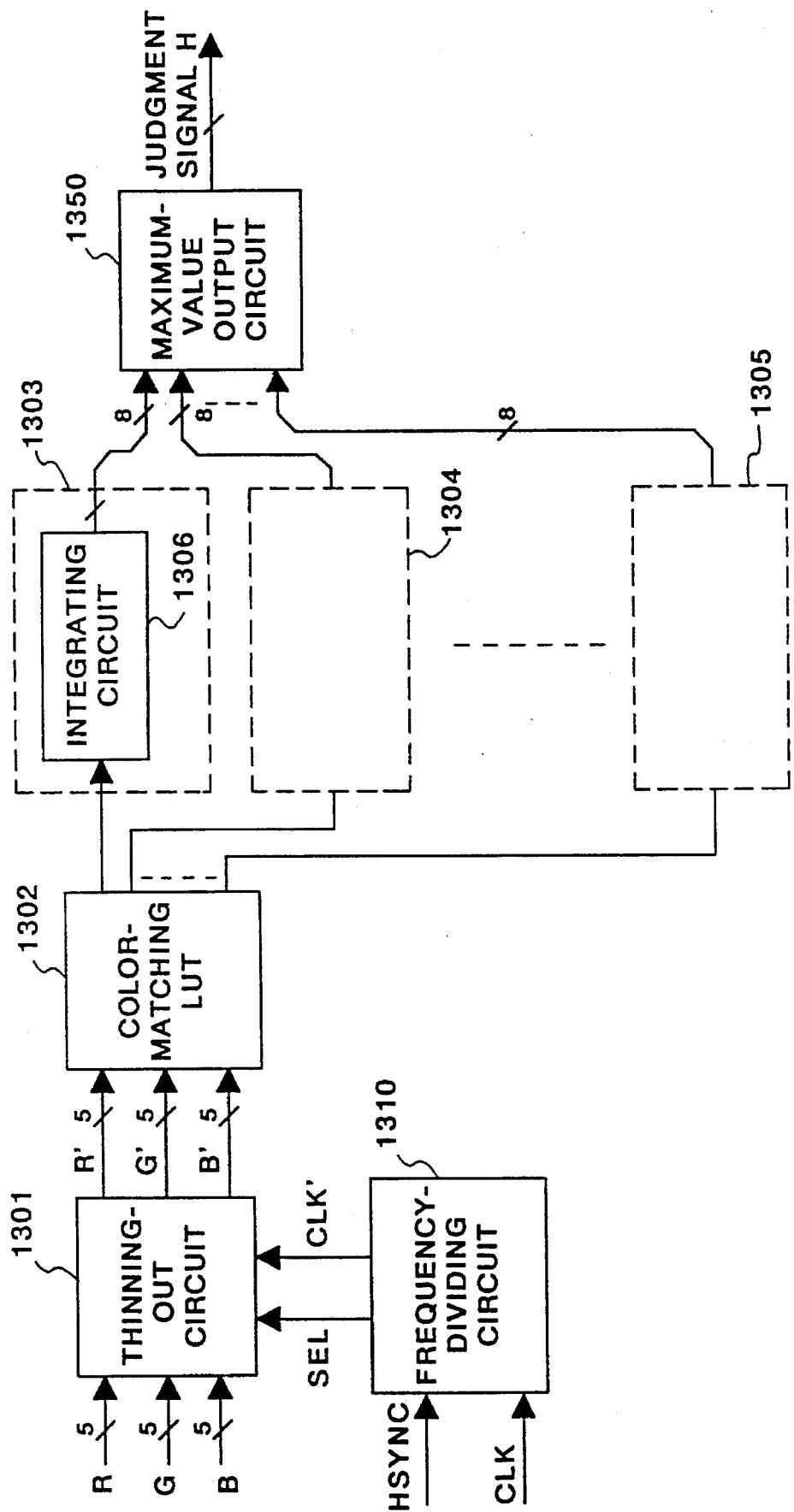
FIG. 10 is a block diagram showing the construction of a judging circuit 409 according to the second embodiment.

FIG. 9 is a block diagram showing the construction of an image scanner according to a second embodiment of the present invention, and FIG. 10 is a block diagram showing the construction of a judging circuit 409 according to the second embodiment.

Since the arrangement shown in FIG. 9 is substantially the same as that shown in FIG. 1 of the first embodiment, components corresponding to those whose reference numerals are of the 200 and 400 series in FIG. 1 are designated by reference numerals of the 1200 and 1400 series, respectively, and a description of these corresponding components is deleted. Components which differ from those in FIG. 1 are a masking-UCR circuit 1406, a space filter 1407 and a judging circuit 1409.

In the first embodiment, the judgment signal outputted by the judging circuit 1409 is a binary signal of "0" or "1", and the output signal is changed to $FF_H$ by this judgment signal. The second embodiment, however, possesses an arrangement not limited to that just described.

More specifically, in FIG. 9, the judgment circuit 1409 expresses the degree of similarity between a specific original and an original concerned as the judgment signal H and delivers this signal as a multivalued output of, say, eight bits. The outputted multivalued judgment signal H is sent to the masking-UCR circuit 1406 and space filter 1407, whereby the processing conditions in the masking-UCR circuit 1406 and space filter 1407 are made to differ. This arrangement also makes it possible to prevent duplication of a specific original or counterfeiting.

In FIG. 10 also, components similar to those of the arrangement of FIG. 3 according to the first embodiment need not be described, and the reference numerals of the 300 series used in FIG. 3.are replaced by reference numerals of the 1300 series.

In FIG. 10, color judging circuits 1303, 1304, . . . , 1305 deliver unchanged the outputs of the integrators in the respective color judging circuits 303, 304, . . . ,305, and therefore the comparison processing, which involves a threshold value, performed by the registers and comparators is eliminated, and the degree of similarity between a plurality of specific originals and the original concerned is outputted. The OR circuit 309 is replaced by a maximum-value output circuit 1350. The latter outputs the maximum value of the outputs (namely the degree of similarity with respect a specific original) from the color judging circuits 1303, 1304, . . . , 1305. More specifically, if the value of the judgment signal H is small, i.e., if the degree of similarity with respect to all specific originals is small, masking-UCR processing conditions and space filter coefficients which provide the most faithful color reproduction of the original are selected.

On the other hand, if the value of the judgment signal H is large, i.e., if the degree of similarity with respect to all specific originals is great, the masking-UCR processing conditions are altered to intentionally change the color, the space filter coefficients are altered to intentionally apply strong smoothing to the image signal and eliminate acuteness of the output signal, thereby effecting processing which makes the output copy appear different from the original.

By arranging is so that the larger the value of the judgment signal H, namely the greater the degree of similarity with respect to a specific original of a certain type, the greater the difference will be between the original and the copy, inconveniences caused by misrecognition can be mitigated.

Third Embodiment

In the first and second embodiments described above, an example of a color copying apparatus constituted by an image scanner and a printer is illustrated. However, this does not impose a limitation upon the present invention. A third embodiment of the present invention is illustrated in FIG. 11.

Figure 11:
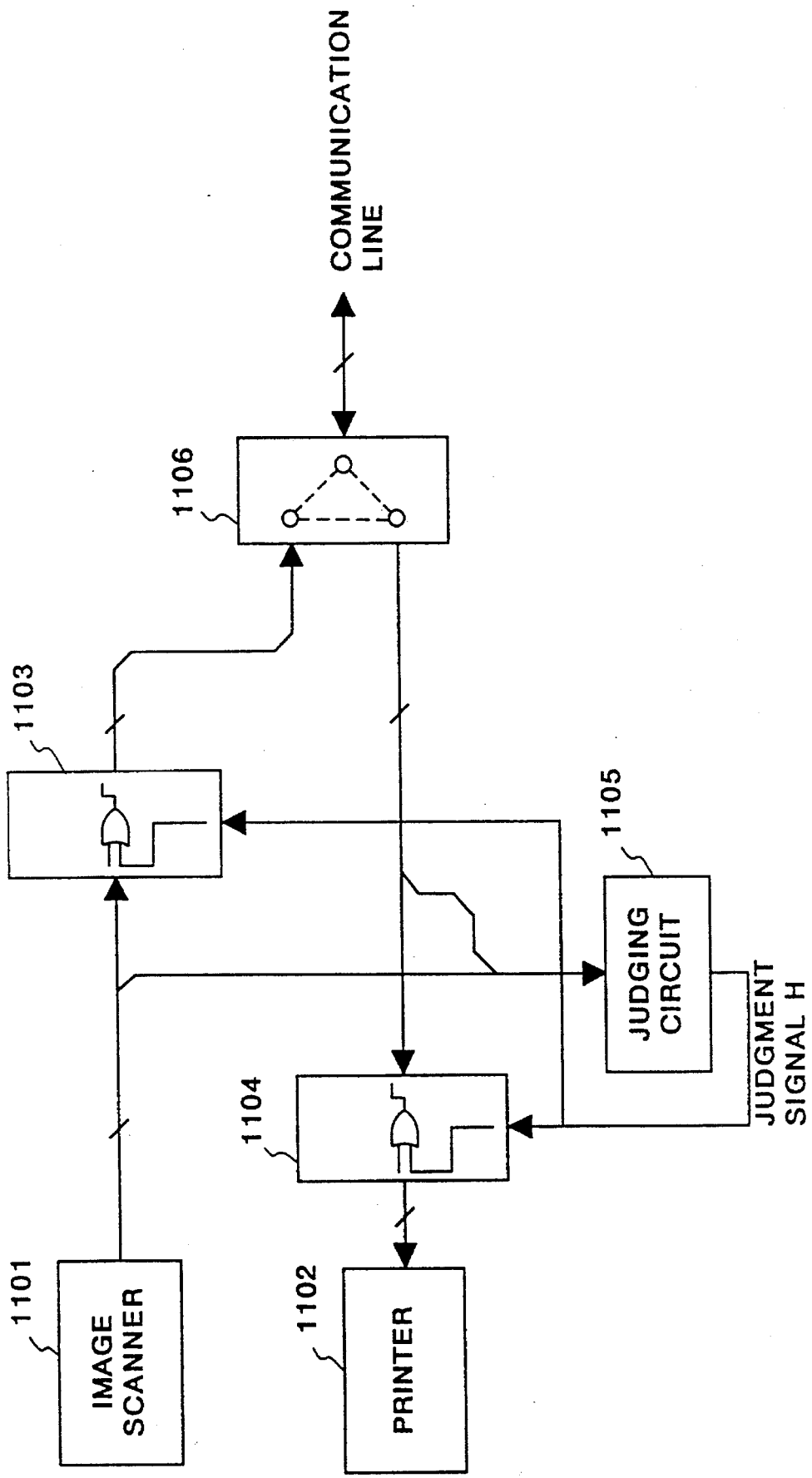
FIG. 11 is a block diagram showing the internal construction of an image processing apparatus according to the third embodiment.

FIG. 11 is a block diagram showing the internal construction of an image processing apparatus according to the third embodiment.

In FIG. 11, numeral 1101 denotes an image scanner similar to the image scanner 201 of FIG. 2, and numeral 1102 denotes a printer similar to the printer 202 of FIG. 2. Numeral 1105 represents a judging circuit similar to the judging circuit 409 of FIG. 1, and numerals 1103, 1104 represent OR gates similar to the OR gate 410 of FIG. 1. Numeral 1106 designates a bus selector connected to the image scanner 1101, printer 1102 and a communication line. Depending upon how the connections are made, the image data may be transferred in any of the following three ways:

(1) image scanner→printer (copying machine operation);

(2) image scanner→communication line (facsimile transmission operation); and (3) communication line→printer (facsimile reception operation).

By operating upon the output image of the image scanner 1101 and the input image of the printer 1102 through the OR gates 1103 and 1104 depending upon the results of the judgment made by the judging circuit 1105, the copying, facsimile transmission and facsimile reception of a specific original can be inhibited.

Fourth Embodiment

Though the fourth embodiment has the overall construction of a copying machine, the arrangement is similar to that of FIG. 2 of the first embodiment and need not be described.

Image Scanner

Figure 12:
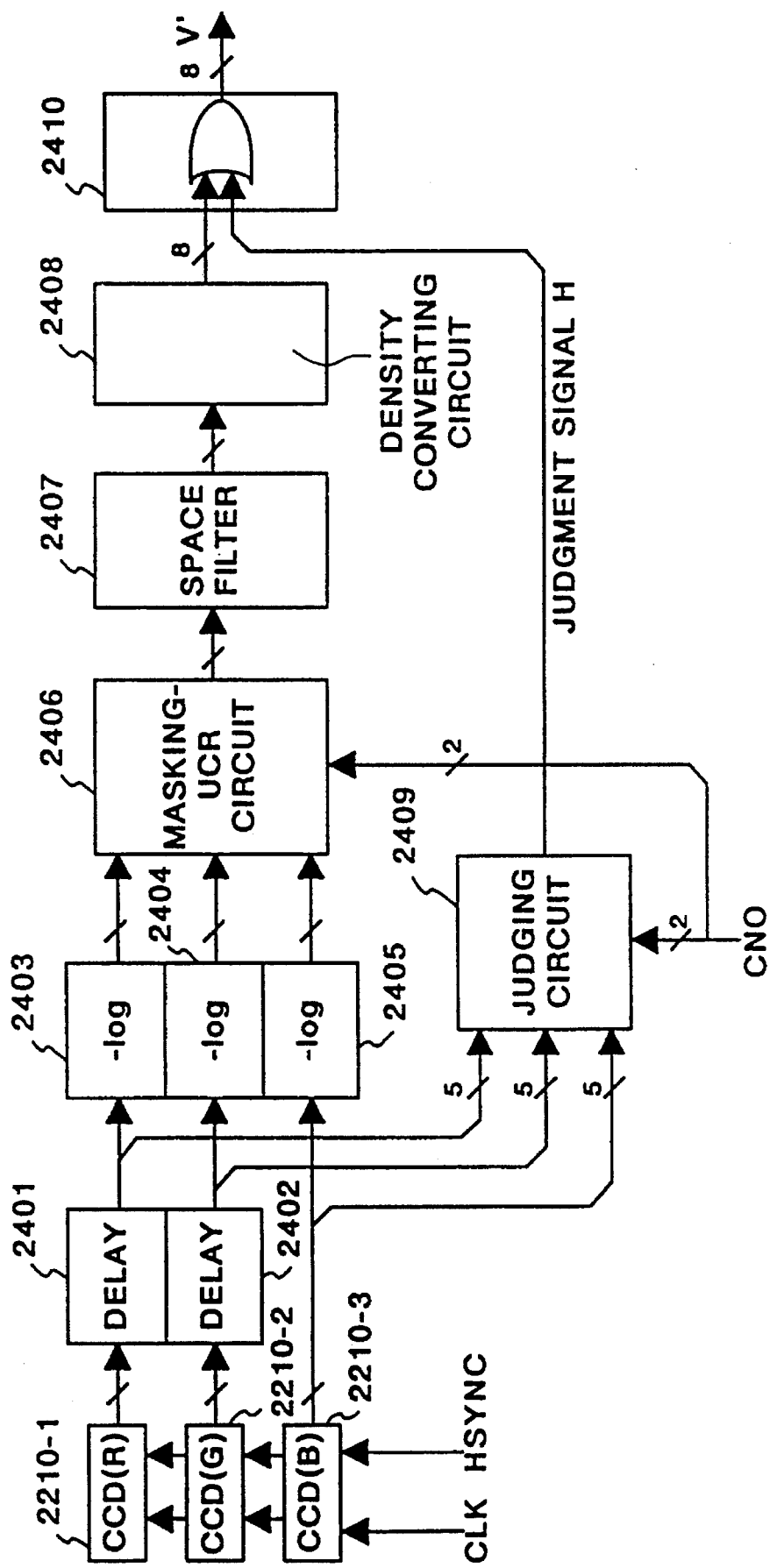
FIG. 12 is a block diagram showing the construction of an image scanner 201 according to a fourth embodiment of the present invention.

FIG. 12 is a block diagram showing the construction of an image scanner according to the fourth embodiment. Though the arrangement is substantially the same as that of FIG. 1 showing the first embodiment, a masking-UCR circuit 2406 and a judging circuit 2409 differ from their counterparts in terms of construction. In FIG. 12, the reference numerals of the 200 and 400 series used in FIG. 1 are raised to reference numerals of the 2000 series.

The differences between this arrangement at that of FIG. 1 will now be described.

The masking-UCR circuit 2406, in accordance with the three signals R,G, B inputted thereto, outputs, in the manner of a frame-sequence, magenta (M), cyan (C), yellow (Y) and black (Bk) signals of a prescribed bit length, e.g., eight bits, whenever there is a reading operation.

A CNO signal is a two-bit frame-sequence signal which, a shown in the table below, is a control signal illustrating the order of four cycles of reading operations. This signal changes over the operating conditions of the masking-UCR circuit 2406.

| CNO SIGNAL | PRINT OUTPUT |
|---|---|
| 0 | MAGENTA (M) |
| 1 | CYAN (C) |
| 2 | YELLOW (Y) |
| 3 | BLACK (Bk) |

The judging circuit 2409 determines whether at least one of a plurality of specific originals is being read and outputs the judgment signal H as either "0" or "1". More specifically, in a case where at lest one of a plurality of specific originals is being read, H="1" is outputted; otherwise, H="0" is outputted.

Furthermore, the aforementioned frame-sequence signal CNO is inputted also to the judging circuit 2409 to change over criteria with regard to each of the four cycles of reading operations so that judgment regarding different specific originals can be performed.

The OR gate 2410 takes the OR between the judgment signal H, which is the output of the judging circuit 2409, and each bit of the eight-bit output V of the density converting circuit 2408, and outputting V'. When the judgment signal H is logical "1", namely when it is judged that a specific original is being read, the output V' is equal to FFF/Hex (255 when expressed by a decimal number) $FF_H$ irrespective of the value of the input signal V. When the judgment signal H is logical "0", namely when it is judged that a specific original is not being read, the value of the input signal v is outputted without change as the output V'.

Judging Circuit

Figure 13:
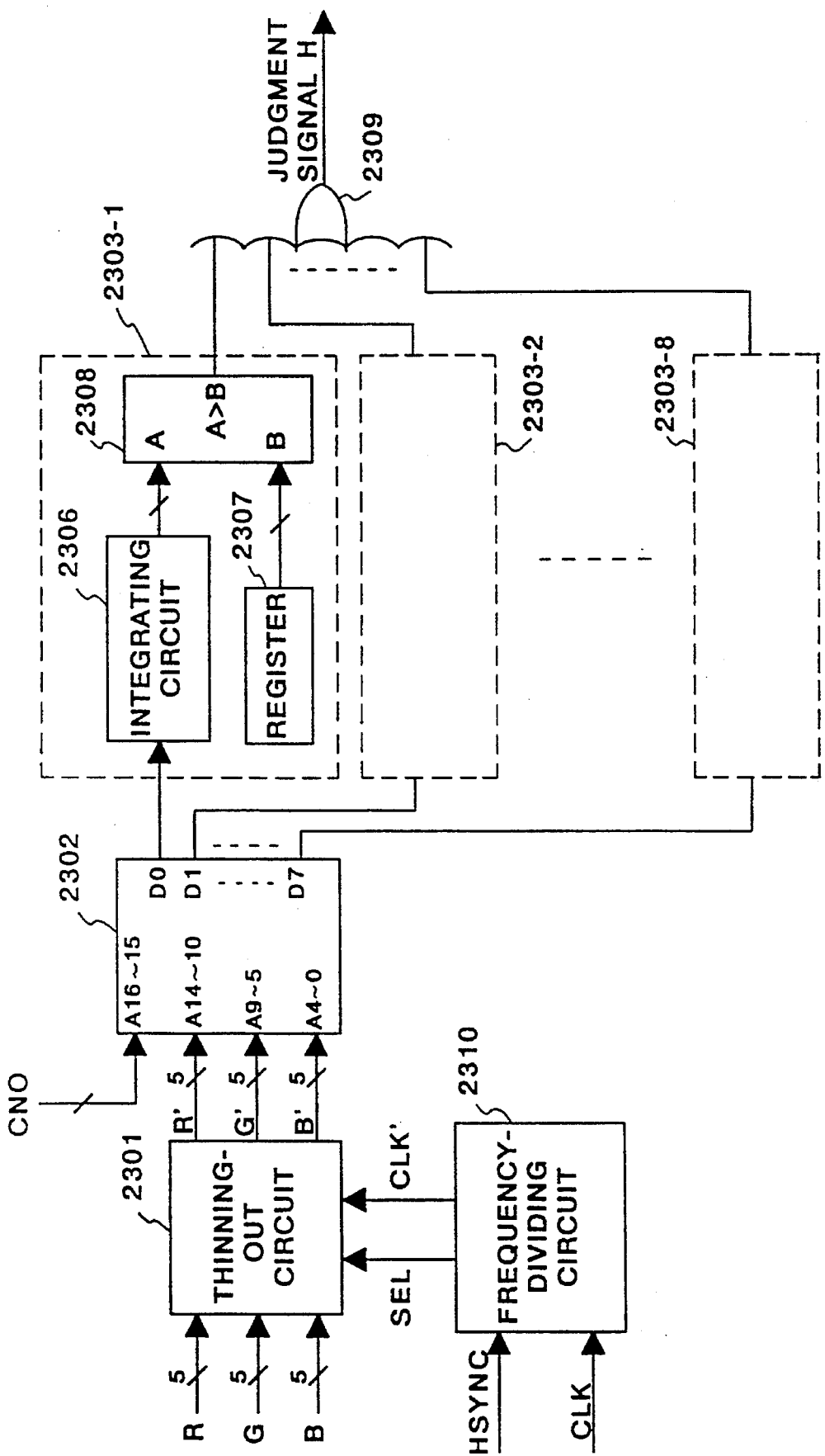
FIG. 13 is a block diagram showing the construction of a judging circuit 409 according to the fourth embodiment.

FIG. 13 is a block diagram showing the construction of the judging circuit 2409 according to the fourth embodiment. The difference between this embodiment and that of FIG. 3 is the provision of a color-matching LUT 2302; the other components are the same as those shown in FIG. 3 and need not be described again. The reference numerals of the 300 series in FIG. 3 are raised to the 2300 series in FIG. 13.

The color-matching LUT 2302 performs an operation for matching color, which is an image characteristic, using plural types of specific originals. Color distribution is investigated beforehand with regard to 32 types of specific originals, and judgment results with regard to whether the color of a relevant pixel coincides with the colors of these specific originals are stored in the LUT 2302.

More specifically, in the color-matching LUT 2302, the CNO signal, which is the frame-sequence signal, is inputted to the two higher order address bits, and five higher order bits of the image signal of each of the colors R, G, B resulting from a thinning-out operation are inputted to the 15 lower order address bits. In conformity with each of the values "0"–"3" of the frame-sequence CNO signal, whether or not the color of a pertinent pixel coincides with the color in eight types of specific originals is made to correspond to data of eight bits and is outputted simultaneously, and a total of 32 types of specific originals are judged in four read scanning cycles.

In a case where it is judged that one or more of the outputs of the color judging circuits 2303-1 through 2303-8 contains a specific original of interest, the judging circuit 2409 outputs "1" as the judgment signal H via the OR gate 2309. Alternatively, if it is judged that none of the aforementioned outputs contains a specific original of interest, then the judging circuit 2409 outputs "0" as the judgment signal H via the OR gate 2309.

The foregoing relates to aspects of the fourth embodiment that distinguish it from the first embodiment. Aspects not described (components and the results of processing, etc.) are the same as those of the first embodiment.

Thus, in accordance with the fourth embodiment, as described hereinabove, when processing for judging whether a specific original is present is executed at the same time that an image read-in operation or processing operation is performed in an image read-in and output apparatus, the judgment criteria are changed over on a time-shared basis, thereby making it possible to speed up the apparatus and readily execute processing with respect to a plurality of specific originals while reducing the amount of hardware required.

Fifth Embodiment

Figure 14:
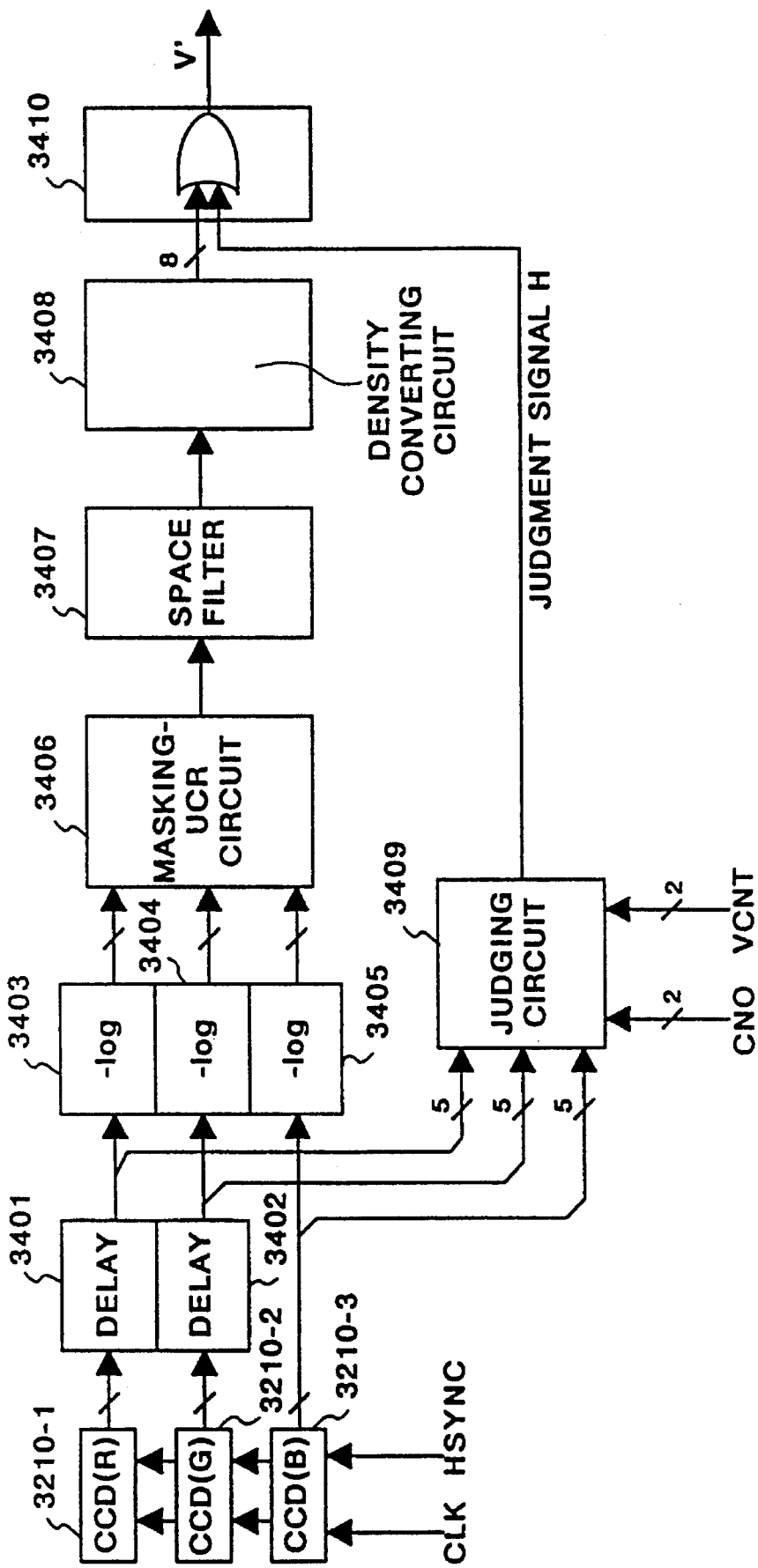
FIG. 14 is a block diagram showing the construction of an image scanner according to a fifth embodiment of the present invention.
Figure 16:
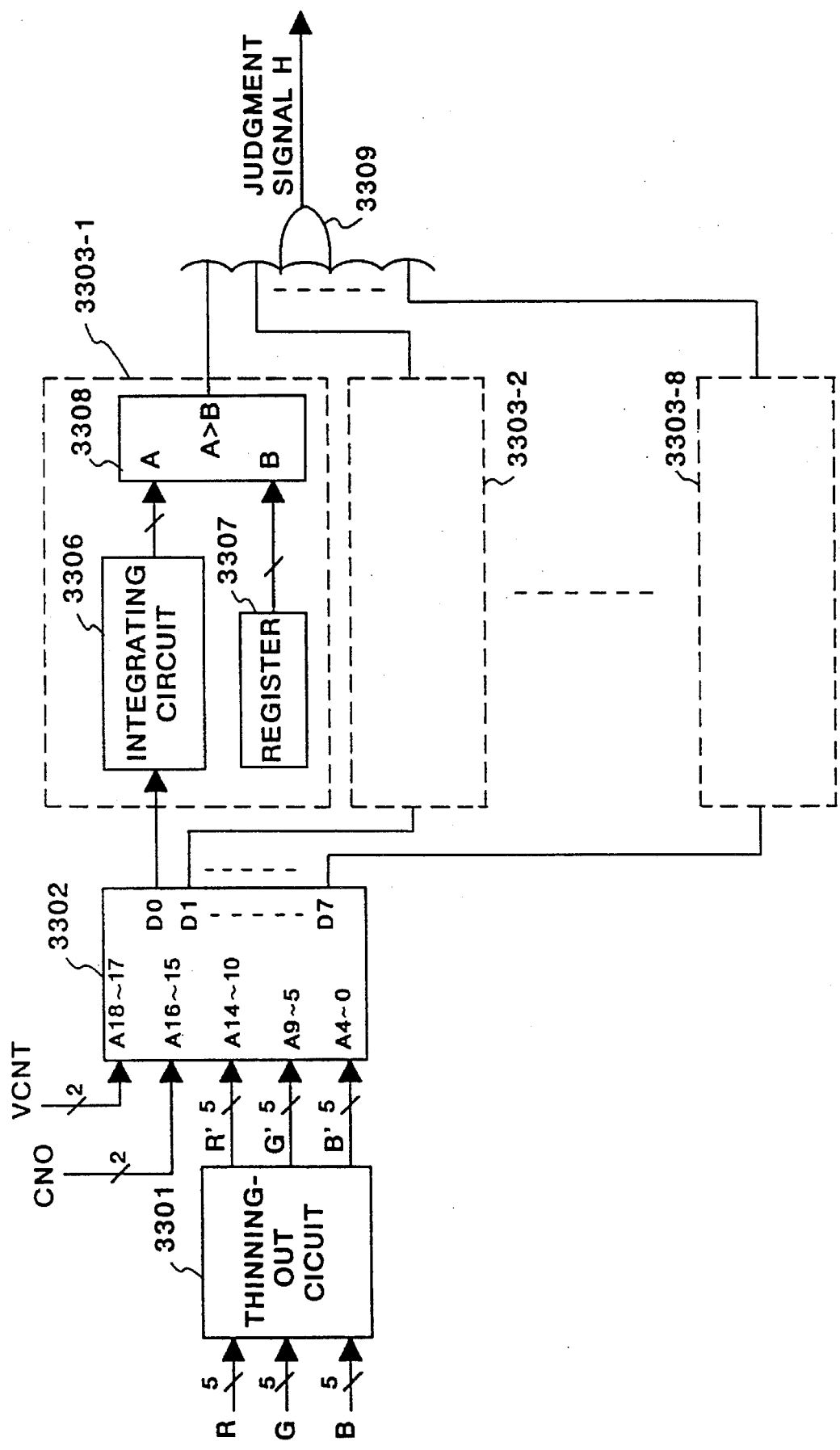
FIG. 16 is a block diagram showing the construction of a judging circuit according to the fifth embodiment.

FIG. 14 is a block diagram showing the construction of an image scanner according to a fifth embodiment of the present invention. FIG. 15A is a timing chart of data according to the fifth embodiment, FIG. 15B is a block diagram for describing a two-bit counter according to the fifth embodiment, and FIG. 16 is a block diagram showing the construction of a judging circuit according to the fifth embodiment.

In FIG. 14, components corresponding to those in FIG. 12 (fourth embodiment) are designated by reference numerals in a 3000 series; only components that differ will be described. A judging circuit 3409 and a masking UCR circuit 3406 in FIG. 14 have functions different from their counterparts in the fourth embodiment. In FIG. 16 also, components corresponding to those in FIG. 13 (fourth embodiment) are designated by reference numerals in a 3000 series; only components that differ will be described Specifically, a color-matching LUT 3302 in FIG. 16 has a function different from its counterpart in the fourth embodiment.

As shown in FIG. 15B, a signal VCNT is generated by inputting a signal HSYNC, which is a main-scanning synchronizing signal, to a two-bit counter 3900. More specifically, as shown in FIG. 15A, the counter is counted up incrementally in the subordinate scanning direction for each scan in the main scanning direction so that the signal VCNT repeatedly assumes the value 0, 1,2,3.

In the fourth embodiment described above, the judgement criteria are changed over by the frame-sequence signal CNO and judgment is performed with regard to a total of 32 types of specific originals. However, in the fifth embodiment, both the value of the frame-sequence signal CNO and the signal VCNT are inputted to the higher order addresses of the color-matching LUT 3302, as shown in FIG. 16, so that judgment is performed with regard to a total of 128 types of specific originals.

Thus, it is possible to make judgments concerning four times the number of specific originals with almost the same amount of hardware.

Further, it goes without saying that an arrangement in which the criteria are changed over solely by the VCNT signal without relying upon the CNO signal also constitutes an embodiment of the present invention.

Sixth Embodiment

The criteria are changed over by the frame-sequence signal in the fourth embodiment, and the criteria are changed over every main scan in the fifth embodiment. However, the present invention is not limited to these embodiments. In a sixth embodiment, the criteria may be changed over every pixel.

Figure 17A:
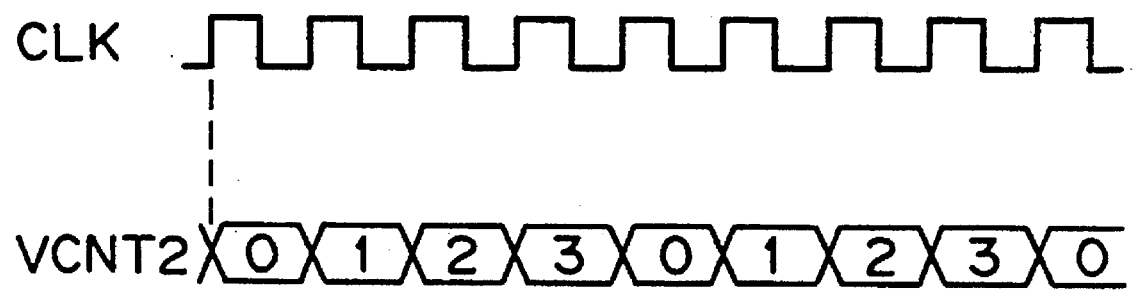
FIG. 17A is a timing chart of data according to a sixth embodiment.
Figure 17B:
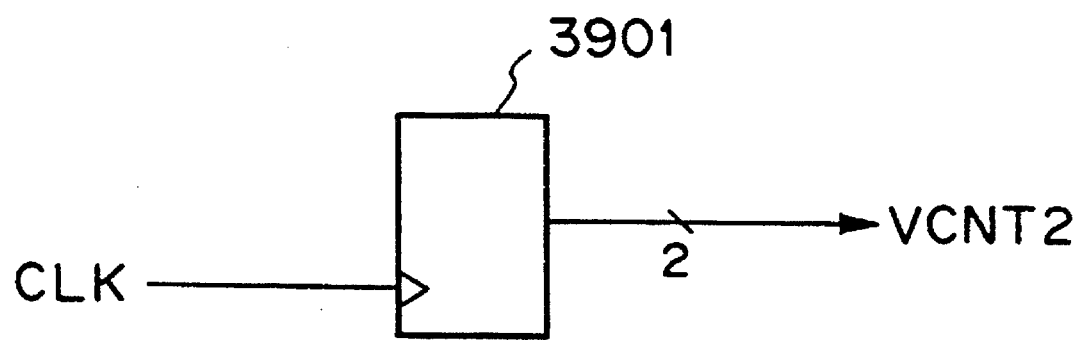
FIG. 17B is a block diagram for describing a two-bit counter according to the sixth embodiment.

FIG. 17A is a timing chart of data according to the sixth embodiment, and FIG. 17B is a block diagram for describing a two-bit counter according to the sixth embodiment.

In FIGS. 17A and 17B, a signal VCNT2 obtained by inputting a pixel clock signal CLK to a two-bit counter 3901 is used as the signal VCNT illustrated in the fifth embodiment, and the same effects are obtained.

Seventh Embodiment

In a seventh embodiment of the present invention, the construction of a copying machine is similar to that of the copying machine having the external appearance shown in FIG. 2, and this need not be described again.

Figure 18:
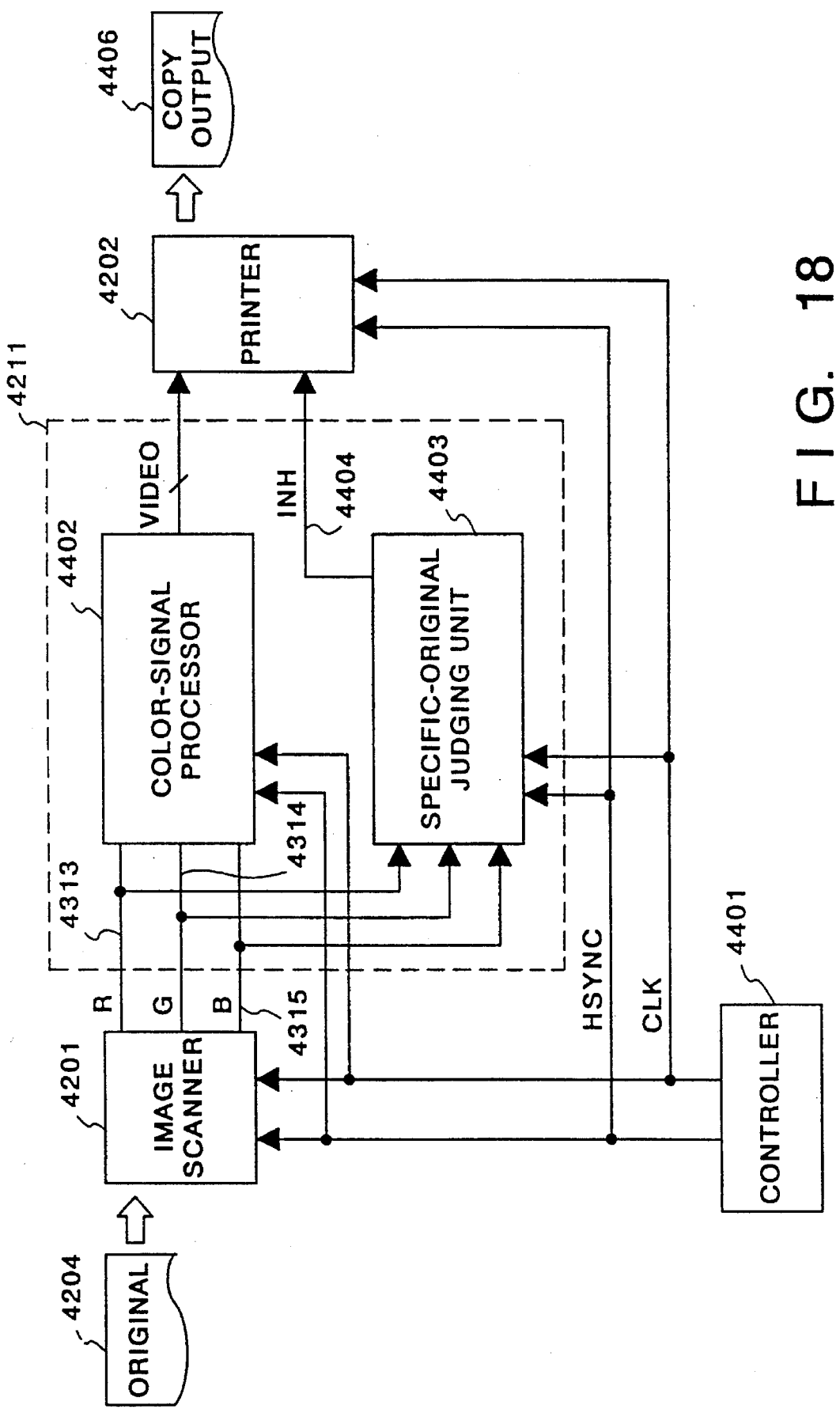
FIG. 18 is a block diagram showing the construction of a signal processor according to a seventh embodiment.

FIG. 18 is a block diagram for describing the construction of a signal processor (image processing unit) 4211 according to a seventh embodiment.

In FIG. 18, CLK represents a clock signal for transferring pixels, and HSYNC represents a horizontal synchronizing signal for achieving synchronization with the start of main scanning. Numeral 4401 denotes a controller constituted by a CPU for performing control of the overall apparatus, a ROM storing operation programs, a RAM having a working area for the program, and circuitry for generating the CLK (the clock signal for transferring pixels) and the signal HSYNC (the signal signal for achieving synchronization with the start of main scanning). Numeral 4402 designates a color-signal processor for producing a print signal from inputted R, G, B signals and transmitting the print signal to a printer 4202. Numeral 4403 denotes a specific-original judging unit for judging whether a registered specific original is contained in a read original based upon color signals R, G, B obtained by reading the original via the image scanner 4201 constituted by the circuitry shown in FIG. 21B described below. The judging unit 4403 notifies the color-signal processor 4402 of the results of judgment.

INH4404 is a judgment signal indicative of the judgment made by the specific-original judging unit 4403. This signal is set at "0" (low) at the start of reading of an original, and at "1" (high) when an original has been judged to be a specific original. The printer 4202 performs an ordinary copying operation if the INH4404 signal is "0". If the INH4404 signal is "1", the image forming operation is suspended from this moment onward and the copying paper is ejected.

Figure 19:
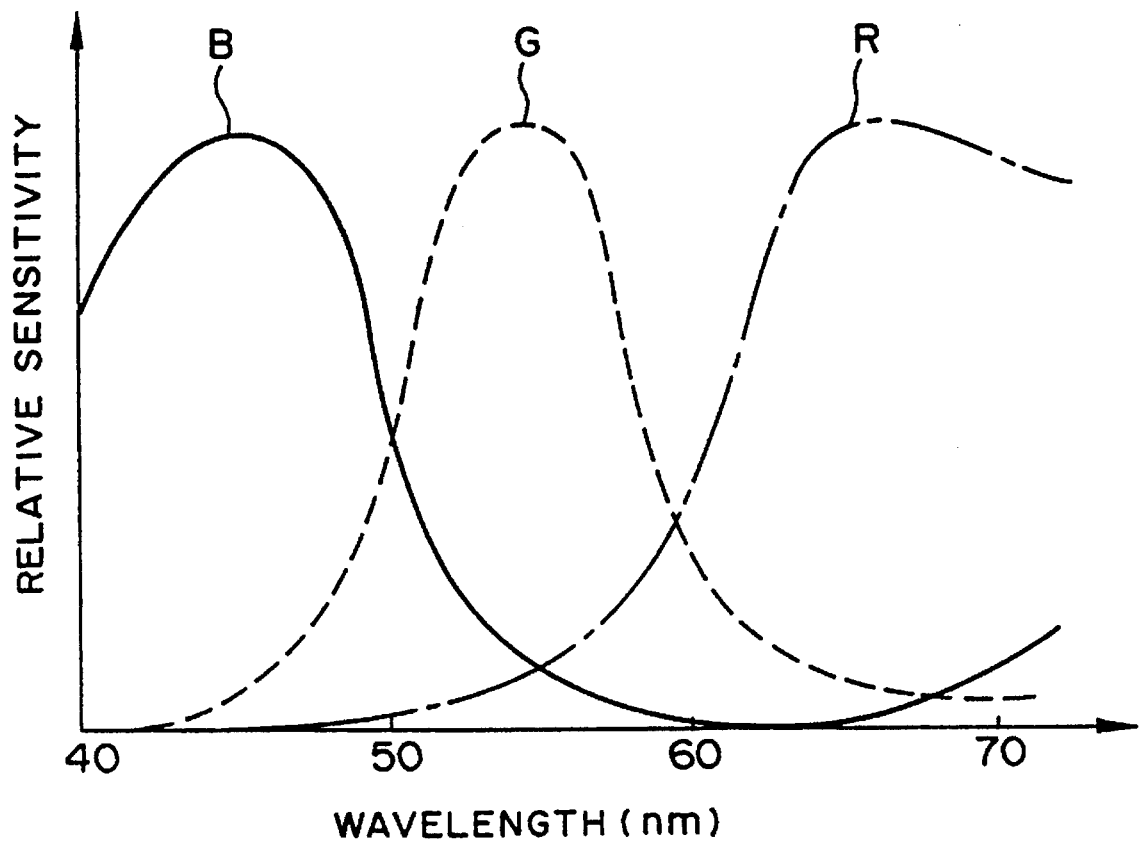
FIG. 19 is a diagram showing the relative sensitivity of a CCD in dependence upon the wavelength of light according to the seventh embodiment.

FIG. 19 is a diagram showing the relative sensitivity of a CCD (for R, G, B) in dependence upon the wavelength of light according to the seventh embodiment.

Figure 20:
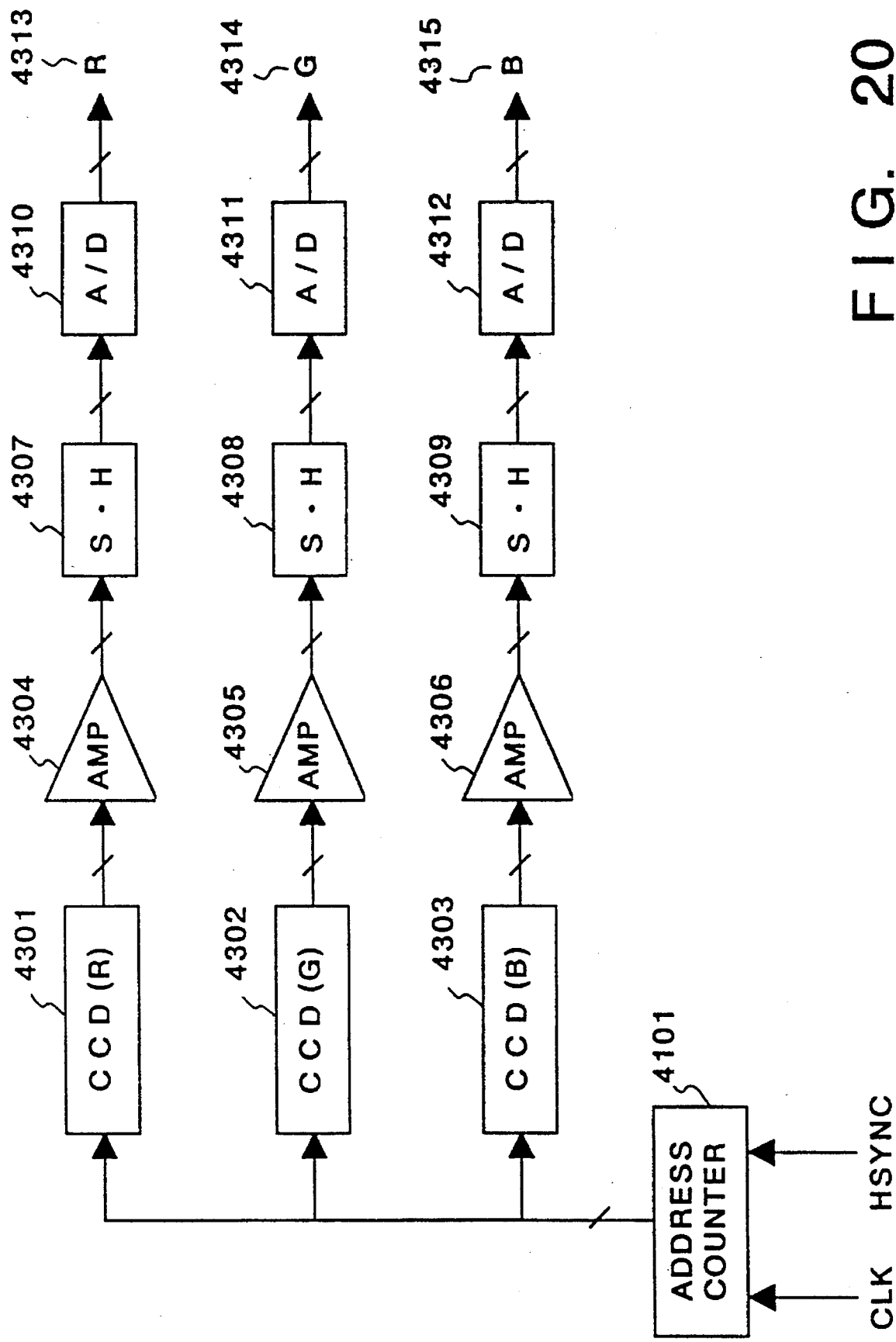
FIG. 20 is a diagram showing the construction of an image scanner according to a seventh embodiment.

FIG. 20 is a block diagram showing the construction of the image scanner 4201 illustrated in FIG. 18. Numeral 4101 denotes a counter for outputting a main-scanning address 4102 which designates the main scanning position with respect to line sensors 4301–4303 constituting the above-mentioned three-line sensor 4210. More specifically, the counter 4101 is set to a predetermined value from a CPU (not shown) when the horizontal synchronizing signal HSYNC is "1", and is incremented by the pixel clock signal CLK.

The image formed on the three-line sensor is photoelectrically converted in the three line sensors 4301–4303, the sensor outputs are passed through amplifiers 4304–4306, sample-and-hold circuits 4307 4309 and A/D converters 4310–4312 as read signals of R, G and B components, and the outputs of the A/D converters 4310–4312 are delivered as eight-bit color digital image signals 4313 (corresponding to R), 4314 (corresponding to G) and 4315 (corresponding to B).

Figure 21A:
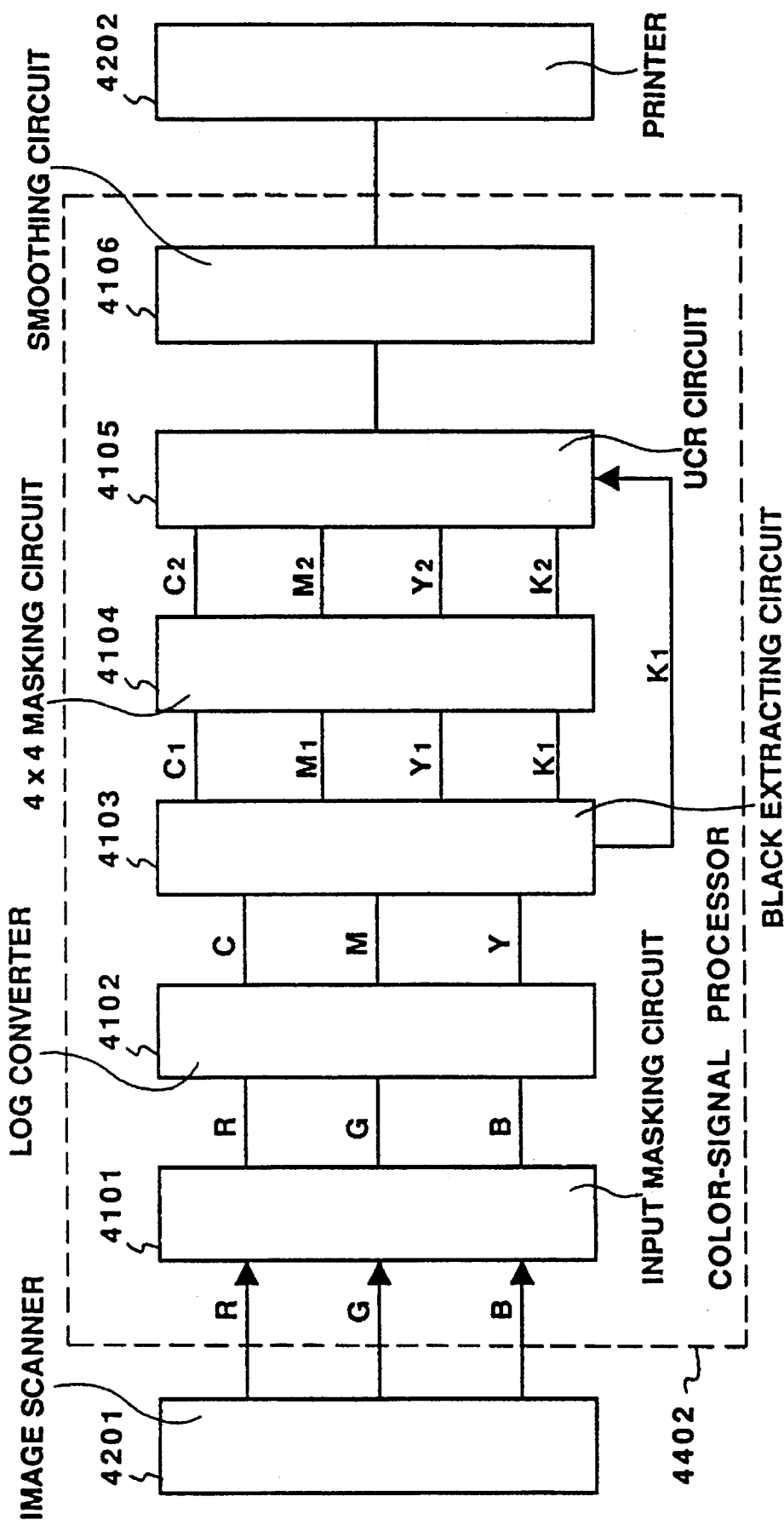
FIG. 21A is a block diagram showing the construction of a color-signal processor according to the seventh embodiment.

FIG. 21A is a block diagram showing the construction of the image-signal processor 4402 according to the seventh embodiment. In FIG. 21A, numeral 4101 denotes an input masking circuit, to which the color signals R, G, B are inputted from the image sensor 4201, for subjecting these input signals to an optical correction (masking) at the time of reading. Numeral 4102 designates a LOG converter for converting luminance signals R, G, B, which are the masked color signals, into corresponding density signals C, M, Y. Shown at numeral 4103 is a black-extracting UCR circuit for extracting the black component from the density signals C (cyan), M (magenta) and Y (yellow) and producing density signals $C_1, M_1, Y_1, K_1$ (black). Numeral 4101 designates a 4×4 masking circuit for applying a color correction to the density signals $C_1$, $M_1$, $Y_1$, $K_1$ and outputting frame-sequence signals of density signals $C_2$, $M_2$, $Y_2$, $K_2$. Numeral 4106 designates a smoothing circuit for applying smoothing processing to the frame-sequence density signals $C_2$, $M_2$, $Y_2$, $K_2$, which have been subjected to under-color rejection.

In accordance with the arrangement described above, the R, G, B input signals applied to the image scanner 4201 are subjected to masking by the input masking circuit 4101, after which the masked signals are converted into the density signals Y, M, C by the LOG converter 4102. These density signals Y, M, C are subjected to black extraction and UCR processing by the black-extracting UCR circuit 4103, and a color correction is applied by the 4×4 masking circuit 4104. Thereafter, the output C, M, Y, K signals are sent to the printer 4202 in frame-sequence fashion.

Figure 21B:
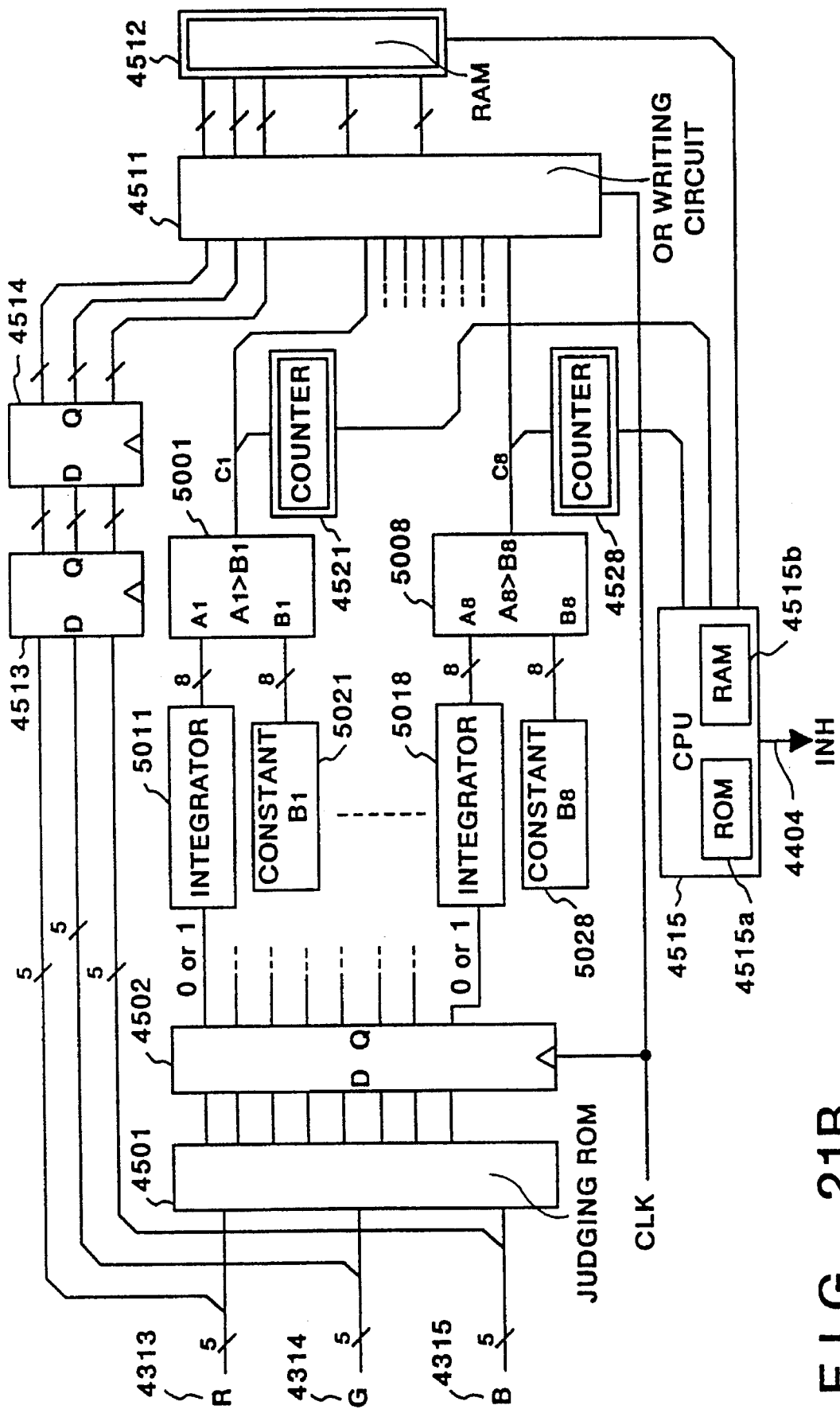
FIG. 21B is a block diagram showing the circuit construction of a specific-original judging unit according to the seventh embodiment.
Figure 24:
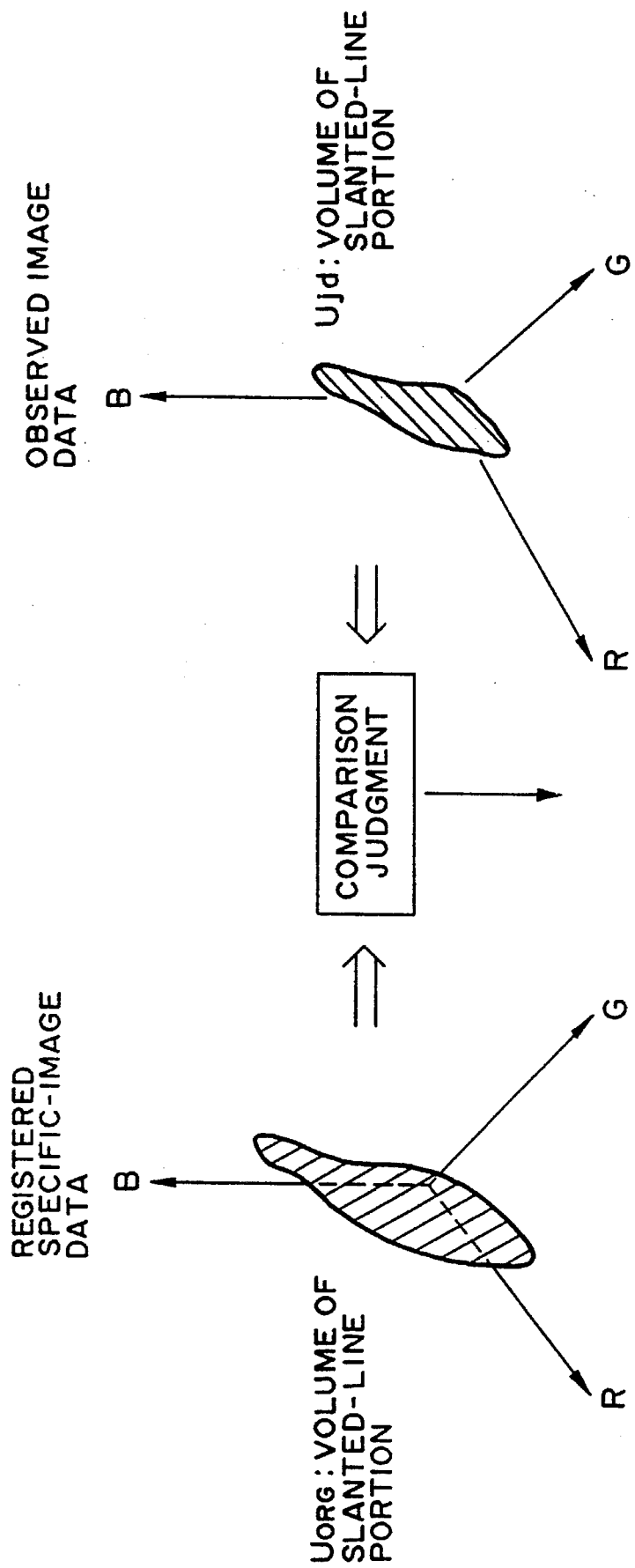
FIG. 24 is a diagram for describing a method of judging a specific original according to the seventh embodiment.
Figure 25A:
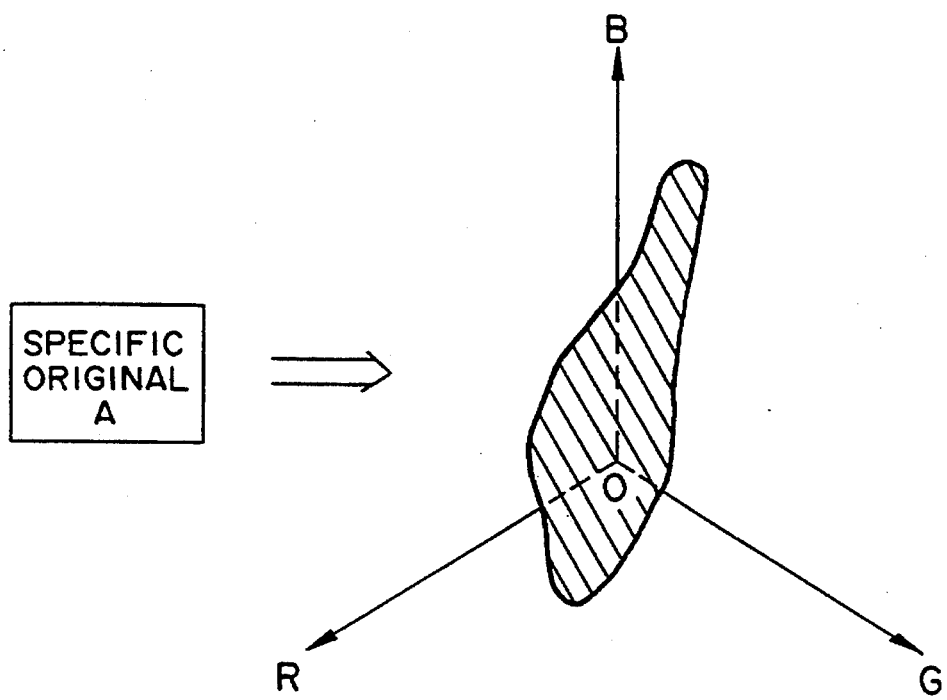
FIG. 25 shows diagrams for describing the relationship between a specific original and color space in the seventh embodiment.
Figure 25B:
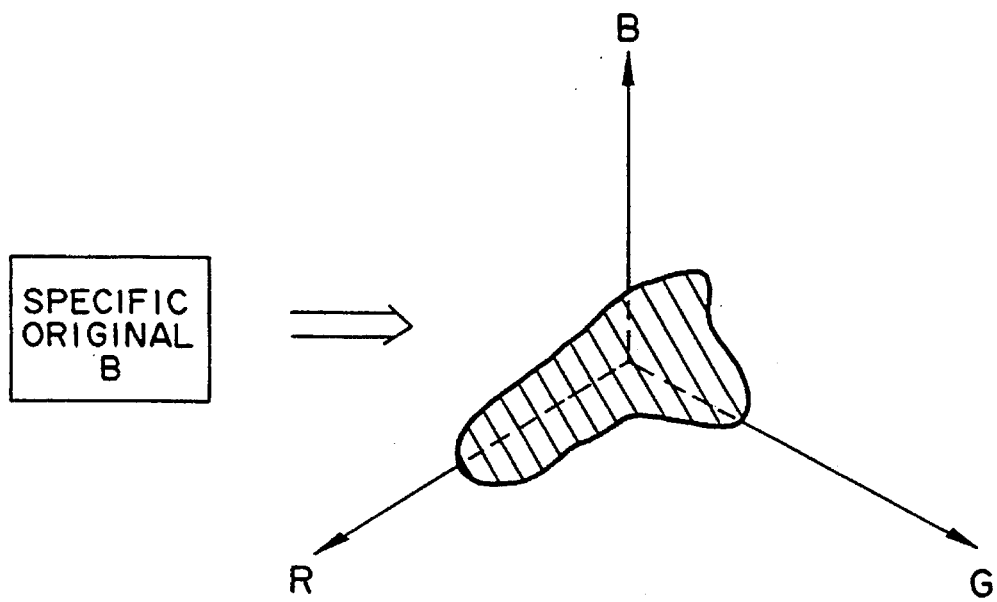
Figure 26:
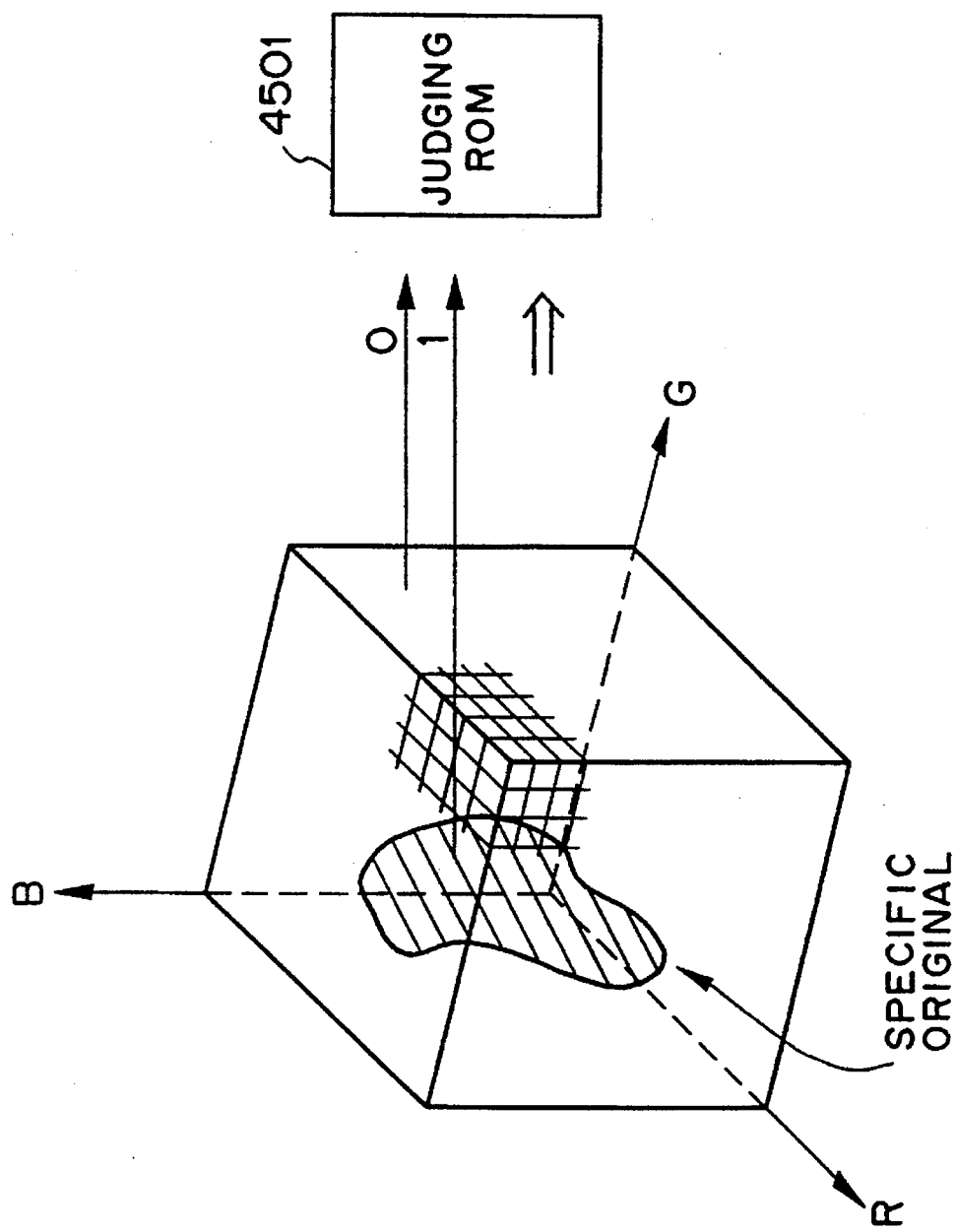
FIG. 26 is a diagram showing the relationship between color-space data of a specific original and data in a judging ROM in the seventh embodiment.
Figure 27:
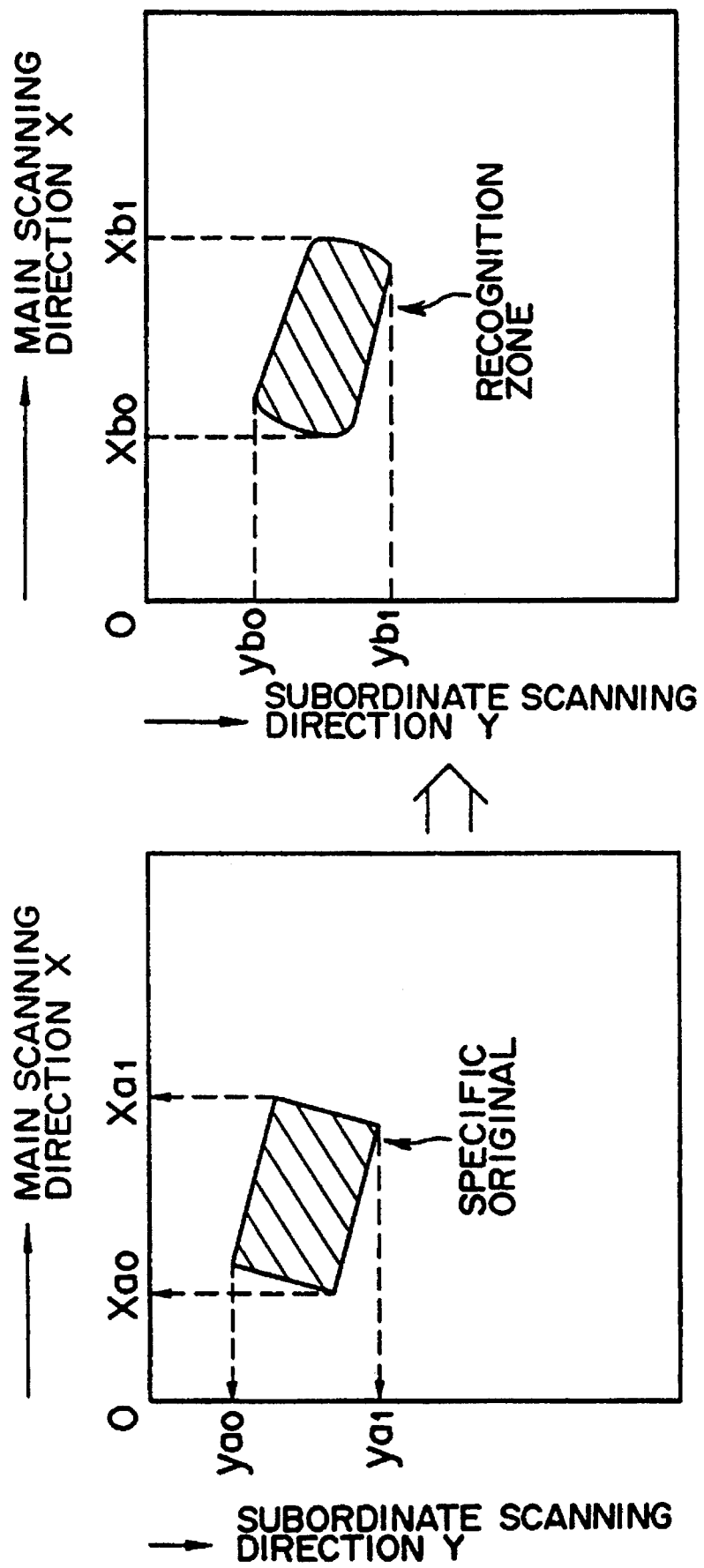
FIG. 27 is a diagram showing the positional relationship between a specific original and a recognition zone in the seventh embodiment.

FIG. 21B is a block diagram showing the construction of the specific-original judging unit 4403 illustrated in FIG. 18, FIG. 24 is a diagram for describing a method of judging a specific original according to the seventh embodiment, FIGS. 25A and 25B are diagrams for describing the relationship between a specific original and color space in the seventh embodiment, FIG. 26 is a diagram showing the relationship between color-space data of a specific original and data in a judging ROM 4501 in the seventh embodiment, and FIG. 27 is a diagram showing the positional relationship between a specific original and a recognition zone in the seventh embodiment.

In FIG. 21B, the judging ROM 4501 is constituted by a read-only memory having a data width of eight bits and an address width of 15 bits and stores data corresponding to eight types of specific originals.

R, G, B color image signals inputted by the image scanner 4201 enter the judging ROM 4501 as address signals. The judging ROM 4501 stores written information indicating whether the image data of specific originals illustrated in FIGS. 25A, 25B and 26 exist in the corresponding R, G, B color space. In a case where input color signals 4313, 4314, 4315 match the image portions of specific originals A, B indicated by the slanted-line portions in the RGB spaces shown in FIGS. 25A and 25B, "1" is the output signal of the judging ROM 4501; otherwise, "0" is the output signal of the ROM.

The above-mentioned judgment information outputted by the judging ROM 4501 enters integrators 5011–5018 through a latch circuit 4502.

The integrators 5011–5018 are of identical construction, and therefore only the integrator 5011 will be described as an example.

Figure 22:
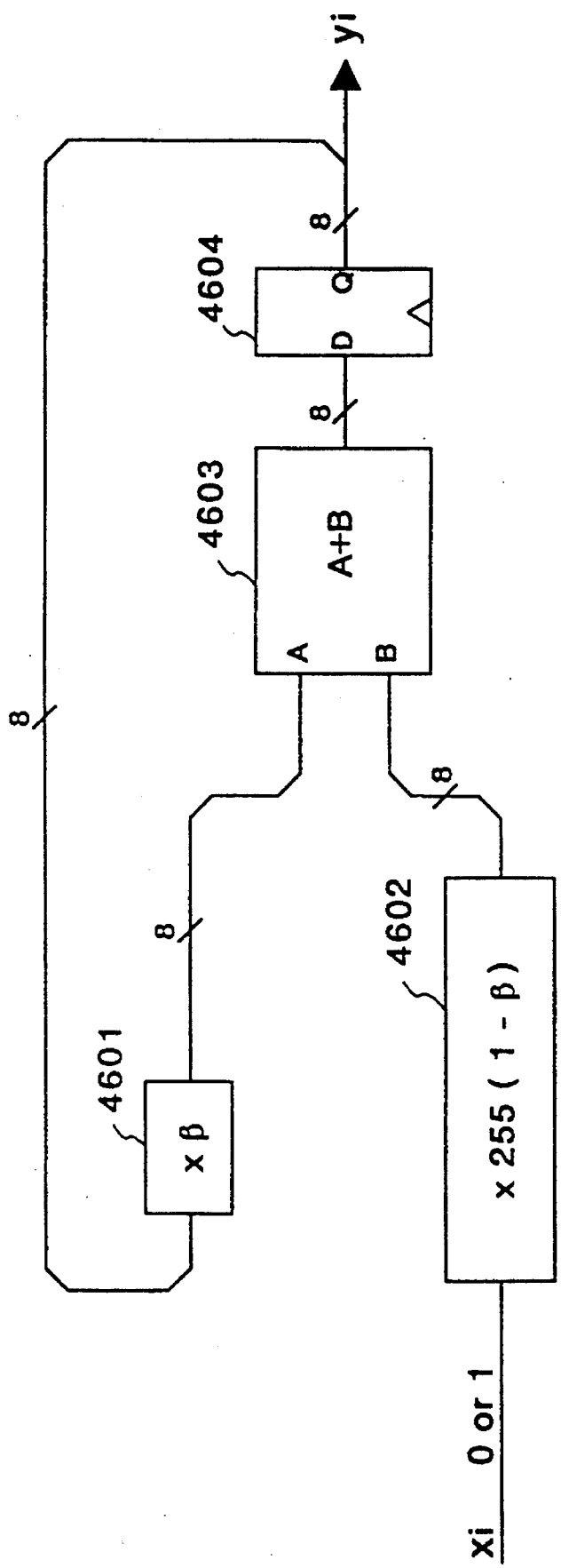
FIG. 22 is a block diagram showing an integrator 306 according to the seventh embodiment.

FIG. 22 is a block diagram for describing the integrator 5011.

In FIG. 22, numerals 4601, 4602 denote multipliers, 4603 an adder, and 4604 a latch circuit for timing adjustment. In response to an inputted $i^{th}$ signal $x_i$ ("0" or "1"), the multiplier 4602 performs the multiplication $x_i \times 255 (1-\beta)$ using a predetermined weighting coefficient $\beta$. The product is inputted to the B-side of the adder 4603. On the other hand, in response to an $(i-1)^{th}$ output signal $y_{i-1}$ from the latch circuit 4604, the multiplier 4601 performs the multiplication $y_{i-1} \times \beta$ and inputs the product to the A-side of the adder 4603. The latter performs the addition operation $x_i \times 255 (1-\beta) + y_{i-1} \times \beta$ and outputs the result as $y_i$. In other words, the integrator 5011 performs the operation indicated by equation (2) below:

$$y_i = x_i \times 255(1-\beta) + \beta \cdot y_{i-1} \quad (2)$$

That is, the integrator 5011 is a circuit which executes the integration processing of Eq. (2) with regard to all input data.

Figures 23A, 23B:
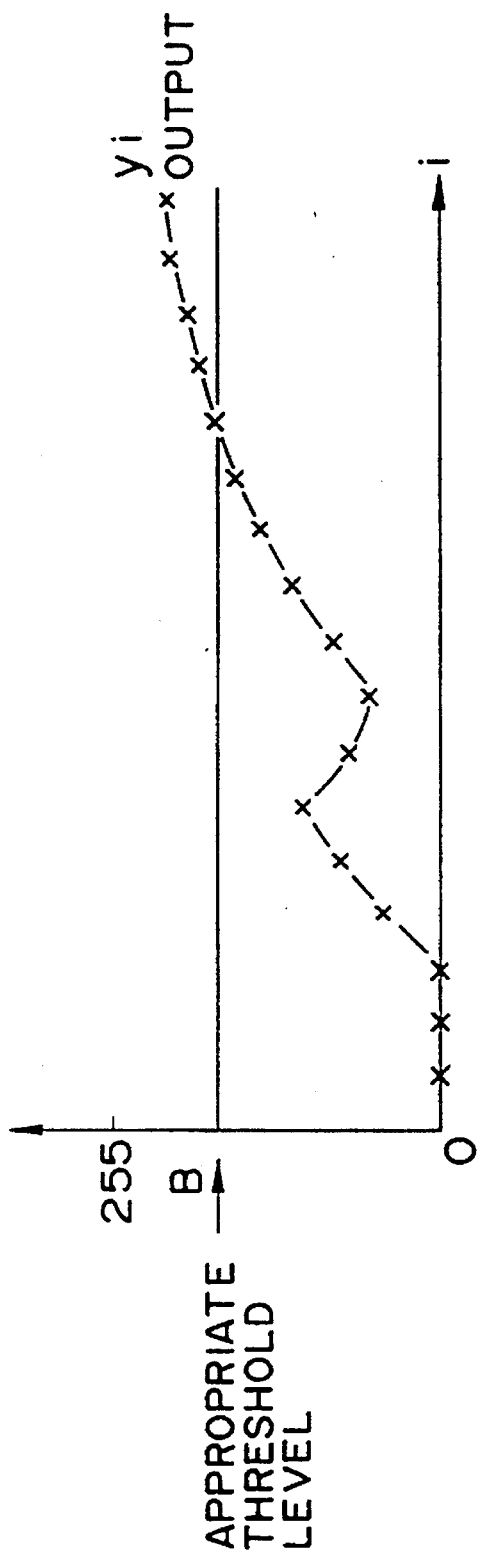
FIG. 23 is a diagram for describing integrated results according to the seventh embodiment.

In a case where an input value "1" to the integrator 5011 continues, as shown in FIG. 23B, the output value from the integrator 5011 approaches 255, as shown in FIG. 23A, owing to execution of the foregoing operations. In a case where the input value "0" continues, the output value approaches "0".

Comparing arithmetic units 5001–5008 are identically constructed, and therefore only the comparing arithmetic unit 5001 will be described as an example. The comparing arithmetic unit 5001 compares the output value A1 from the integrator 5011 and a value B1 of a predetermined constant stored in a register 5021, and outputs a judgment signal indicated at C1. The values of C1 are as follows, in accordance with Eq. (3):

$$C_1 = 1 : A1 > B1$$

$$C_1 = 0 : A1 \leq B1 \quad (3)$$

By virtue of this processing, the output C1 of the comparing arithmetic unit 5001 becomes "1" in a case where the input color signal continuously matches the image data of the specific original. It should be noted that the comparing arithmetic units 5002–5008 and registers 5022–5028 function in the same manner as the comparing arithmetic unit 5001 and register 5021, respectively.

Counters 4521–4528 are identically constructed and therefore only the counter 4521 will be described as an example. The counter 4521 is counted up only when the output C1 is "1". The number of pixels contained in the specific-original recognition zone indicated by the slanted-line portion in FIG. 27 is calculated by the counter 4521.

An OR writing circuit 4511 writes the OR of the output signals C1–C8 of the comparing arithmetic units 5001–5008 in a RAM 4512. The RAM 4512 has a bit width of eight bits and an address width of 16 bits, namely a size identical with that of the ROM 4501.

Figure 21D:
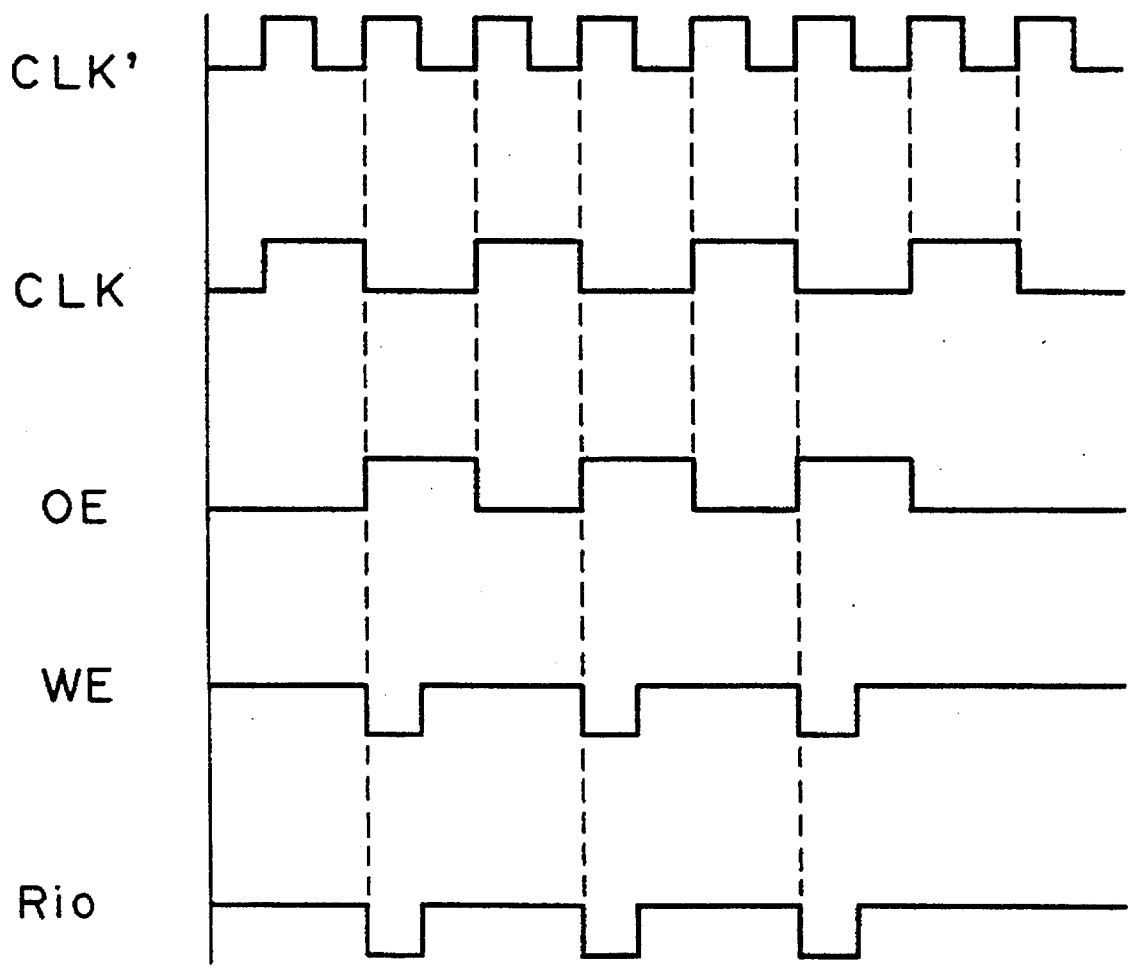
FIG. 21D is a timing chart of a timing generating circuit 5112 according to the seventh embodiment.

FIG. 21C is a block diagram showing the construction of the OR writing circuit 4511 according to the seventh embodiment. The RAM 4512, which is constituted by a 32K SRAM, is addressed by three five-bit signals R, G, B, with the 15 bits being inputted to $A_0$–$A_{14}$ serving as an address bus. Also inputted to $D_0$–$D_7$ of the RAM 4512 as data are items of data 5021– 5028 resulting from an OR operation, described below. Numeral 5112 denotes a timing generating circuit for generating the timing signal shown in FIG. 21D.

In the OR arithmetic unit within the slanted lines, stored data is read out from $D_0$–$D_7$ in dependence upon a read-enable signal OE at the timing of a clock CLK', with regard to addresses designated by $A_0$–$A_{14}$. The data is latched in respective latch circuits. The inputted signals 5021–5028 and the latched memory data are OR-ed by respective OR gates, and outputs are obtained from respective buffers at an inverter timing Rio.

Thus, with respect to each address stipulated by five bits of each of the R, G, B signals, if at least one item of the data sequentially inputted by the signals 5021–5028 is "1", this data is stored in the RAM 4512.

Since $D_0$–$D_7$ are stored at mutually independent addresses, judgment processing can be performed with regard to eight types of specific originals.

The volume of the R, G, B space of the slanted-line portion, which is the observed data in FIG. 24, is calculated by measuring the number of bits of the judgment result "1" stored in the RAM 4512.

Numeral 4515 represents a CPU which performs control of the overall specific-original discriminating unit 4403. The CPU 4515 has a ROM 4515a storing a program in accordance with the flowchart of FIG. 28 for operating the CPU 4515, and a RAM 4515b used as the working area of various programs. The CPU 4515 mainly reads data from the counters 4521–4528 and RAM 4512, and determines whether an original of interest is present in an input original.

The input to the integrator of FIG. 22 is indicated by $X_i$, and the output from the integrator is indicated by $Y_i$ ($1 \leq i \leq 8$). An operation in accordance with equation (4) below is performed as processing:

$$Y_{i+1} = \beta \cdot Y_i + 255(1-\beta)X_i \quad (4)$$

In Eq. (4), $\beta$ represents a constant for controlling the integrating effect of the integrator. Further, the following relation holds in the range $0 < \beta < 1$:

$$0 \leftarrow \beta \rightarrow 1$$

(small) (integrating effect) (large)

In other words, a curve indicative of the change in the integrated value varies more gently the closer the set value of $\beta$ shown in FIG. 23B approaches 1. Conversely, the curve varies more sharply the closer the set value of $\beta$ approaches 0. In the seventh embodiment, $\beta = 31/32$.

Here the subject to undergo recognition is assumed to be an original whose size is approximately that of a bank note. However, in case of a subject which is a smaller original image, such as a postage stamp, a smaller value of $\beta$, such as 7/8, would be appropriate. It is permissible to adopt an arrangement in which the value of $\beta$ can be set at will by a scanning unit (not shown) in dependence upon the subject to undergo recognition.

Figure 28:
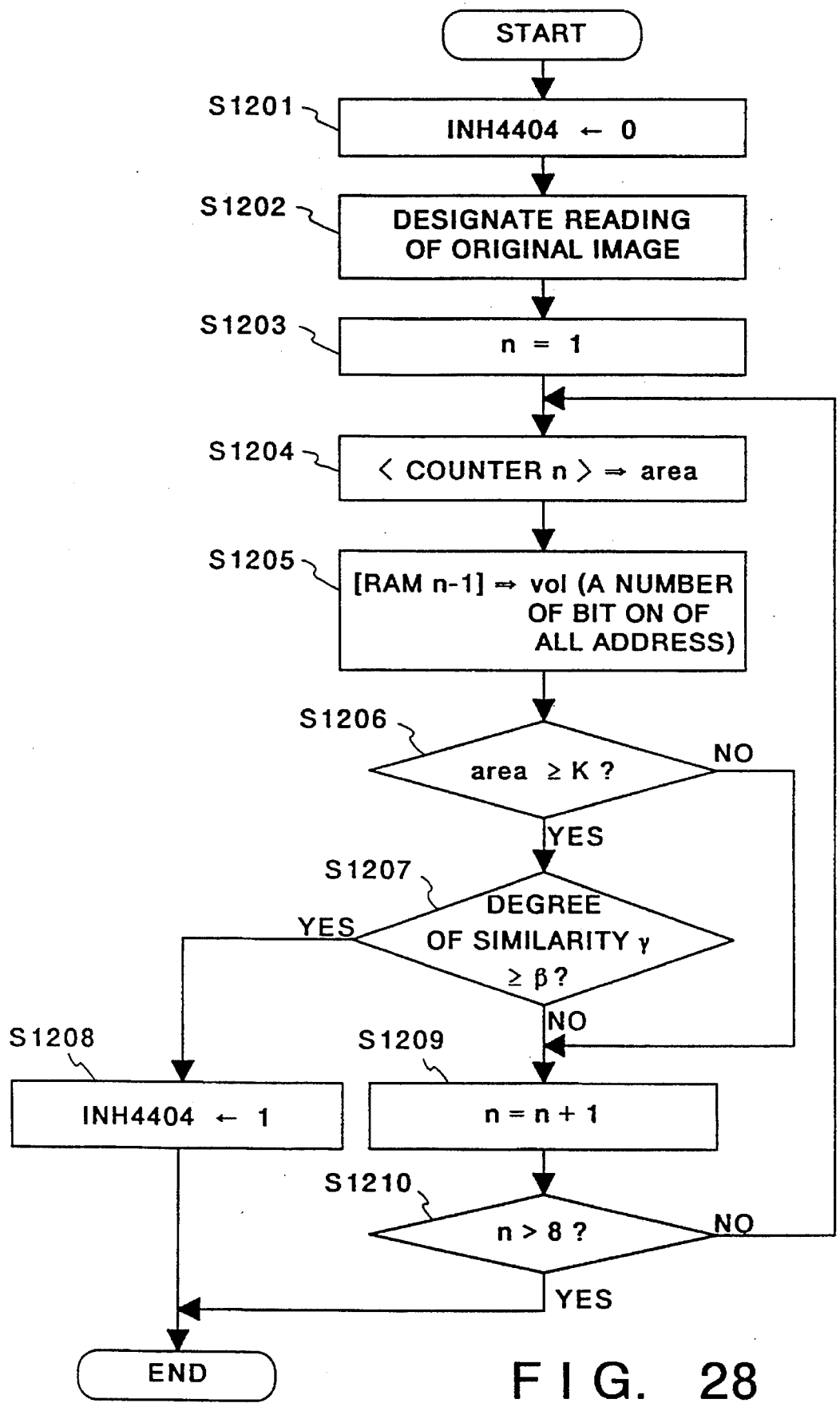
FIG. 28 is a flowchart for describing a operation for judging degree of similarity according to the seventh embodiment.

FIG. 28 is a flowchart for describing the operation performed by the CPU according to the seventh embodiment.

First, when information indicative of the start of reading of an original is sensed, an INH 4404 signal indicating the start of reading of the original is set to "0" at step S1201. Thereafter, reading of the original is designated at step S1202. A variable n is set to 1 at step S1203. That is, the counter value of an $n^{th}$ counter is successively stored in the RAM 4512. Next, at step S1204, the value in the counter of FIG. 21B which, in this case, is the counter 4521 because n=1 holds, is read, and this value is stored as a variable area set in the RAM 1512. Then, at step S1205, the total number of 1's stored as the bit (n–1) in the RAM 4512 of FIG. 21B is calculated, and this value is set as a variable vol. Here the volume vol is a value which indicates the volume of the slanted-line portion in FIG. 24. In other words, vol=$T_{jd}$.

It is determined at step S1206 whether the value of the variable area exceeds a predetermined constant K.

The value of the variable area corresponds to the number of pixels in the recognition zone shown in the slanted-line portion of FIG. 27. Accordingly, by comparing the value of the variable area with the constant K, it is determined whether or not there is a possibility that the original is a bank-note original. In other words, if variable area>K holds, then it is judged that there is a possibility that the original is a bank-note original.

Next, at step S1207, the value of the variable vol set at step S1205, and the degree of similarity r (indicated by equation 5 shown below) of the observed image data in the color space and the image data in the specific original are calculated, and r is compared with the constant $\beta$.

In FIG. 24, $T_{ORG}$ represents the image data (hereinafter referred to as "specific image data") of an already registered specific original. $T_{ORG}$ corresponds to the slanted-line portion expressed in R, G, B space and indicates the volume in R, G, B coordinate space. $T_{jd}$ represents image data (hereinafter referred to as "observed image data") of a read original. $T_{jd}$ corresponds to the slanted-line portion, in which the observed image data for which the output signals of the comparing arithmetic units 5001–5008 become "1" is expressed in R, G, B space, and indicates the volume in R, G, B coordinate space. The degree of similarity r in this case is indicated by the following equation:

$$r = \frac{T_{jd}}{T_{ORG}} \quad (5)$$

This means that the more the value of the degree of similarity r approaches 1, the higher the similarity between the observed image data and the specific image data.

By establishing the relation vol=$T_{jd}$, $$r = \frac{vol}{T_{ORG}} \leq \gamma \quad (6)$$

is judged (where $\gamma$ is a constant determined by experimentation and indicates the matching factor in color space; here $\gamma = 0.7$ is assumed to hold). If Eq. (6) holds true, the similarity between the observed image data and the specific image data is high and it is decided that duplication of the original should be prohibited.

The specific-original judging unit 4403 constructed as set forth above judges, based upon the inputted R, G, B signals, whether the input image signal contains image data of a registered original. INH 4404 represents a judgment signal indicative of the judgment made by the specific-original judging unit 4403. This signal is set at "0" at the start of reading of an original, and at "1" when an original has been judged to be a specific original. It is set at "0" at all other times. By providing a plurality of threshold values of Eq. (6), a case can also be judged in which the input image has a possibility of being a specific original. In a, case where it is judged that such a possibility exists, "2" may be set.

If the INH 4404 signal is "0", an ordinary output signal is sent to the printer 4202, which proceeds to perform an ordinary copying operation. If the INH 4404 signal is "1", the INH 4404 signal is sent to the printer 4202 along with the output signal, the image forming operation is suspended from this moment onward and the copying paper is ejected. In a case where the INH 4404 signal has been set at "2" upon taking possibility into account as described above, an arrangement may be adopted in which appropriate smoothing is applied to the output Y, M, C, K signals and supplying the printer 4202 with data blurred enough to distinctly distinguish the copy from the original.

Figure 21E:
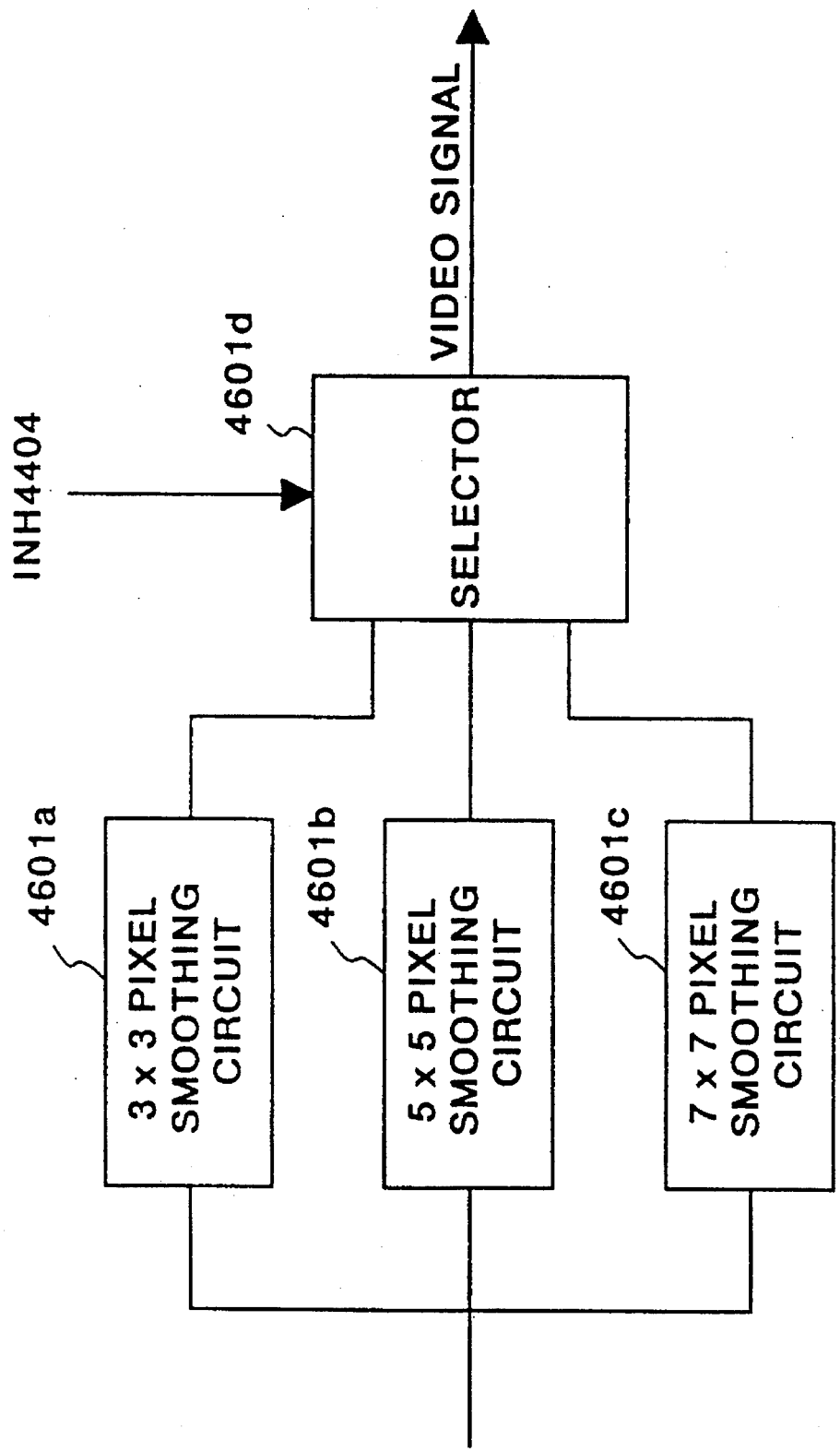
FIG. 21E is a block diagram showing the construction of a smoothing circuit according to the seventh embodiment.

Accordingly, the smoothing circuit 4016 of FIG. 21E can be constituted by well-known smoothing filters. In FIG. 21E, numerals 4601a–4601c denote smoothing filters having matrices of different sizes. Numeral 4601d denotes a selector.

A frame-sequence video signal received from a 4×4 masking circuit 4104 is smoothed by the plurality of smoothing filters 4601a–4601c, and the smoothed signals are sent to the selector 4601d. In accordance with the judgment signal INH 4404 from the specific-original judging Unit 4403, the selector 4601d selects whichever of the plurality of smoothed signals conforms to the INH 4404 signal and delivers the selected signal to the printer 4202. In response, the printer 4202 performs an ordinary copying operation and outputs a blurred image. In other words, if there is the possibility that an original contains a specific original, n (2 through n) types of INH 4404 signals are generated in accordance with the degree of similarity, and these signals are sent to the color-signal processor 4402. The higher the possibility that an original contains a specific original, the more the outputted image can be blurred, in conformity with the INH 4404 signal.

An arrangement may be adopted in which a pitchblack image is outputted in a case where a specific original is clearly present.

In steps 1209 to 1210, the above-mentioned process is repeated about eight types of specific originals.

In accordance with the seventh embodiment, as described above, a plurality of specific original are judged. As a result, high-speed judgment is possible and judgments can be made in real-time in prescanning, by way of example.

Further, in accordance with the seventh embodiment, processing can be changed based upon the results of judging, namely the degree of a judgment by n type INH 4404. This makes it possible to provide an effect in which an erroneous judgment is eliminated in a case where a suspicious original is inputted as an original image.

Figure 29A:
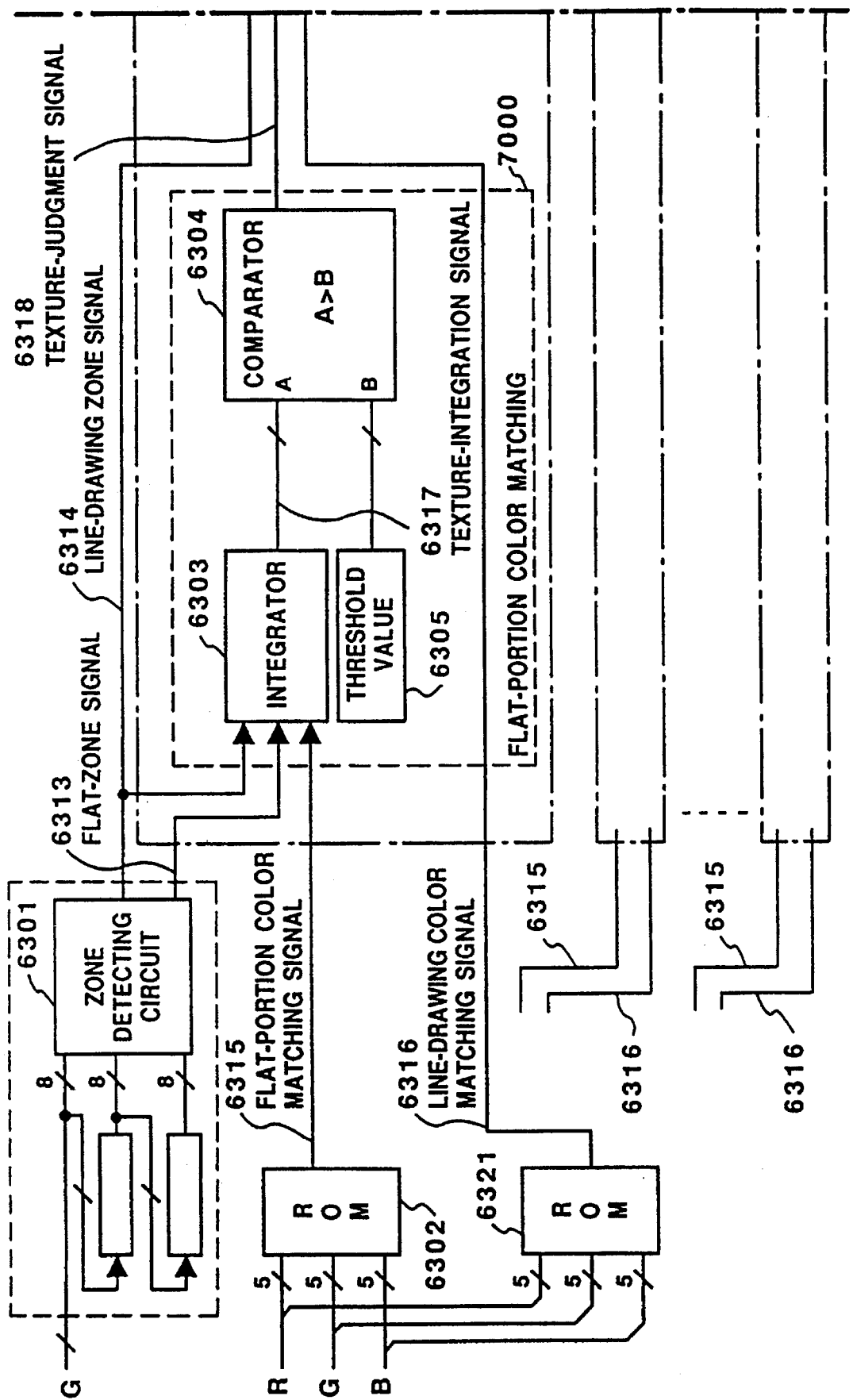
FIGS. 29A and 29B are block diagrams showing the construction of an image processing apparatus according to the seventh embodiment.
Figure 29B:
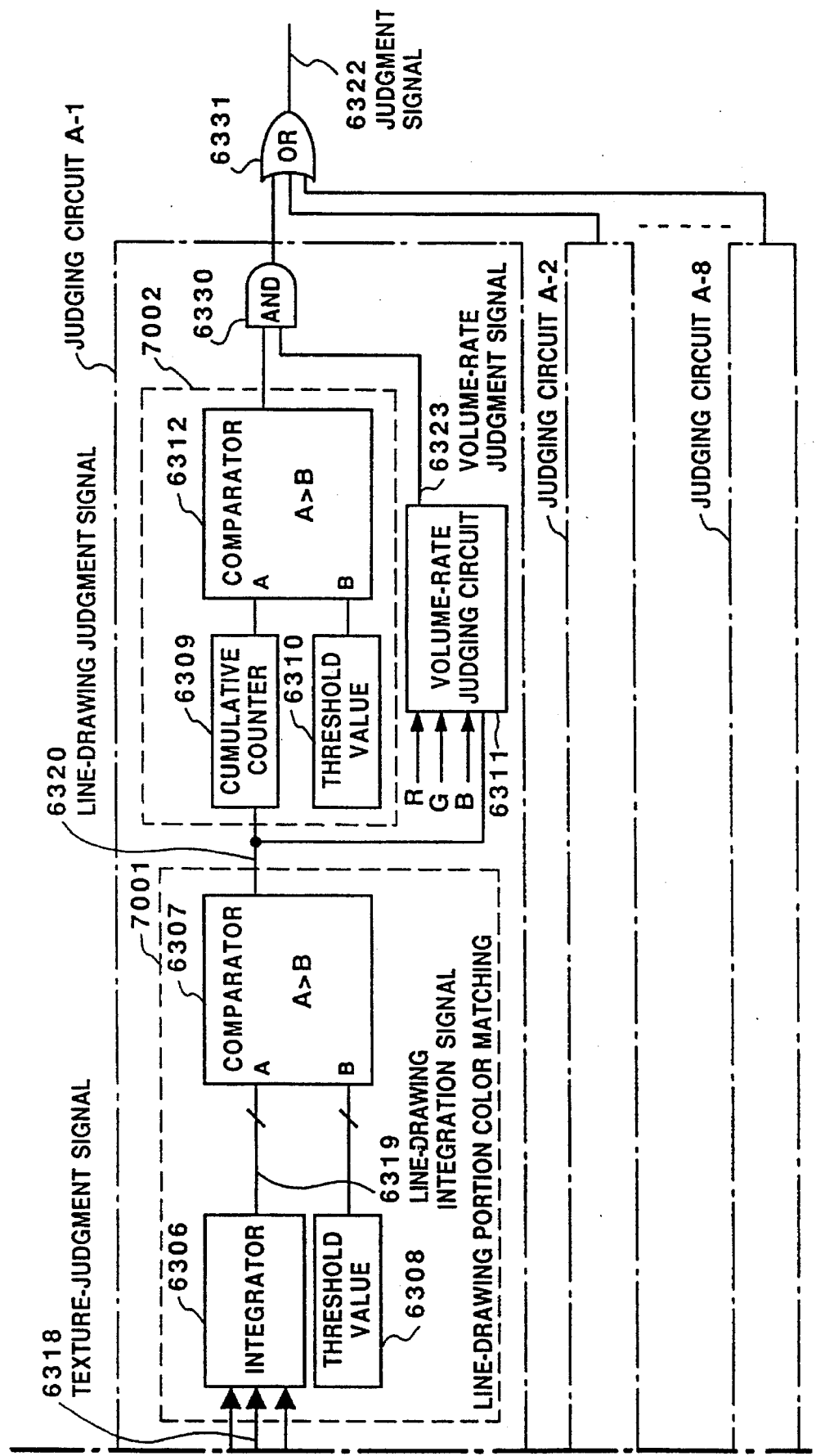

FIGS. 29A and 29B are block diagrams showing the circuit construction of the specific-document judging unit 4403 according to the seventh embodiment.

In FIGS. 29A, 29B, numeral 6301 denotes an identifying circuit for identifying a flat zone (including half-tone portion) and a line-drawing zone of an original image inputted in real-time. For example, identifying pixel by pixel is performed in accordance with the size of edge component. Numeral 6302 denotes a ROM (read-only memory) storing color data indicative of the texture of a specific original. The ROM 6302 stores data for carrying out matching in the color space shown in FIG. 21A. FIG. 21B illustrates the constitution of the ROM 6302, in which "1" is written in a case where the color of a flat portion of a specific original exists in RGB color space, and "0" is written in the absence of the color of a flat portion. The five higher order bits of each of the colors R, G, B of an input original enter the address lines of the ROM 6302. The latter outputs "1" as a flat-portion color matching signal 6315 in a case where the R, G, B signals match the color data of the texture portion of a specific original, and outputs "0" as the flat-portion color matching signal 6315 when there is no matching. A ROM 6321 stores color data indicative of a line-drawing portion of a specific original. The ROM 6321 stores data for carrying out matching in the color space shown in FIG. 22. The ROM 6321 outputs "1" as a line-drawing portion color matching signal 6316 in a case where the R, G, B signals match the color data of the line-drawing portion of a specific original, and outputs "0" as the line-drawing portion color matching signal 6316 when there is no matching.

The outputted matching signals 6315, 6316 enter eight color matching units (for judging eight types of specific originals in parallel). Judging circuits A-1 through A-8 have the same construction, and therefore only the judging circuit A-1 will be described as a typical example.

An integrator 6303 executes processing for integrating the flat-portion color masking signal relating to the texture of a specific original.

Figure 31:
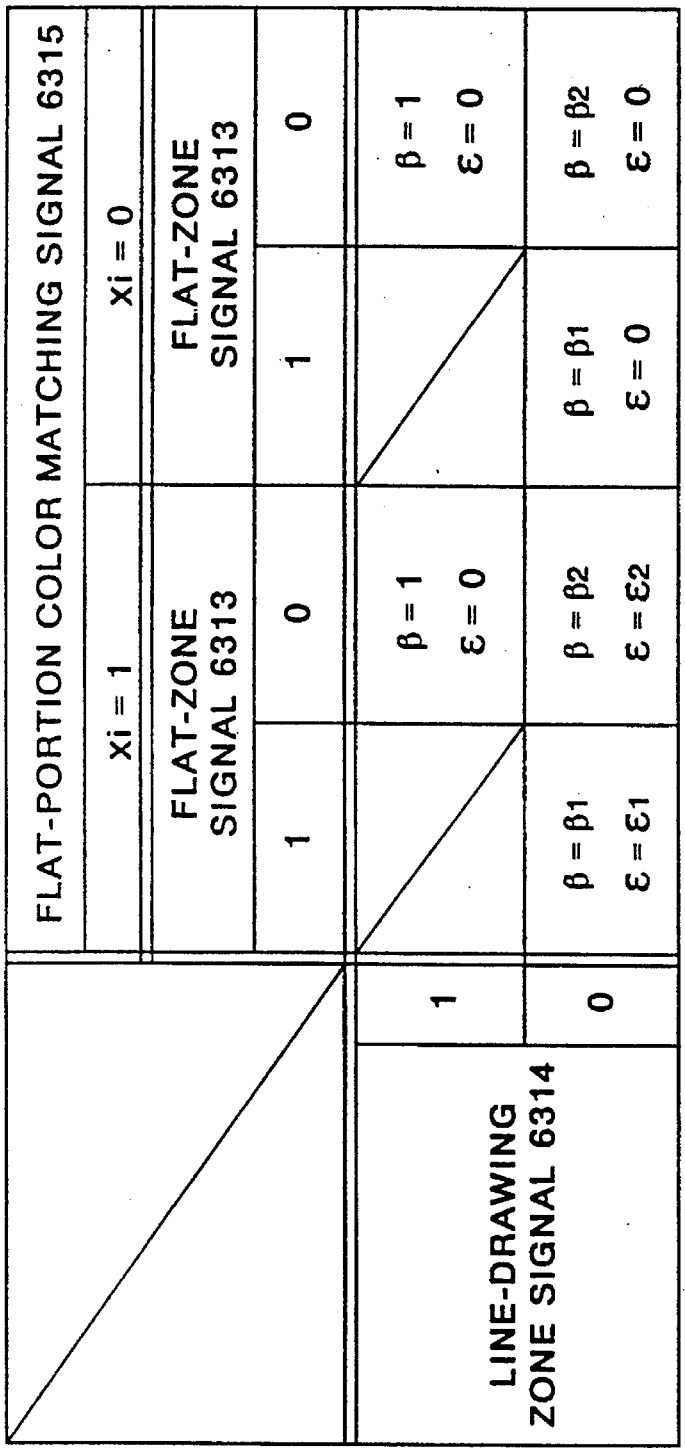
FIG. 31 is a diagram illustrating the integration coefficients of the integrator according to the seventh embodiment.
Figure 33:
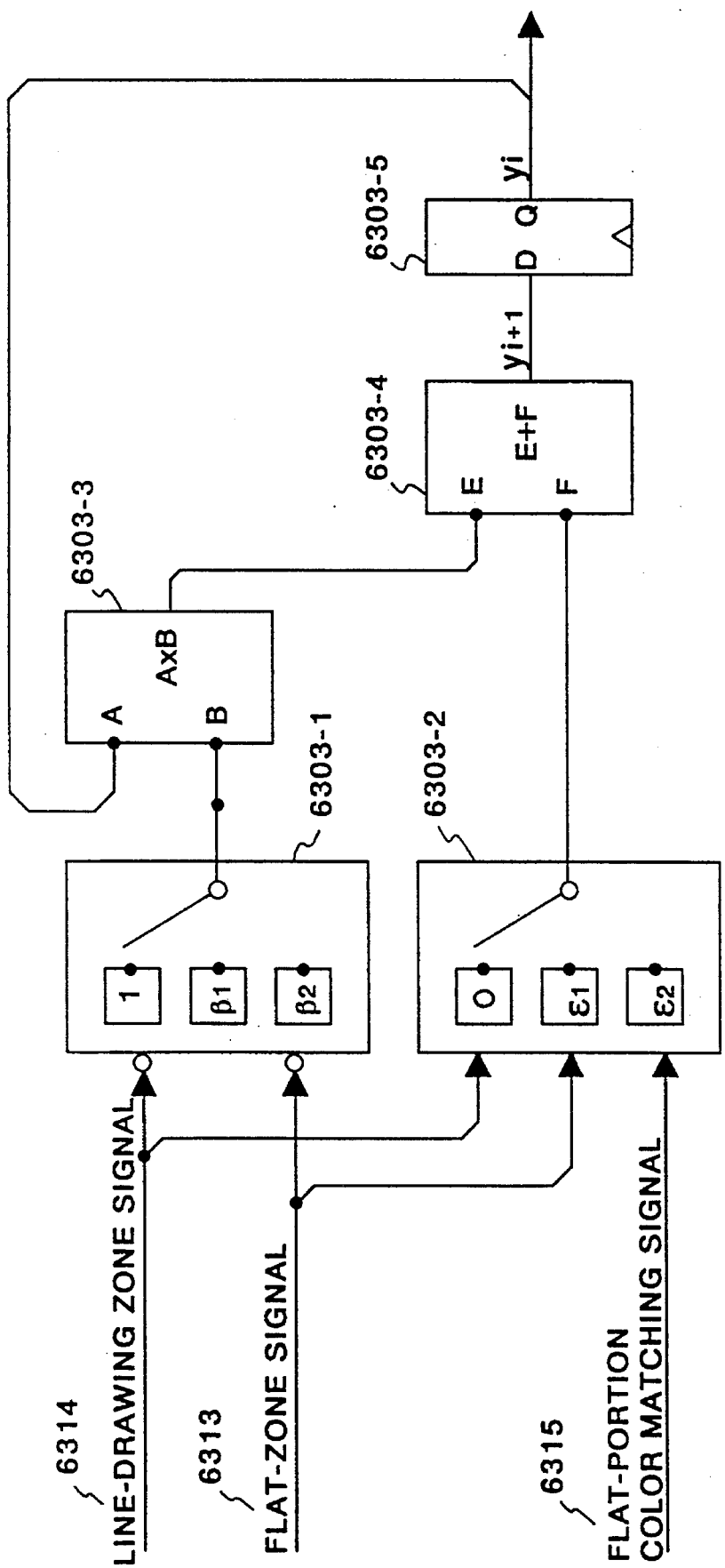

FIG. 31 is a diagram illustrating the integration coefficients of the integrator 6303, and FIG. 33 is a diagram illustrating the circuit construction of the integrator 6303.

In FIG. 33, numeral 6303-1 denotes a ROM for generating the coefficient $\beta$ in FIG. 22 described above. A line-drawing zone signal 6314 and a flat-zone signal 6313 are applied to the ROM 6303-1 as address input signals, and the ROM selects and outputs one of the coefficients $\beta_1$, $\beta_2$, 1 (where $0<\beta_2<\beta_1<1$ is assumed to hold) shown in the table of FIG. 31. Numeral 6303-2 denotes a ROM for generating the input signal $x_i \times 255$ $(1-\beta)$ [$=\epsilon$ in the assumption of this embodiment) of the adder in FIG. 22 described earlier. The line-drawing zone signal 6314, the flat-zone signal 6313 and the flat-portion color matching signal 6315 are applied to the ROM 6303-2 as address input signals, and the ROM selects and outputs one of the coefficients $\epsilon_1$, $\epsilon_2$, 0 shown in the table of FIG. 31. Numerals 6303-3, 6303-4 and 6303-5 denote a multiplier, an adder and a latch circuit, respectively.

In a case where the value of the flat-portion color matching signal 6315 continues at "1" when the flat-zone signal 6313 is true (="1"), the value of a texture integration signal 6317 approaches 255 owing to the integration processing performed by the integrator 6303. In a case where the value of the flat-portion color matching signal 6315 continues at "0", the value of the texture integration signal 6317 approaches "0".

Numeral 6306 denotes an integration processing circuit related to the line-drawing portion color matching signal 6316.

FIG. 32 is a diagram illustrating the integration coefficients of the integrator 6306, and FIG. 34 is a block diagram illustrating the circuit construction of the integrator 6306. The construction of the integrating circuit of FIG. 34 is substantially the same as that of FIG. 33, and integration processing is performed based upon the predetermined coefficients shown in FIG. 32. In FIG. 34, 6306-1, 6306-2 represents selectors, and numerals 6303-3, 6303-4 and 6303-5 denote a multiplier, an adder and a latch circuit, respectively.

In a case where a texture-judgment signal 6318 is "1", namely a case where a line-drawing portion having a color the same as that of a line-drawing portion of a specific original exists continuously in the vicinity of a flat zone of an input original having a color the same as that of the texture portion of the specific original, a line-drawing integration signal 6319 approaches 255; otherwise, the line-drawing integration signal 6319 approaches 0.

FIG. 30 is a diagram for conceptually describing FIGS. 29A and 29B.

In FIG. 30, numeral 6302 denotes a flat-portion color template which stores color information indicative of the flat portion of a specific original serving as a reference for matching, and numeral 6321 denotes a line-drawing portion color template which stores color information indicative of the line-drawing portion of the above-mentioned specific original. Both of these templates are constituted by ROMs.

Items of color information indicative of the texture portion of the specific original and color information indicative of the line-drawing portion of the specific original, both of which have been sampled in advance by a template-information creating unit 7003, are set in each of the templates 6302, 6321 as color-distribution information in the color space.

The template-information creating unit 7003, which is constituted by a CPU, samples color-distribution in the color space of the specific original when the specific original is read in from the above-mentioned reader, and writes this information in the templates 6302, 6321, which are constituted by RAMs. As a result, color-distribution information indicative of a specific original whose duplication is to be inhibited can be created by the system itself and set in the templates 6302, 6321.

On the basis of the zone signals 6313, 6314 detected by the zone detecting unit 6301, color matching processing (described earlier) is carried out with regard to each of the flat and line-drawing portions by a flat-portion color matching unit 7000 and a line-drawing portion color matching unit 7001. The line-drawing portion color matching unit 7001 operates in such a manner that the line-drawing integration signal 6319 increases only when the texture-judgment signal 6318 is true (="1").

A judgment signal 6322 is indicative of the fact that an original is a specific original only when judgment signals from a pixel-counter judging unit 7002 and a judgment signal from a volume-ratio judging unit 6311 are both true (="1").

Figure 35A:
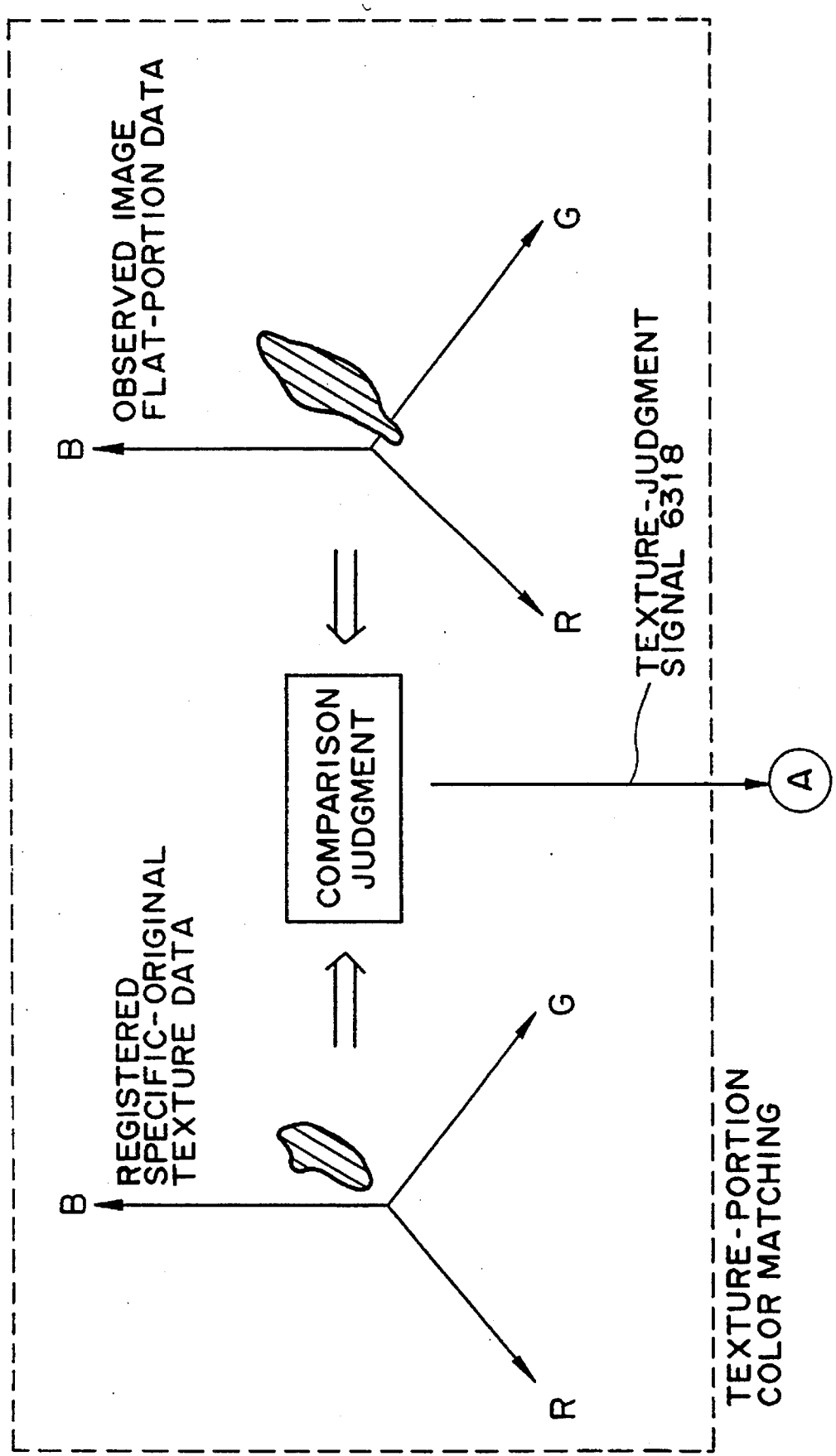
FIGS. 35A and 35B are conceptual views in which the processing performed by the circuit of FIGS. 29A, 29B is described in R, G, B color space.
Figure 35B:
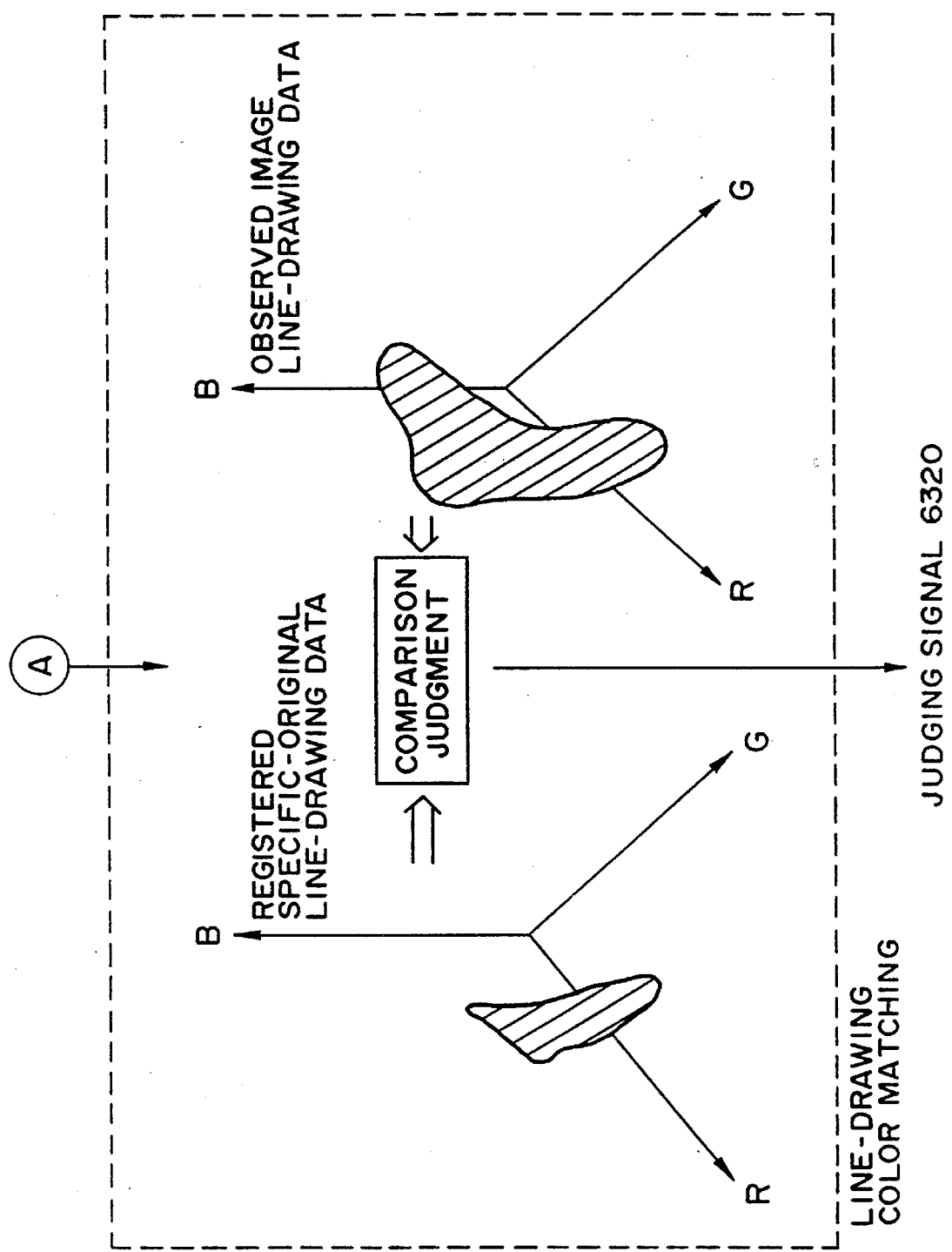

FIGS. 35A and 35B are views conceptually illustrating, in R, G, B color space, the processing performed by the circuit of FIGS. 29A, 29B.

Color matching processing of a texture portion (the flat portion of the image signal) is performed using the observed image (the input color signal) and texture data that has been registered in the template 6302, and processing is performed in such a manner that the line-portion integration signal 6319 increases only in a case where the texture-judgment signal 6318 is true (="1").

In other words, the judgment signal 6320 becomes true (="1") only if a line drawing of a specific color is contained within a texture portion of a specific color.

Description of the zone detecting circuit 6301

Figure 36:
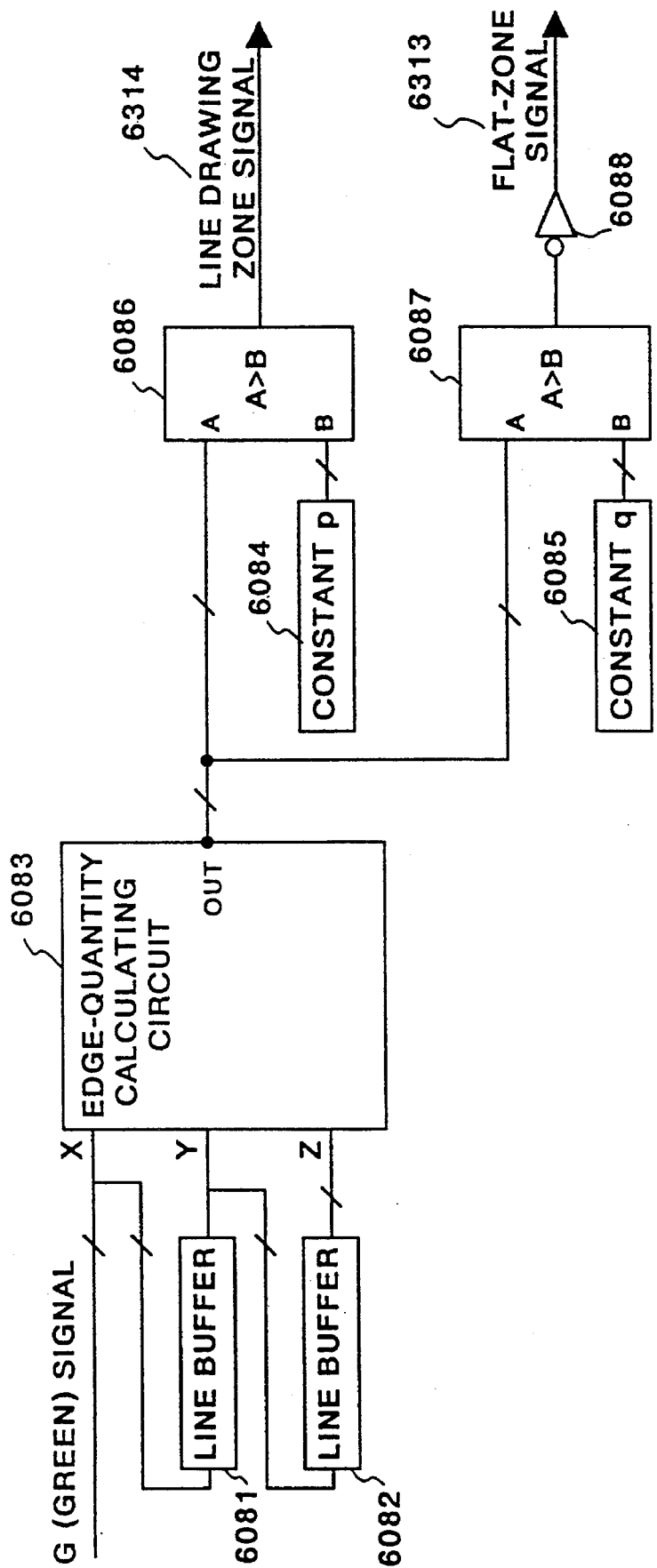
FIG. 36 is a block diagram for describing the construction of a zone detecting circuit according to the seventh embodiment.
Figure 37:
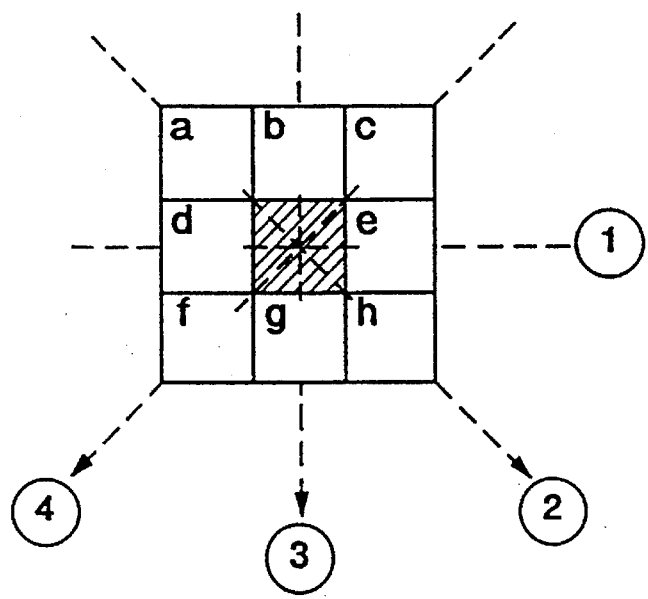
FIG. 37 is a diagram for describing the operation of the zone detecting circuit of FIGS. 29A and 29B.

FIG. 36 is a block diagram for describing the construction of the zone detecting circuit 6301, and FIG. 37 is a diagram for describing the operation of the zone detecting circuit 6301 of FIGS. 29A and 29B. Further, FIGS. 42A–42D are diagrams for describing image patterns in which an edge quantity signal OUT is calculated to be large.

In FIG. 36, numerals 6081, 6082 denote line buffers for applying a delay of one line to a pixel, 6083 an edge-quantity calculating circuit for calculating an edge quantity in this embodiment, 6086, 6087 comparators for comparing the output of the edge-quantity calculating circuit 6083 with different constants p, q, respectively, and 6084, 6085 registers in which the constants applied to the comparators 6086, 6087 are stored, respectively. It should be noted that the constants stored in the registers 6084, 6085 may be values applied from other components, in which case the registers 6084, 6085 can be deleted.

Figure 38A:
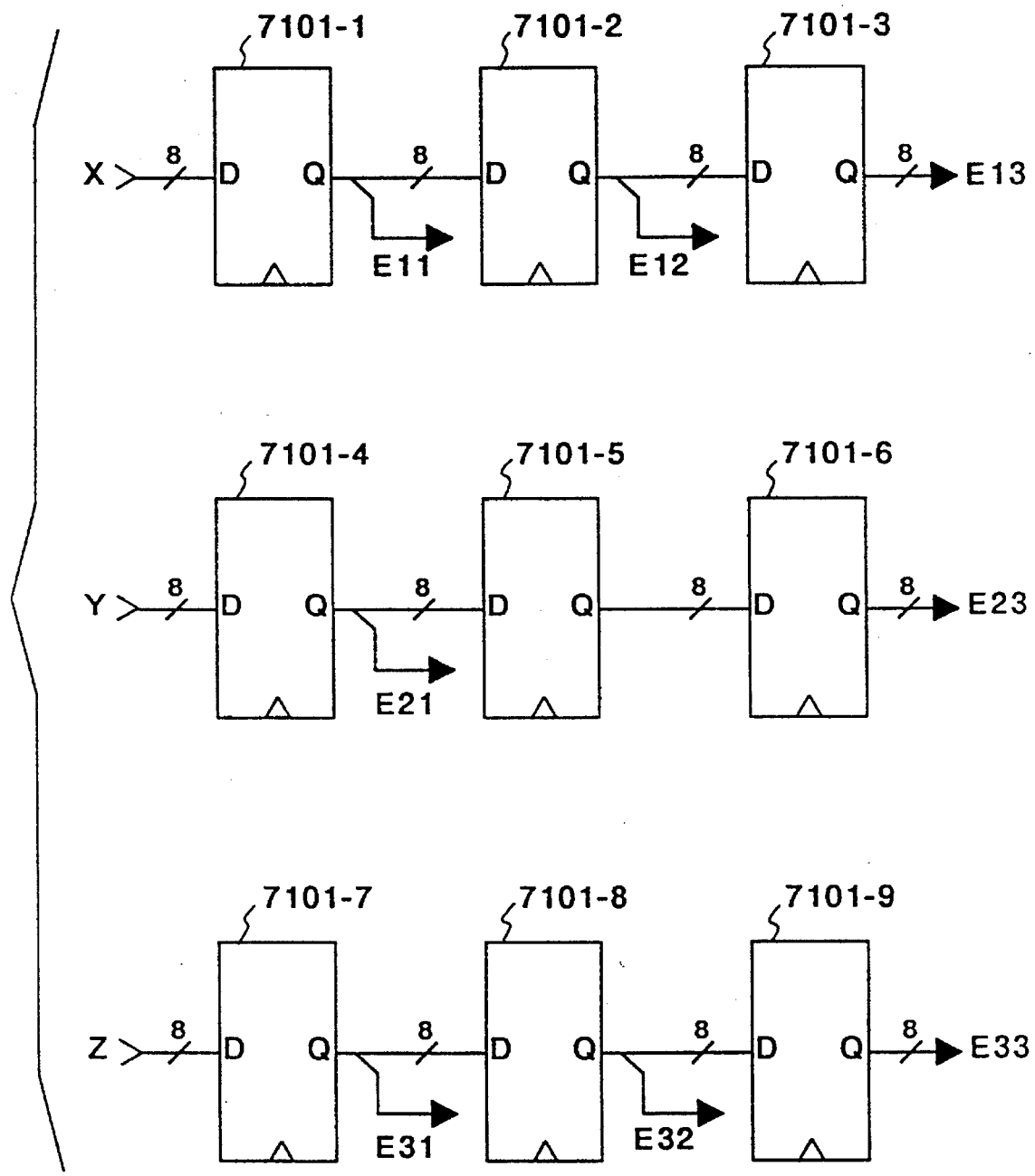
FIGS. 38A and 38B are block diagrams showing the construction of an edge calculating circuit according to the seventh embodiment.
Figure 38B:
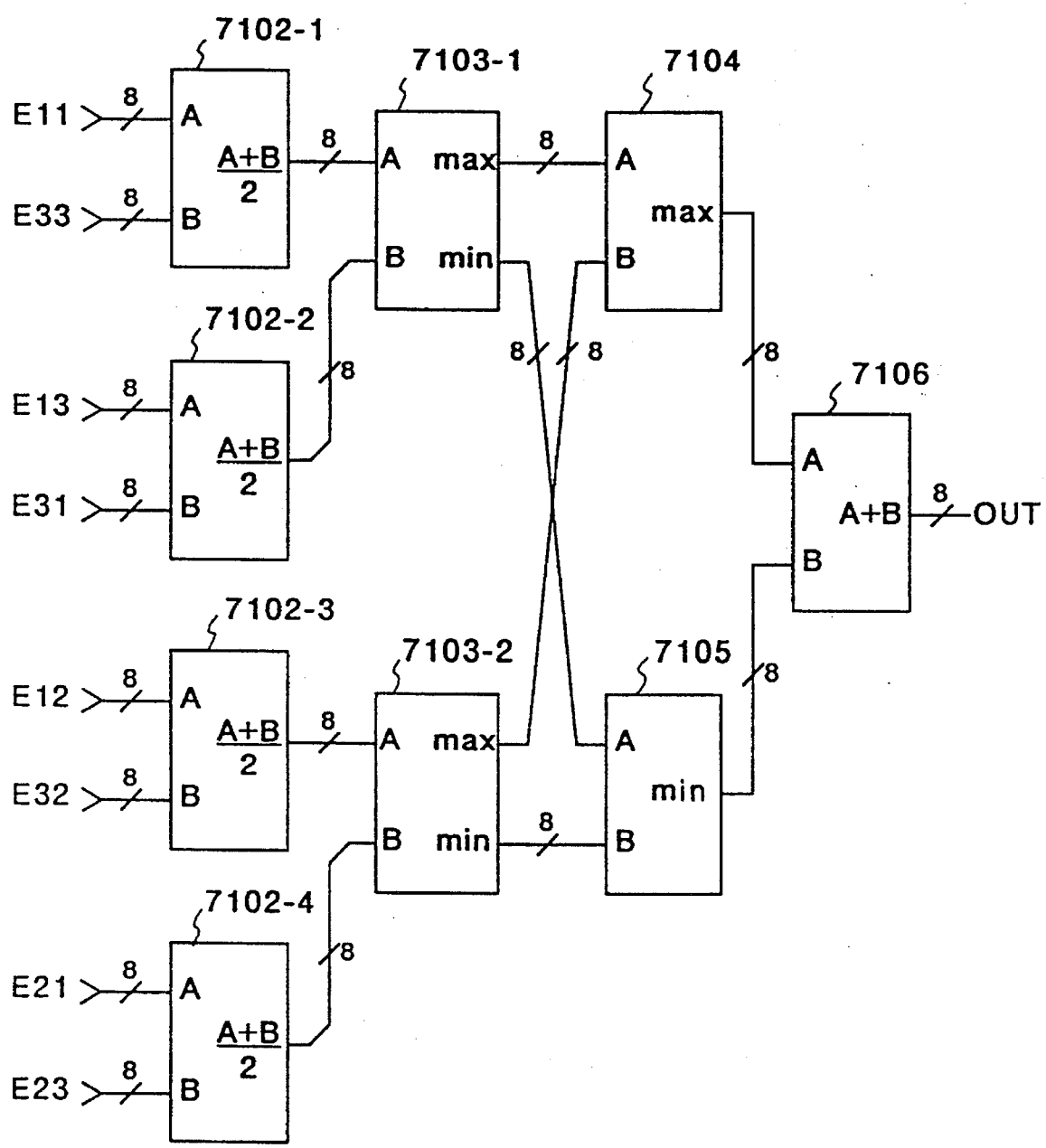
Figure 39:
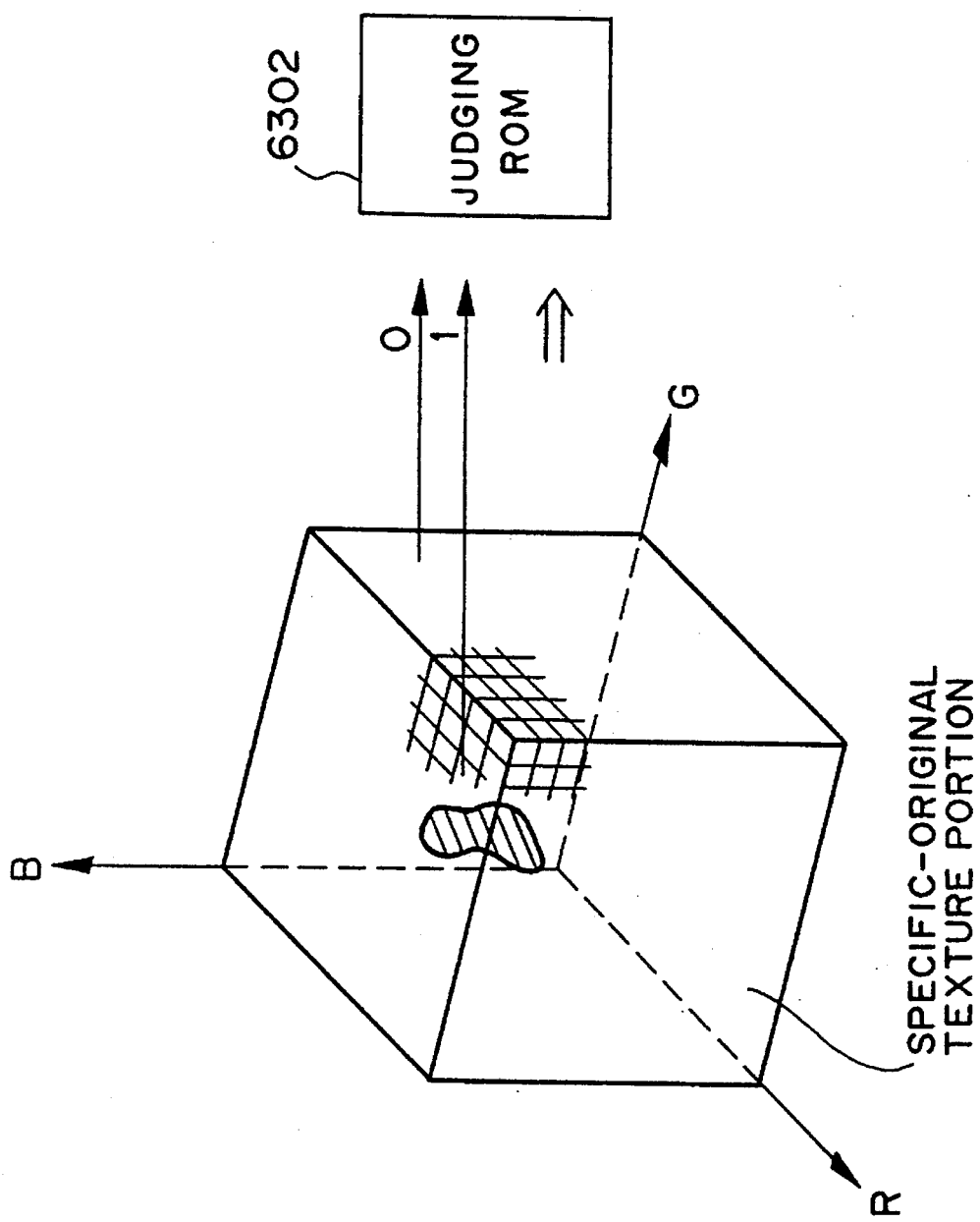
FIG. 39 is a diagram showing the relationship between color-space data of the texture of a specific original and data in judging ROM according to the seventh embodiment.
Figure 40:
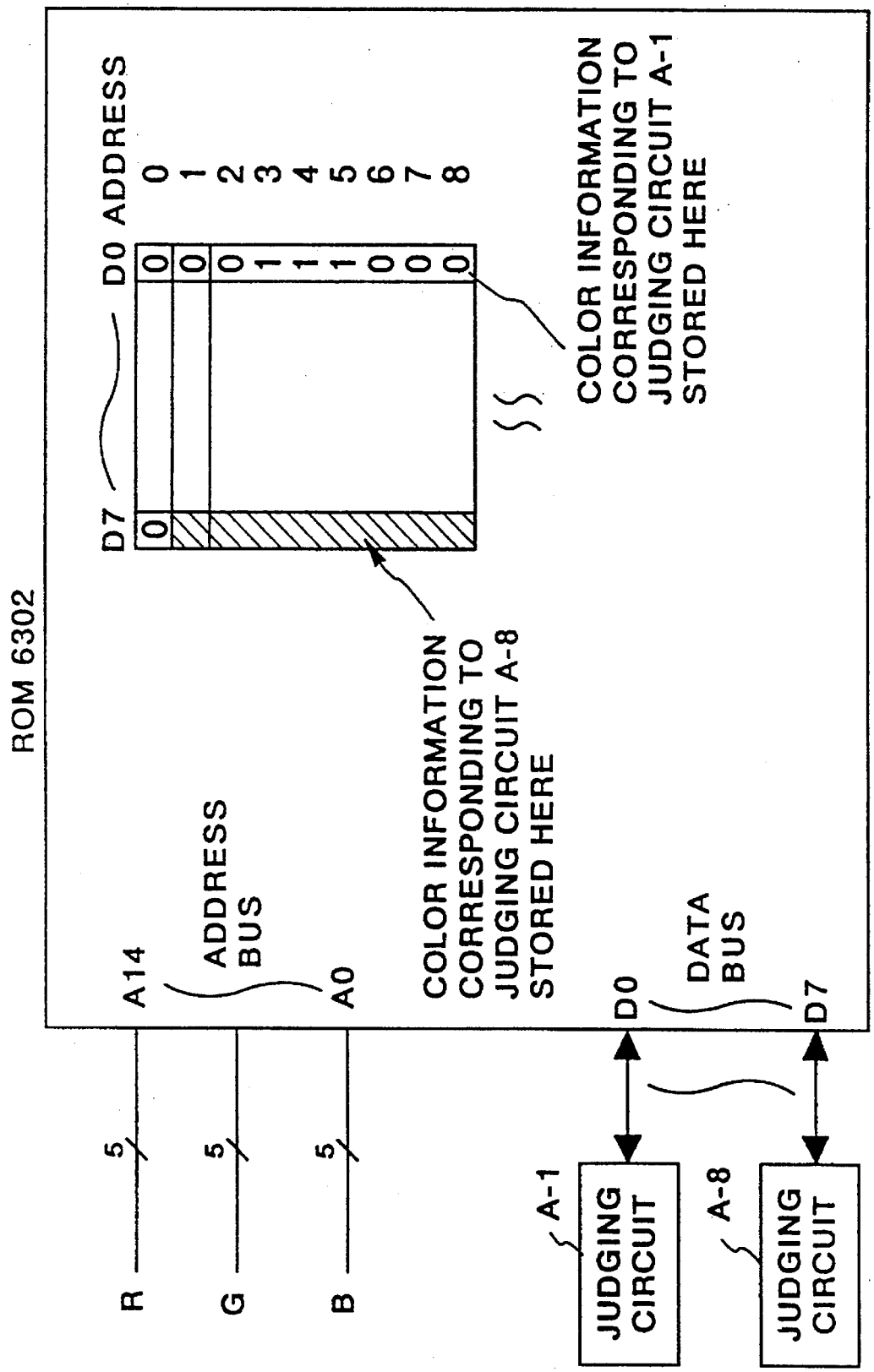
FIG. 40 is a block diagram showing the construction of the ROM according to the seventh embodiment.
Figure 41:
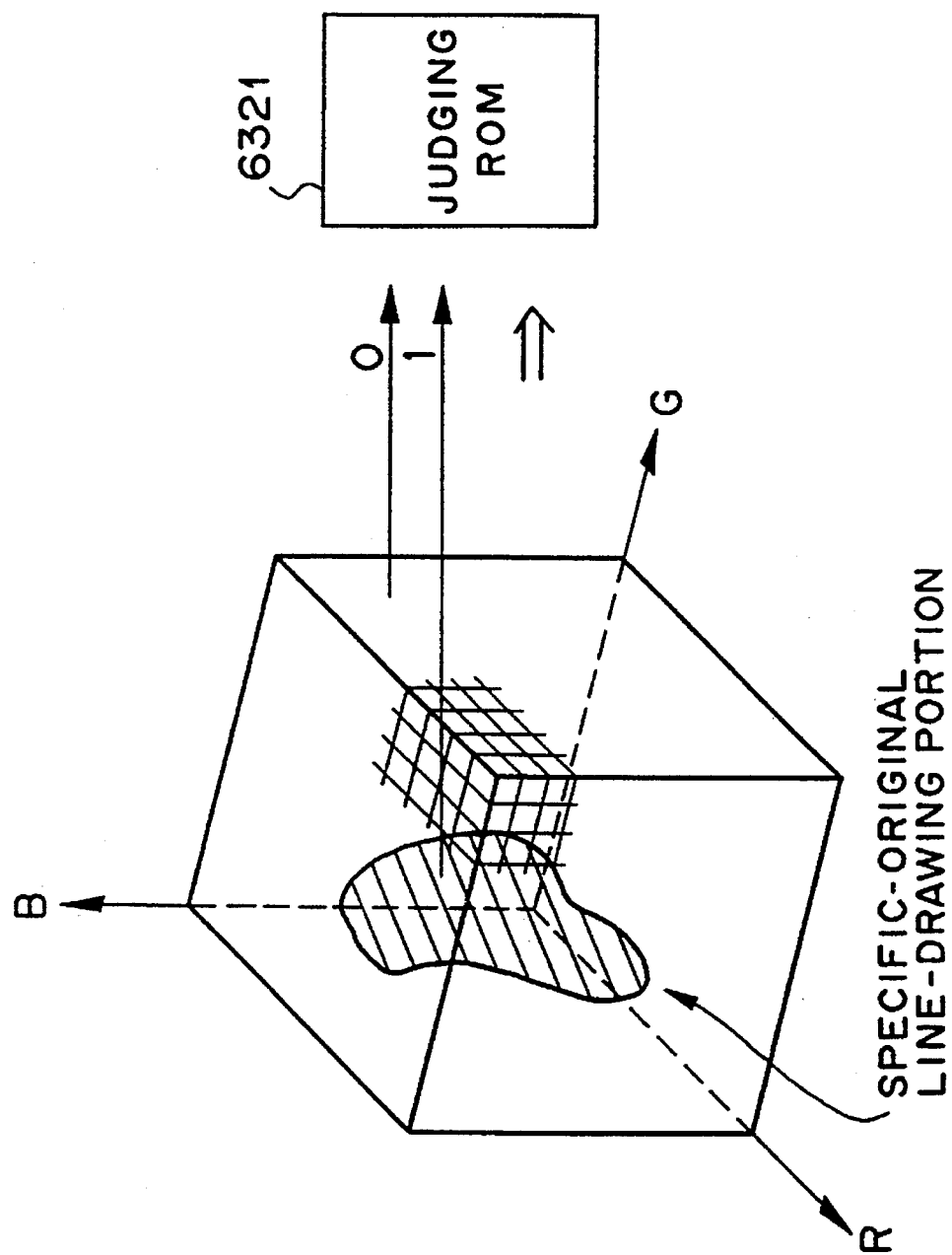
FIG. 41 is a diagram showing the relationship between color-space data of the line-drawing portion of a specific original and data in judging ROM according to the seventh embodiment.
Figure 42D:
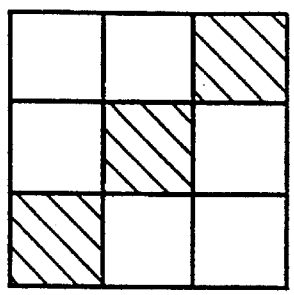
FIGS. 42A–42D are diagrams for describing image patterns in which edge quantity OUT is calculated to be large in accordance with the seventh embodiment.
Figure 42C:
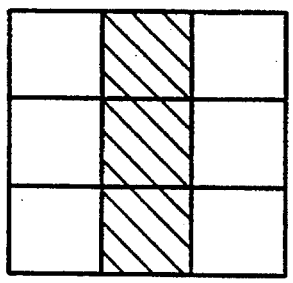
Figure 42B:
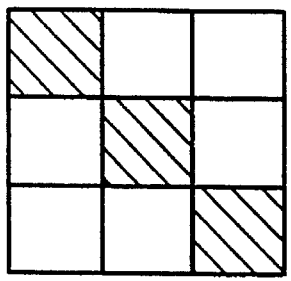
Figure 42A:
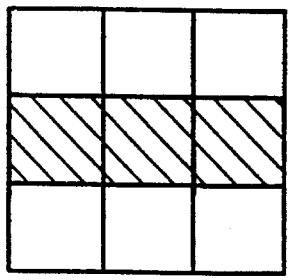

FIGS. 38A and 38B are block diagrams showing the edge-quantity calculating circuit 6083 according to the seventh embodiment. Shown in FIGS. 38A and 38B are latch circuits 7101-1 through 7101-9 for applying a delay of one pixel, arithmetic units 7102-1 through 7102-4 each for obtaining the average of the two inputs applied thereto, arithmetic units 7103-1, 7103-2 each for obtaining and outputting the largest (max) and smallest (min) of the two inputs applied thereto, an arithmetic unit 7104-1 for outputting the largest (max) of the two inputs applied thereto, an arithmetic unit 7104-2 for outputting the smallest (min) of the two inputs applied thereto, and an arithmetic unit 7106 for calculating the sum, namely (max)+(min), of the two inputs applied thereto.

The operation performed by the foregoing arrangement will now be described.

Pixel data, from input data lines X, Y, Z, delayed by the line buffers 6081, 6082 (FIG. 36) is delayed in such a manner that a 3×3 window is formed by the nine latch circuits 7101-1 through 7101-9. The state of this window is as illustrated in FIG. 37. The arithmetic operations shown in FIG. 37 are carried out by the above-mentioned arithmetic units 7102-1 through 7102-4, 7103-1, 7103-2, 7104, 7105 and 7106. As a result, the edge-quantity signal OUT is produced.

The value of the edge-quantity signal OUT calculated from the 3×3 pixel matrix having a pixel of interest at its center has an especially large value in the case of four linear patterns of the kind shown in FIGS. 42A through 42D. A specific original which is not allowed to be duplicated, which here is typified by a bank note, largely is composed of line diagrams and texture. Accordingly, the shape, namely straight-line portions, present on an original can be detected effectively by the above-described circuit arrangement. In the present invention, a case where the value of the edge-quantity signal OUT is enlarged is not limited solely to the aforementioned FIGS. 42A through 42D.

Description of the volume-ratio judging circuit)

Figure 43:
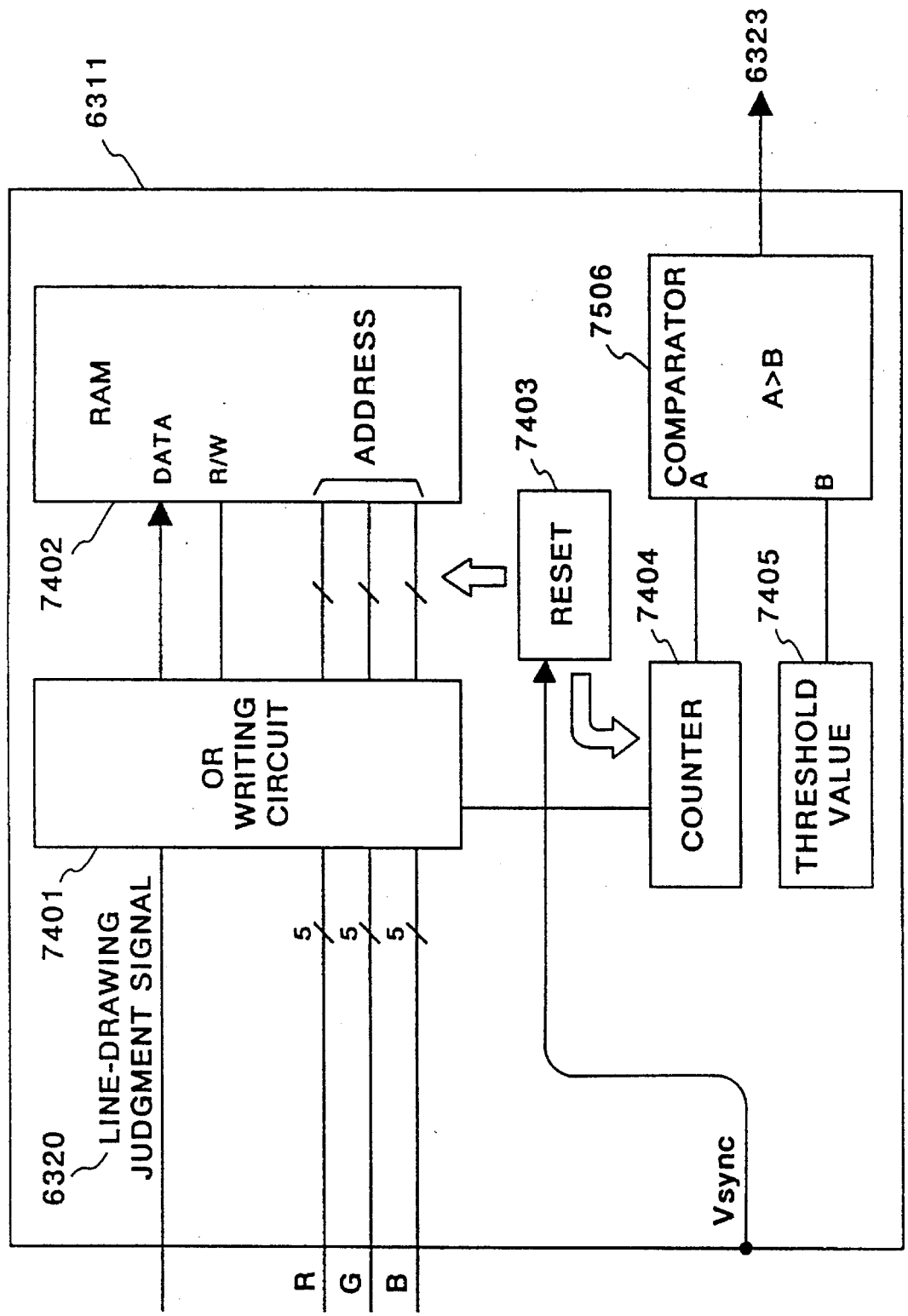
FIG. 43 is a block diagram showing a circuit for describing a volume-ratio judging circuit of FIGS. 29A and 29B.
Figure 44:
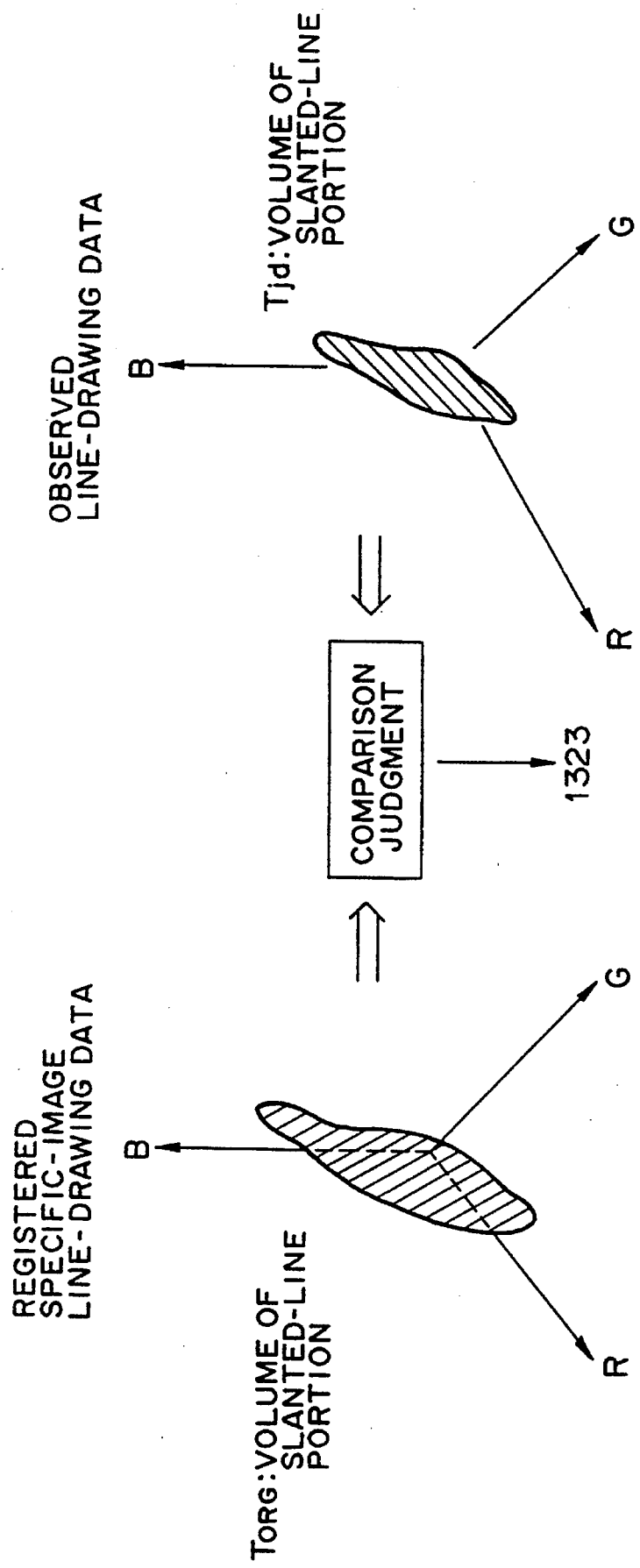
FIG. 44 is a conceptual view for describing color matching processing of a line-drawing portion in R, G, B color space.

FIG. 43 is a block diagram showing a circuit for describing the volume-ratio judging circuit of FIGS. 29A and 29B, and FIG. 44 is a conceptual view for describing color matching processing of a line-drawing portion in R, G, B color space according to the first embodiment.

In a case where the line-drawing judgment signal 6320 is "1" and the corresponding bit a RAM 7402 is in an OR writing circuit 7401 in FIG. 43, "1" is written in the corresponding bit of the RAM 7402 and a counter 7404 is incremented.

In a case where the conditions are other than those mentioned above, the OR writing circuit does not operate the counter 7404 and the RAM7402. A reset unit 7403 is for zero-clearing the RAM7402 and counter 7404. This unit operates when a read-interval signal Vsync makes a transition from high to low.

The value in the counter 7404 corresponds to the value of $U_{dj}$ shown in FIG. 44, and a volume-ratio judgment signal 6323 is produced by comparing the counter value with a threshold value 7405.

Thus, as described above, items of data relating to the color of the texture portion of a specific original and the color of a line-drawing portion of the specific original are registered beforehand, the flat zone and line-drawing zone of an input original image are identified in real-time, and a comparison is made with the pre-registered color data corresponding to each of the zones, thereby making possible more accurate identification of a specific original.

Eighth Embodiment

Figure 45:
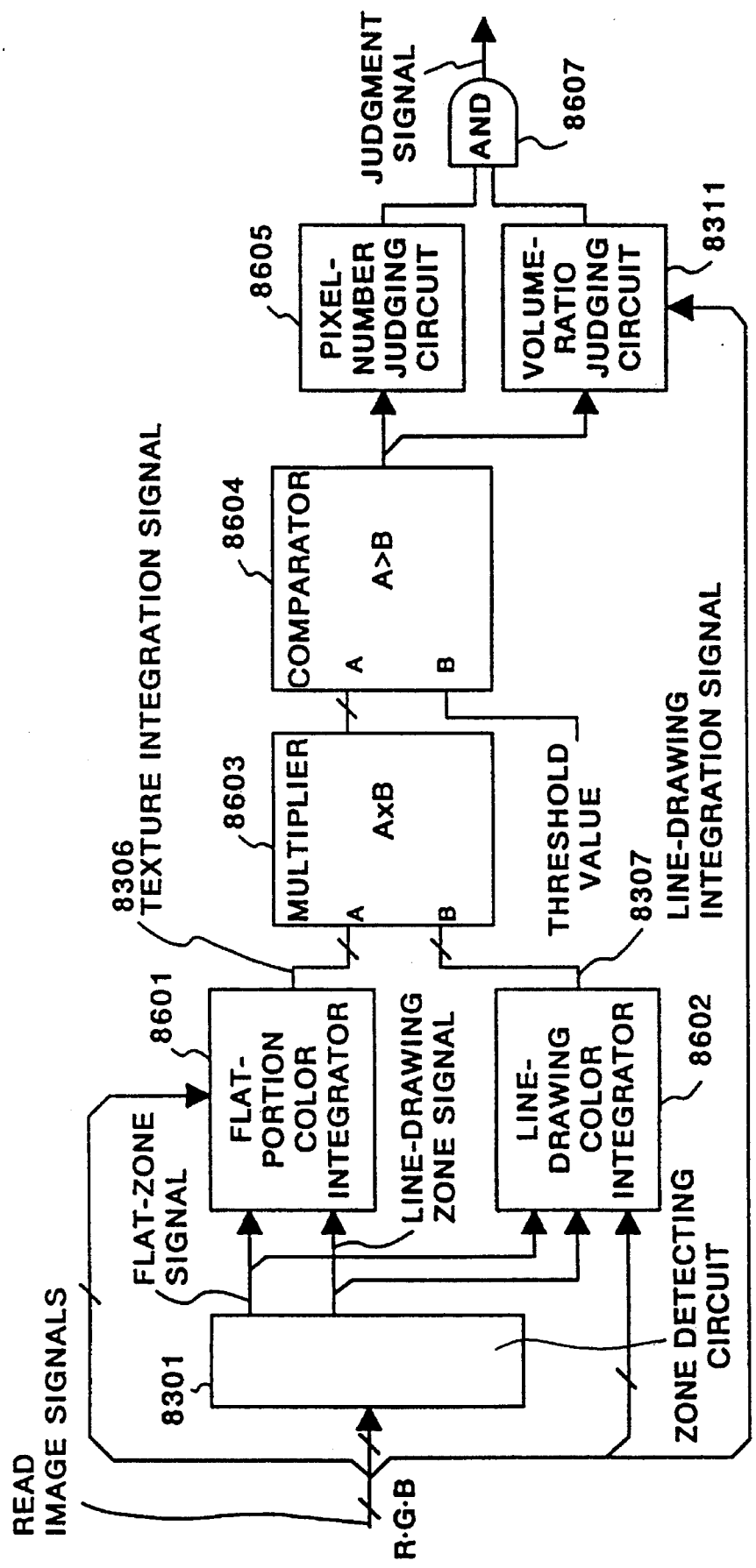
FIG. 45 is a block diagram showing the circuit construction of an image processing apparatus according to an eighth embodiment of the present invention.
Figure 47:
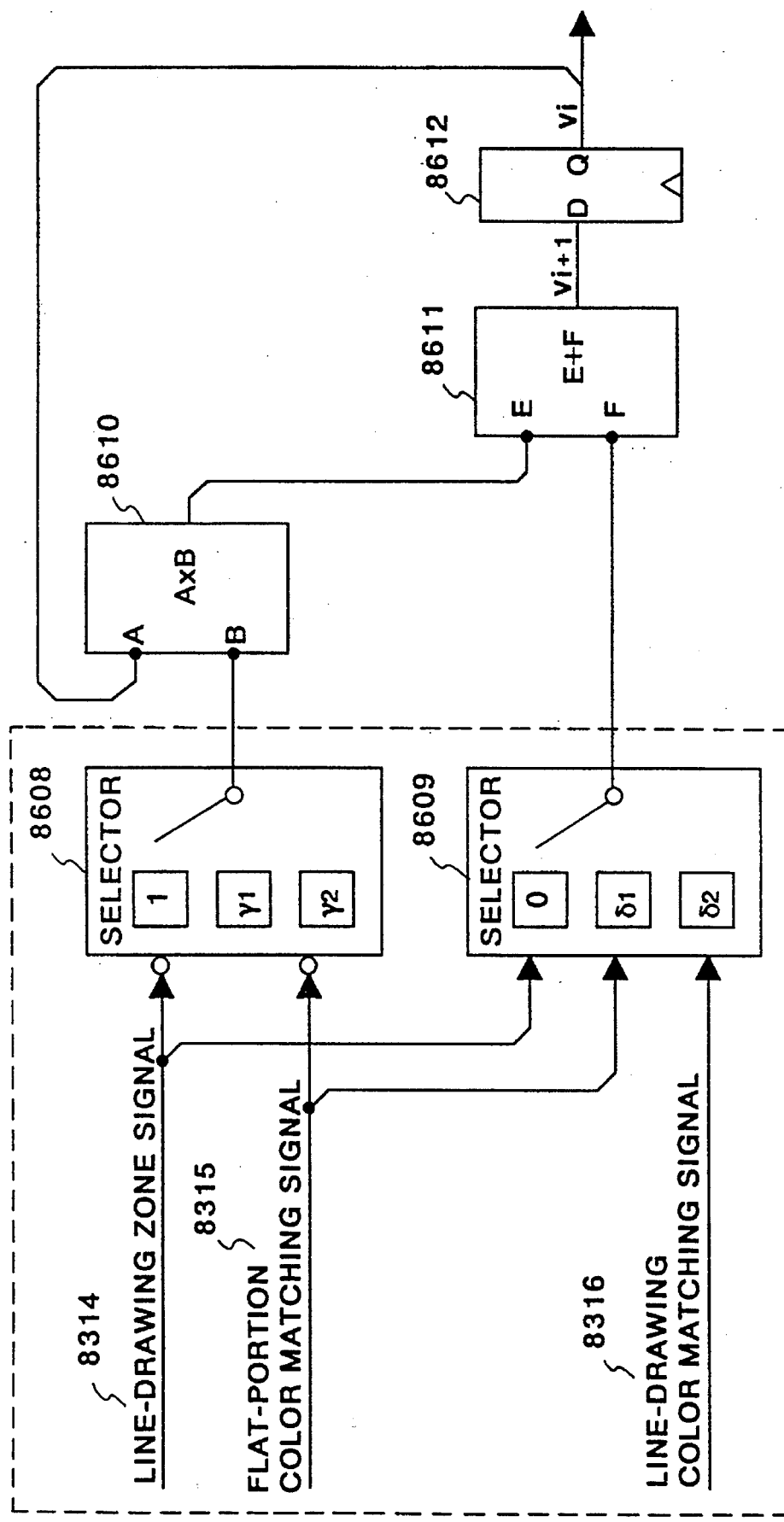
FIG. 47 is a block diagram for showing the construction of the-line-drawing portion color integrator according to the eighth embodiment.

FIG. 45 is a block diagram showing the circuit construction of an eighth embodiment of the present invention, FIG. 46 is a diagram for describing the integration coefficients of a line-drawing portion color integrator 7602 according to the eighth embodiment, and FIG. 47 is a block diagram showing the construction of the line-drawing portion color integrator 7602.

In the seventh embodiment described above, the value of the line-drawing integration signal 6319 is increased only if the texture judgment signal 6318 is true (="1").

In the eighth embodiment, calculation of the degree of color matching of a line-drawing portion is performed in parallel with calculation of the degree of color matching of a flat portion, and judgment is made based upon both matching signals.

In FIG. 45, a flat-portion color integrator 8601 executes processing similar to that of the integrator 6303 shown in FIGS. 29A, 29B and calculates a multivalued (0–255) texture integration signal 8306 which indicates the degree of color matching of a flat portion. A line-drawing color integrator 8602 executes the processing shown in FIGS. 46 and 47 and produces a line-drawing integration signal 8307. The reference numerals of other components not described are designated by references numerals in the 8000 series.

A multiplier 8603 multiplies the texture integration signal 8306 by the line-drawing integration signal 8604 and compares the product with a threshold value in a comparator 8604. If a product larger than the threshold value is obtained, a pixel-number judging circuit 8605 and a volume-ratio judging circuit 8311 obtain the number of pixels and the volume ratio using the product, these are operated upon by an AND gate 8607, and the result is outputted as a judgment signal.

Figure 48:
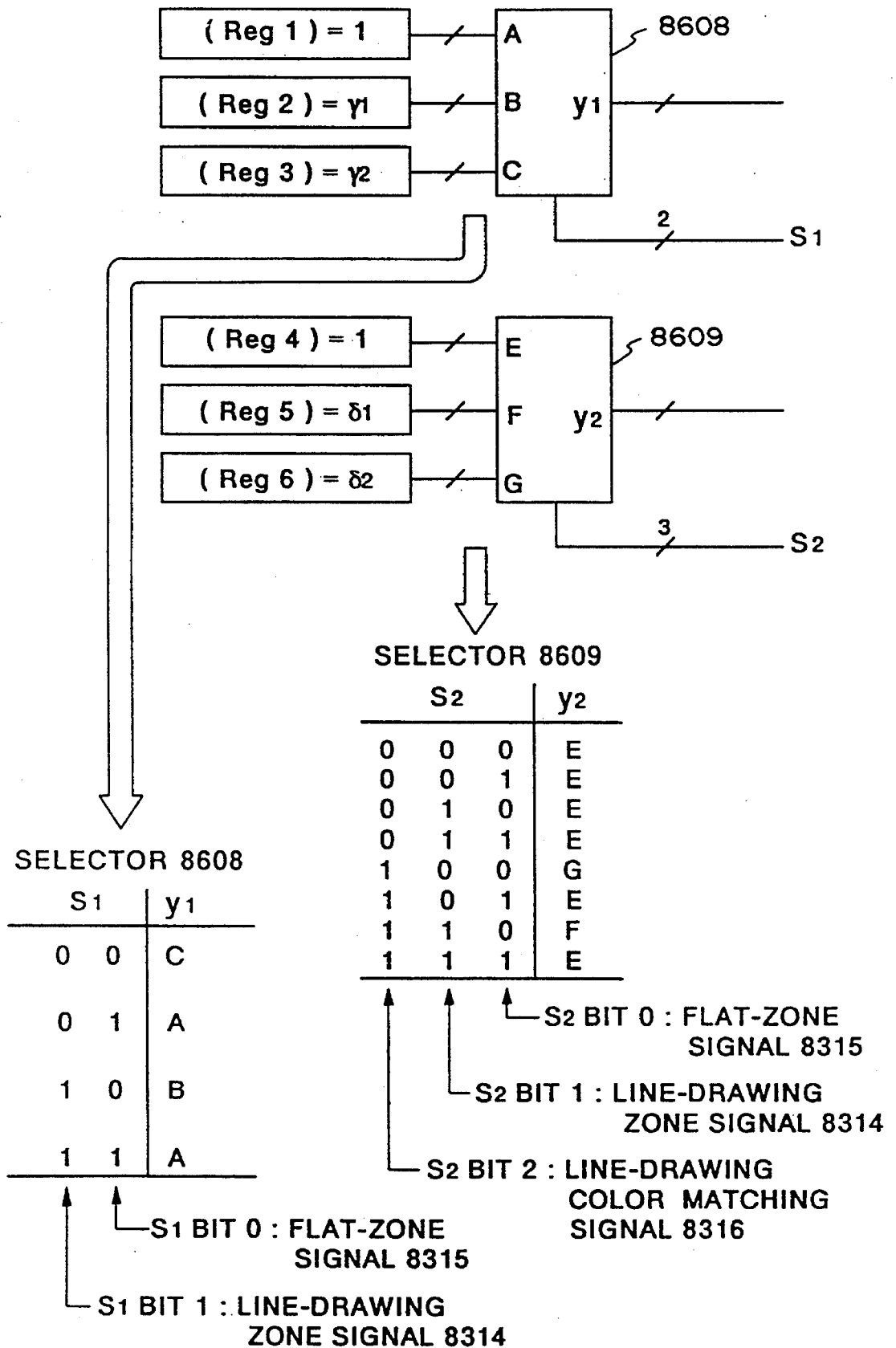
FIG. 48 is a diagram for describing the construction of the portion enclosed by the dashed line in FIG. 47.

FIG. 48 is a diagram for describing the construction of the portion enclosed by the dashed lines in FIG. 47. The operation of each component is substantially the same as in FIG. 34 of the seventh embodiment. The only difference in operation a flat-portion zone signal 8315 is used instead of the texture judgment signal.

By producing a judgment signal from the texture integration signal 8306 and the line-drawing integration signal 8307, a judgment signal can be produced more stably with respect to changes in color as brought about by changes in paper current with the passage of time.

In the seventh and eighth embodiments described above, attention is directed to the counterfeiting of paper currency. However, this does not impose a limitation upon the present invention, for the invention can be applied to all specific originals, such as originals of securities, the duplication of which would have a deleterious effect upon society.

The present invention is useful also in a color-image retrieval apparatus, such as a design-image filing system.

Further, the method of color image separation described above can be replaced by another well-known method.

Ninth Embodiment

In a case where INH 4404 signal in the seventh embodiment is 2 through n, the masking coefficients of the 4×4 masking circuit 4104 are changed automatically in dependence upon the probability that a specific original is present, and the color of the output is changed. The color is changed just enough so that the difference between the specific original and copy image will be clearly apparent, and the image outputted is such that the purpose for which the specific original was to be duplicated is not attained. For example, if the INH 4404 signal is "1", an image that is all one color (R, G or B, etc.) is outputted.

Tenth Embodiment

In a case where INH 4404 signal in the seventh embodiment is 1 and 2 through n, γ is changed automatically in dependence upon the INH 4404 signal in the LOG converter 4102 within the color-signal processor 4402, after which ordinary processing is performed. As a result, an image clearly different from the specific original can be outputted.

11th Embodiment

Figure 49:
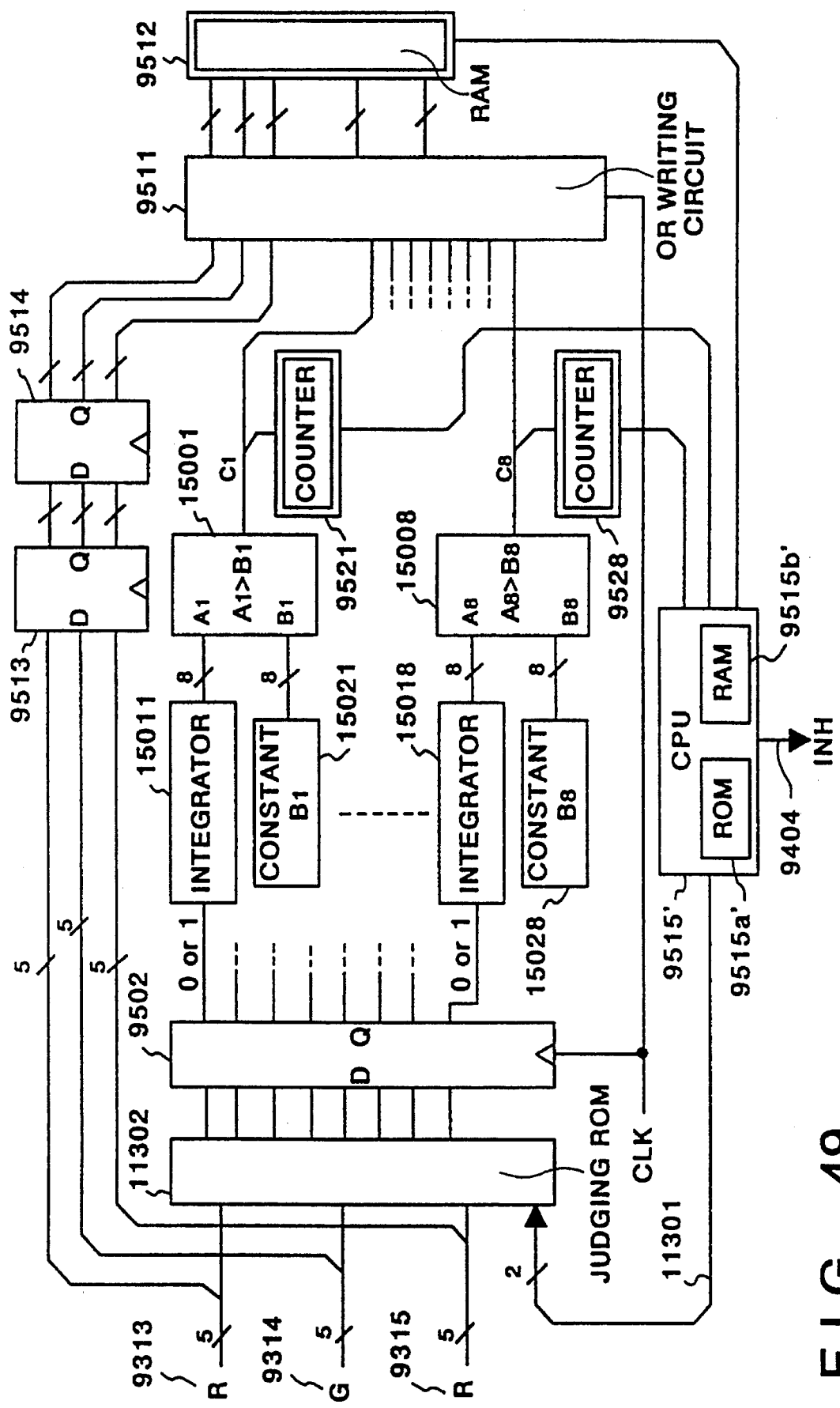
FIG. 49 is a block diagram showing the construction of a signal processor according to an 11th embodiment.

FIG. 49 is a block diagram illustrating the construction of a judging circuit according to an 11th embodiment.

In the seventh embodiment, the number of types of originals capable of being judged as specific originals is limited to the number that can be judged in one reading scan.

On the other hand, in case of the color laser copying machine shown in FIG. 2, an original is subjected to four reading scans for forming images of each of the colors M (magenta), C (cyan), Y (yellow) and B (black).

In this embodiment, a parameter for judging a specific original is changed over every single reading scan, thereby making it possible to discriminate a greater number of specific originals in comparison with the seventh embodiment.

Block diagram of the judging circuit

FIG. 49 is a block diagram showing the construction of the specific-original judging unit 4403 in accordance with the 11th embodiment. In FIG. 49, a frame-sequence signal 11301 is set at 0 when an original is scanned and read for forming M (magenta), and at 1 when the is scanned and read for forming C (cyan), as illustrated in FIG. 51, by way of example. The frame-sequence signal 11301 is connected to an address line of a judging ROM 11302. Accordingly, as a result of the frame-sequence signal 11301 changing over the address of the judging ROM 11302, it is possible to change over the specific-original data of the judging ROM 11302 storing the data for judging the specific original.

The judging ROM 11302, which is constituted by a read-only memory having a data width of eight bits and an address length of 17 bits, stores data corresponding to 32 (4×8) types of specific originals. Accordingly, when one original is copied, a comparison can be made with a total of 32 types of specific originals.

Flowchart of processing according to the 11th embodiment

FIGS. 50A and 50B are flowcharts for describing the flow of processing performed by a CPU 9515 according to the 11th embodiment of the present invention.

A INH 9404 signal is set at 0 at step S1401. A RAM 9512 is cleared at step S1402 to make all data 0. The frame-sequence signal 11301 is set at 0 at step S1403, and image scanning for forming an M (magenta) image is carried out at step S1404. Through processing similar to that of the seventh embodiment described above, it is determined at step S1405 whether image data of a specific original is contained in read image data.

At steps S1406 through 1417, specific-original discrimination processing is executed while sequentially changing over the frame-sequence signal 1301 with regard to C (cyan), Y (yellow) and K (black).

When image data of a specific original is contained in read image data, and this is judged to have occurred, the processing of step S1418 is executed. The INH 9404 signal is set at 1 at step S1418.

In the first embodiment described earlier, the processing for suspending image formation is executed in the printer by setting the INH 9404 signal to 1. In this embodiment, however, when the INH 9404 signal is set to 1, processing for spreading black toner over the entire image is performed in the printer.

By virtue of the processing described above, black toner is spread over the copy of the original before the copy is submitted to a fixing scan, even when an image has been formed upon the completion of the four scans of the original. This makes it possible to prevent copying of a specific original.

12th Embodiment

Figure 52:
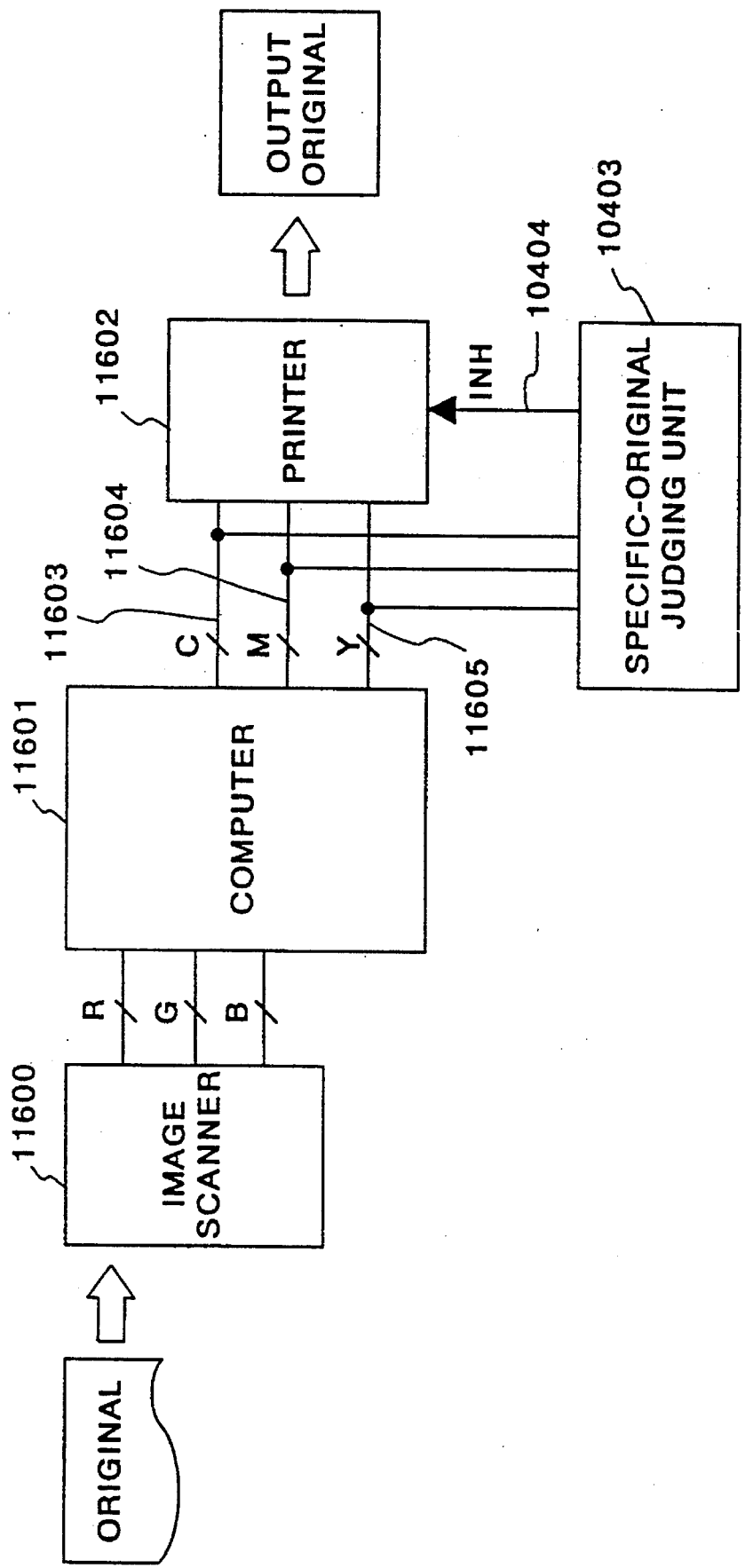
FIG. 52 is a diagram showing, in abbreviated form, the construction of a copying machine according to a 12th embodiment.

FIG. 52 is a block diagram showing the abbreviated construction of a copying machine according to the 12th embodiment. In FIG. 52, numeral 11600 denotes an image scanner and 11601 a computer. Numerals 11603–11605 designate C, M, Y print signals, respectively, 11602 a printer, 10403 a specific-original judging unit 10403, and 10404 an INH signal.

In the seventh and eighth embodiments described above, an example is described in which the judgment of a specific original is carried out using R, G, B signals.

In this embodiment, judgments are made using C (cyan), M (magenta) and Y (yellow) print signals 11603, 11604, 11605, respectively. Though the signals handled by the specific-original judging unit 10403 are the print signals C, M, Y, the judgment operation is no different from that described in the seventh embodiment.

This embodiment is so adapted that when color-signal processing is executed by the computer 11601 and an output delivered to the printer 11602, the method of preventing counterfeiting in a reliable manner is to judge a specific original using the print signals (C 11603, M 11604 and Y 11605).

By creating the data in the aforementioned judging ROM 9501 so as to be in conformity with the C, M, Y signals, it is possible to judge a specific original using the print signals.

In accordance with the 12th embodiment, as described above, means are provided for comparing and collating data indicative of a specific original in a registered color space with image data indicative of an input original. As a result, a specific original placed at any position on the platen can be detected at high speed.

Furthermore, by providing means for comparing and collating data indicative of a plurality of types of specific originals and means for changing over registered specific-original data, a large variety of types of specific originals can be detected at high speed.

13th Embodiment

In a 13th embodiment also, the overall construction of the copying machine is the same as that shown in FIG. 2 described in connection with the first embodiment. In a case where components corresponding to those of FIG. 2 are used in the following description, they will be described upon assigning them reference numerals obtained by reference numerals similar to those of FIG. 2 to the 20000 series.

Signal Processor

Figure 53:
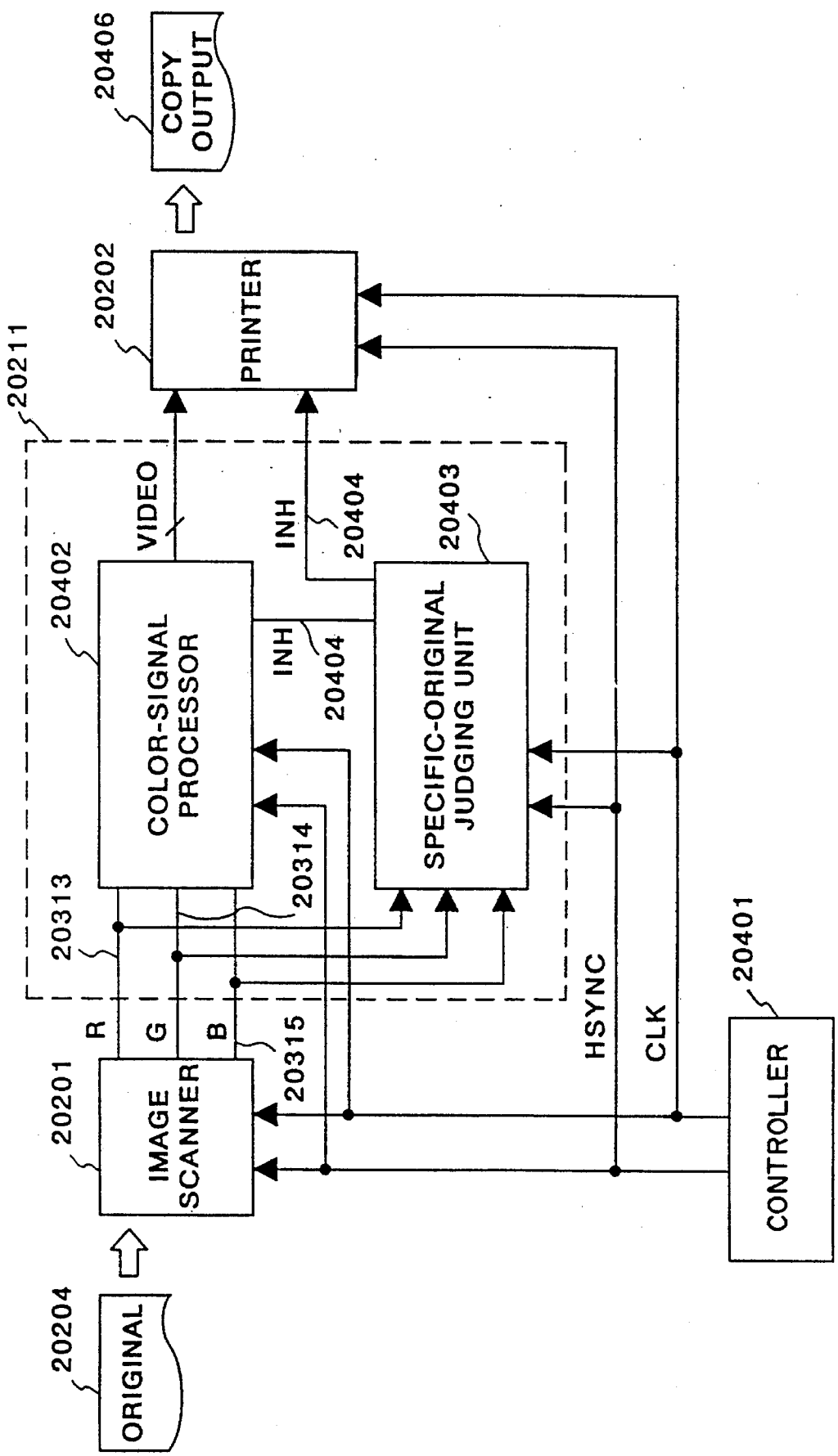
FIG. 53 is a block diagram for describing the construction of a signal processor (image processing unit) according to a 13th embodiment.

FIG. 53 is a block diagram for describing the construction of a signal processor (image processing unit) according to a 13th embodiment of the present invention.

In FIG. 53, CLK represents a clock for transferring pixels, and HSYNC represents a horizontal synchronizing signal for achieving synchronization with the start of main scanning. Numeral 20401 denotes a controller constituted by a CPU for performing control of the overall apparatus, a ROM storing operation programs, a RAM having a working area for the program, and circuitry for generating the CLK (the clock signal for transferring pixels) and the signal HSYNC (the signal signal for achieving synchronization with the start of main scanning). Numeral 20402 designates a color-signal processor for producing a print signal from inputted R, G, B signals and transmitting the print signal to a printer 20202. Numeral 20403 denotes a specific-original judging unit for judging whether a specific original is contained in a read original based upon color signals R, G, B obtained by reading the original via an image scanner 20201. The judging unit 20403 notifies the color-signal processor 22402 of the results of judgment. Numerals 20313, 20314, 20315 denote R, G, B signals, 20204, 20406 an original and copy output, respectively, and 20404 an INH signal.

The operation of the signal processor (13th embodiment) of FIG. 53 differs from that of the signal processor (seventh embodiment) of FIG. 18 in that the specific-original judging unit 20404 sends the INH signal not only to the printer 20202 but also to the color-signal processor 20402. Accordingly, the internal construction and operation of the specific-original judging unit 20403 are the same as those of the seventh embodiment and need not be described again.

FIG. 55 is a block diagram illustrating the construction of the color-signal processor 20402 according to the 13th embodiment. In FIG. 55, numeral 20101 denotes an input masking circuit, to which the color signals R, G, B are inputted from the image sensor 20210, for subjecting these input signals to an optical correction (masking) at the time of reading. Numeral 20102 designates a LOG converter for converting luminance signals R, G, B, which are the masked color signals, into corresponding density signals C, M, Y. Shown at numeral 20103 is a black-extracting circuit for extracting the black component from the density signals C (cyan), M (magenta) and Y (yellow) and producing density signals $C_1, M_1, Y_1, K_1$ (black). Numeral 20104 designates a 4×4 masking circuit for applying a color correction to the density signals $C_1, M_1, Y_1, K_1$ and outputting density signals $C_2, M_2, Y_2, K_2$. Numeral 20105 represents a UCR circuit for performing under-color rejection in accordance with the density signal $K_1$ prevailing prior to color correction and the inputted density signals $C_2, M_2, Y_2, K_2$. Numeral 20106 designates a smoothing circuit for applying smoothing processing to the density signals $C_2, M_2, Y_2, K_2$, which have been subjected to under-color rejection, by the INH 20404 signal.

In accordance with the arrangement described above, the R, G, B input signals applied to the image scanner 20201 are subjected to masking by the input masking circuit 20201, after which the masked signals are converted into the density signals Y, M, C by the LOG converter 20102. These density signals Y, M, C are subjected to black extraction by the black-extracting circuit 20103, and a color correction is applied by the 4×4 masking circuit 20104. At this time, the $K_1$ signal is sent to the UCR circuit 20105 separately of the signals sent to the 4×4 masking circuit 20104. The under-color rejecting operation of the UCR circuit 20105 is carried out by the Y, M, C, K signals and the $K_1$ signal. Thereafter, the output C, M, Y, K signals are sent to the printer 20202.

Figure 54:
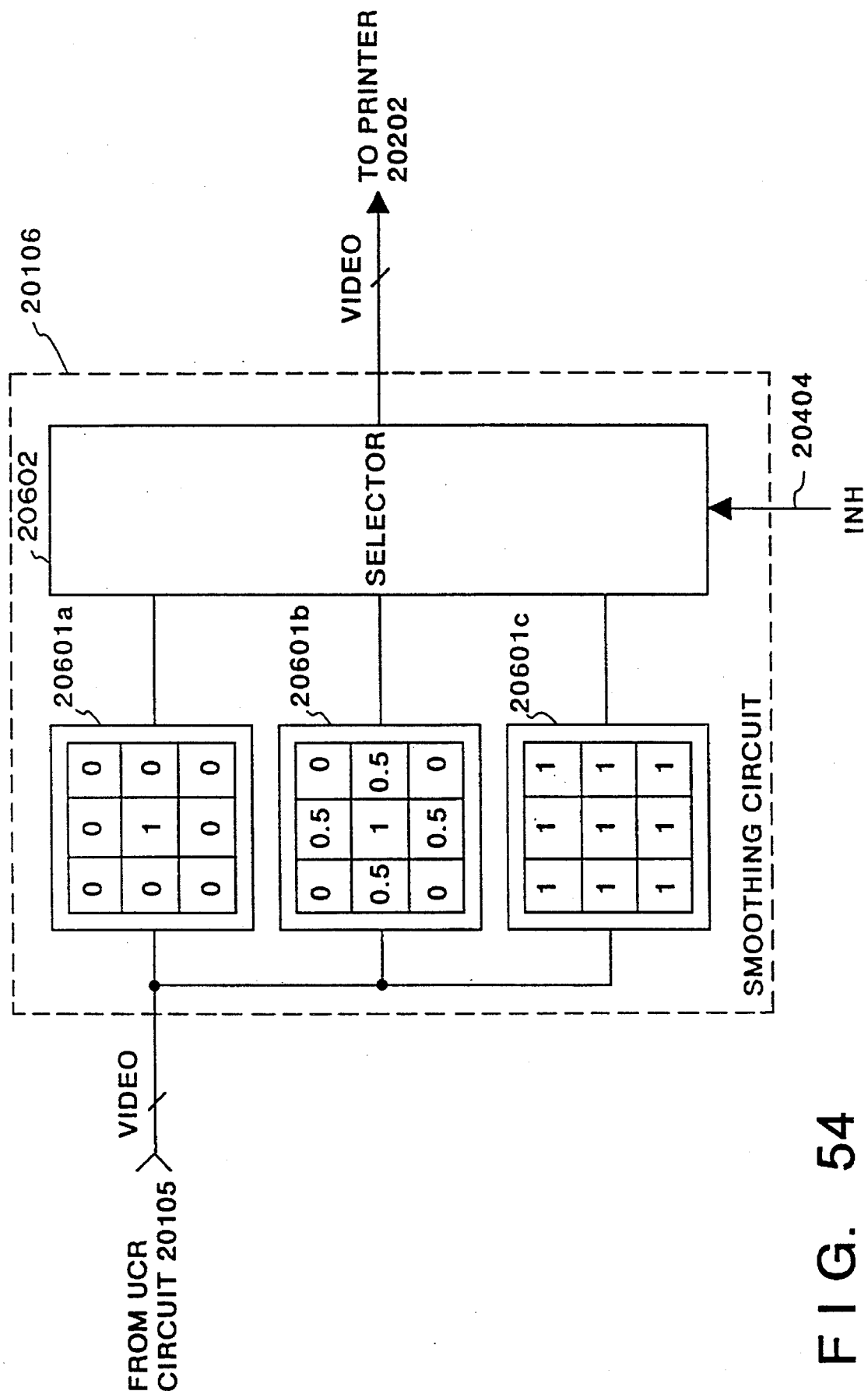
FIG. 54 is a block diagram for describing the construction of a smoothing circuit according to a 15th embodiment.

FIG. 54 is a block diagram illustrating the construction of the smoothing circuit according to the 13th embodiment. In FIG. 54, numerals 20601a–20601c denote smoothing filters, and numeral 20602 designates a selector.

A frame-sequence video signal received from the UCR circuit 20105 is smoothed by the plurality of smoothing filters 20601, and the smoothed signals are sent to the selector 20602. In accordance with the judgment signal INH 20404 from the specific-original judging unit 20403, the selector 20602 selects whichever of the plurality of smoothed signals conforms to the INH 20404 signal and delivers the selected signal to the printer 20202. In response, the printer 20202 performs an ordinary copying operation and outputs a blurred image.

Thus, as set forth above, processing can be changed based upon the results of judging, namely the degree of a judgment by n type of INH. This makes it possible to provide an effect in which an erroneous judgment is eliminated in a case where a suspicious original is inputted as an original image.

It should be noted that smoothing is not limited to the above-mentioned three stages but may be changed over a number of stages. In addition, matrix size may be changed and not only the coefficients.

14th Embodiment

In the embodiment of FIG. 13, the INH 20404 signal is made "0" if a specific original is present and "1" in the absence of a specific original. However, this does not impose a limitation upon the invention. If a case in which a specific original is present is excluded, namely if there is the possibility that an original contains a specific original, n (2 through n) types of INH signals are generated in accordance with the degree of similarity, and these signals are sent to the color-signal processor. The higher the possibility that an original contains a specific original, the more the outputted image can be blurred, in conformity with the INH signal.

15th Embodiment

The 15th embodiment deals with a concrete example of the 14th embodiment, namely an example in which the INH signal is 1 and 2 through n (2≦n).

Figure 56:
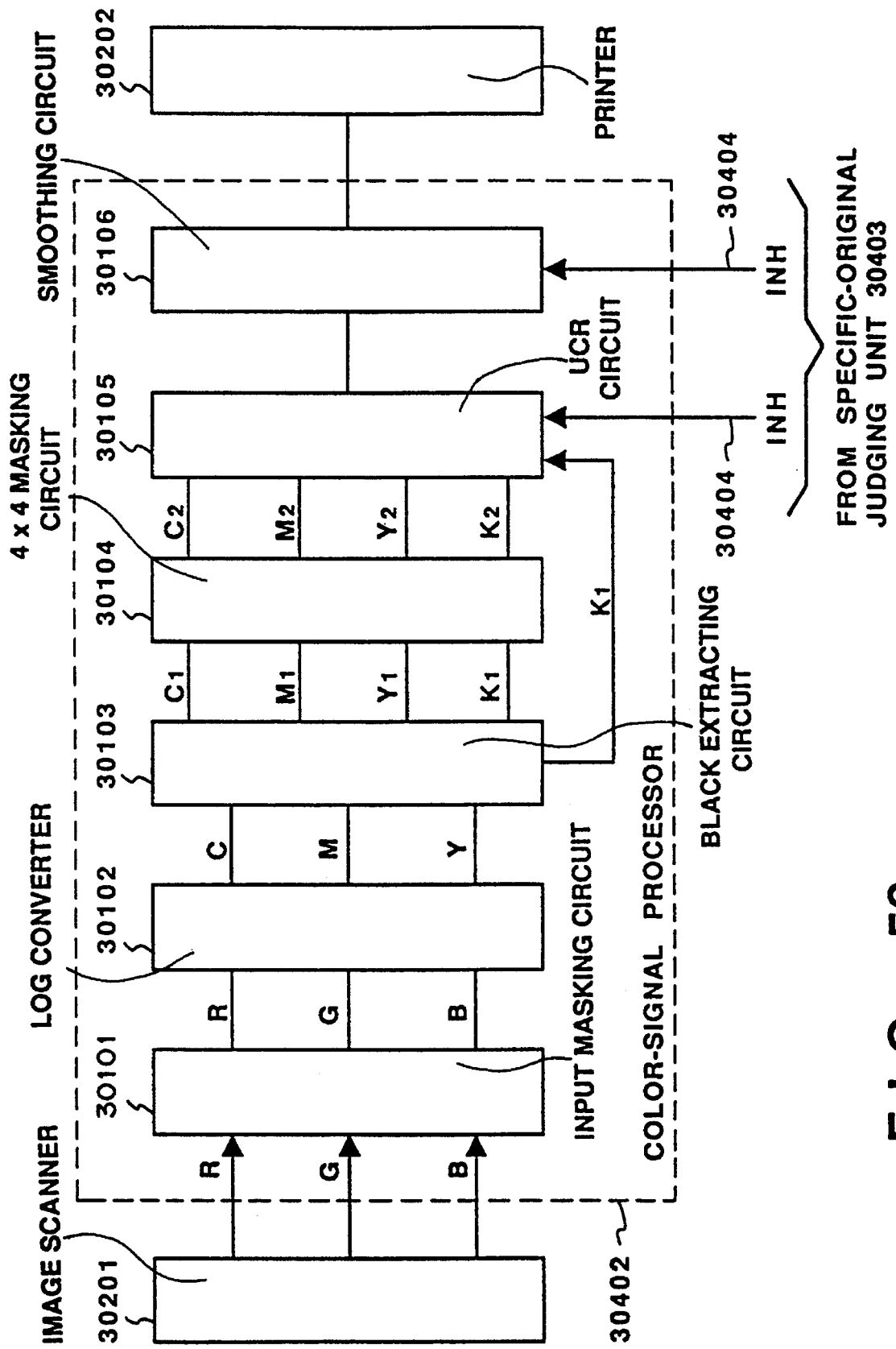
FIG. 56 is a block diagram illustrating the construction of a signal processor according to a 16th embodiment.

FIG. 56 is a block diagram showing the construction of a signal processor according to the 15th embodiment. In FIG. 56, circuits corresponding to those shown in FIG. 55 of the 13th embodiment will be described with reference numerals in to the 30000 series.

This embodiment differs from the 13th embodiment in that the INH 30404 signal is outputted also to the UCR circuit 30105, as shown in FIG. 56, as opposed to the arrangement of FIG. 55. In this embodiment, the rejection quantity of the UCR circuit 30105 is changed based upon the INH 30404 signal from the specific-original judging unit 30403, depending upon the possibility that a specific original is present. If a specific original obviously is present, control is performed in such a manner that a totally black image is outputted.

16th Embodiment

The 16th embodiment also deals with a concrete example of the 14th embodiment, namely an example in which the INH signal is 2 through n (2<n).

Figure 57:
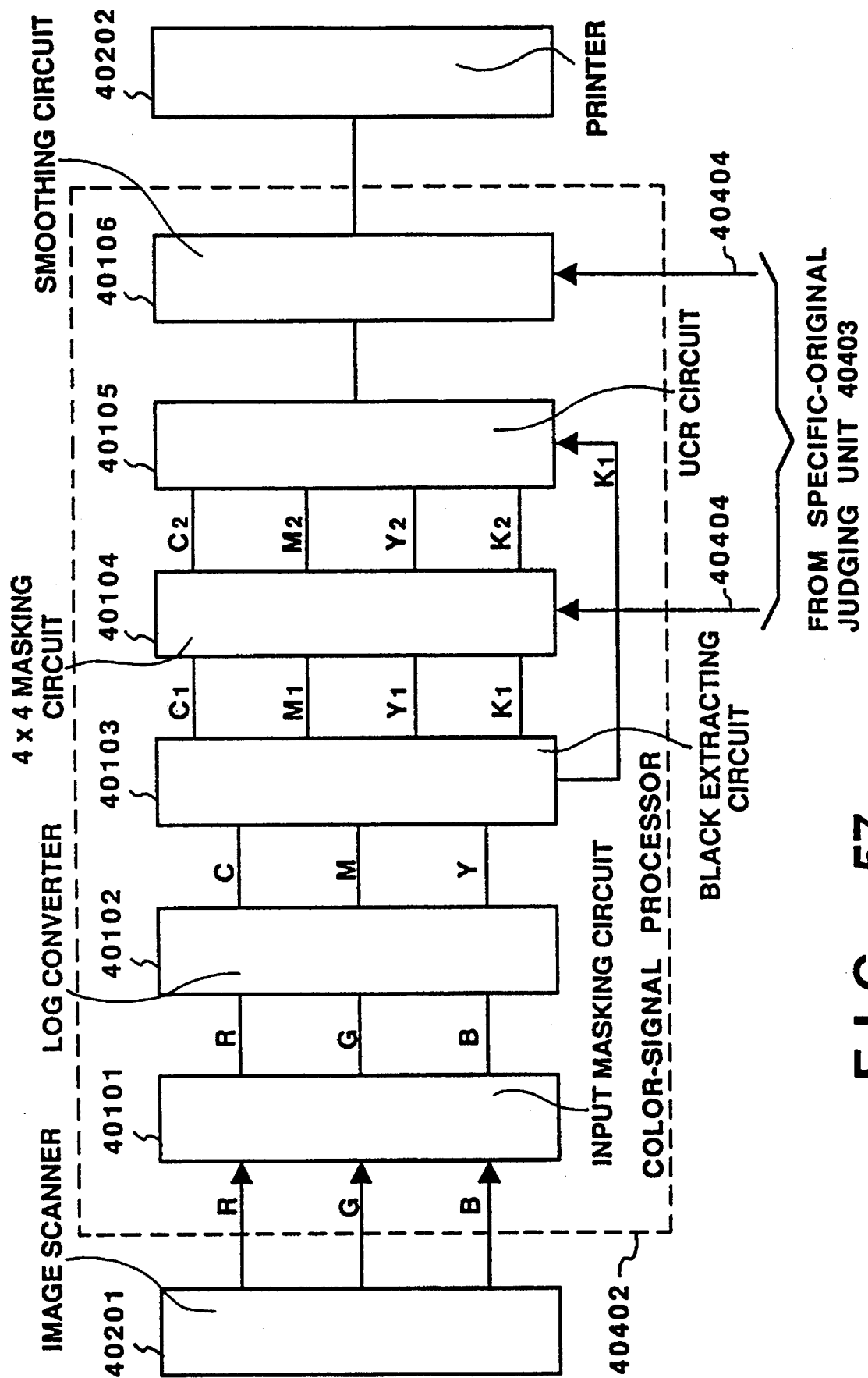
FIG. 57 is a block diagram illustrating the construction of a signal processor according to a 17th embodiment.

FIG. 57 is a block diagram showing the construction of a signal processor according to the 16th embodiment. In FIG. 57, circuits corresponding to those shown in FIG. 55 of the 13th embodiment will be described upon raising there reference numerals to the 50000 series.

This embodiment differs from the 13th embodiment in that the INH 40404 signal is outputted also to the 4×4 masking circuit 40104, as shown in FIG. 57, as opposed to the arrangement of FIG. 55. In this embodiment, depending upon the possibility that a specific original is present, the masking coefficients of the 4×4 masking circuit 40104 are changed automatically, in conformity with the probability that a specific original is present, and control is performed in such a manner that the color of the output is changed. The color is changed just enough so that the difference between the specific original and copy image will be clearly apparent, and the image outputted is such that the purpose for which the specific original was to be duplicated is not attained. For example, if the INH 40404 signal is "1", an image that is all one color (R or G or B, etc.) is outputted.

17th Embodiment

The 17th embodiment deals with a concrete example of the 14th embodiment, namely an example in which the INH signal is 1 and 2 through n (2≦n).

FIG. 58 is a block diagram showing the construction of a signal processor according to the 17th embodiment. In FIG. 58, circuits corresponding to those shown in FIG. 55 of the 13th embodiment will be described by reference numerals in the 50000 series.

This embodiment differs from the 13th embodiment in that the INH signal is outputted also to the LOG converter 50502, as shown in FIG. 58, as opposed to the arrangement of FIG. 55. In this embodiment, $\gamma$ is changed automatically in dependence upon the INH 50404 signal in the LOG converter 50102 within the color-signal processor 50402, after which ordinary processing is performed. As a result, an image clearly different from the specific original can be outputted.

18th Embodiment

Figure 62:
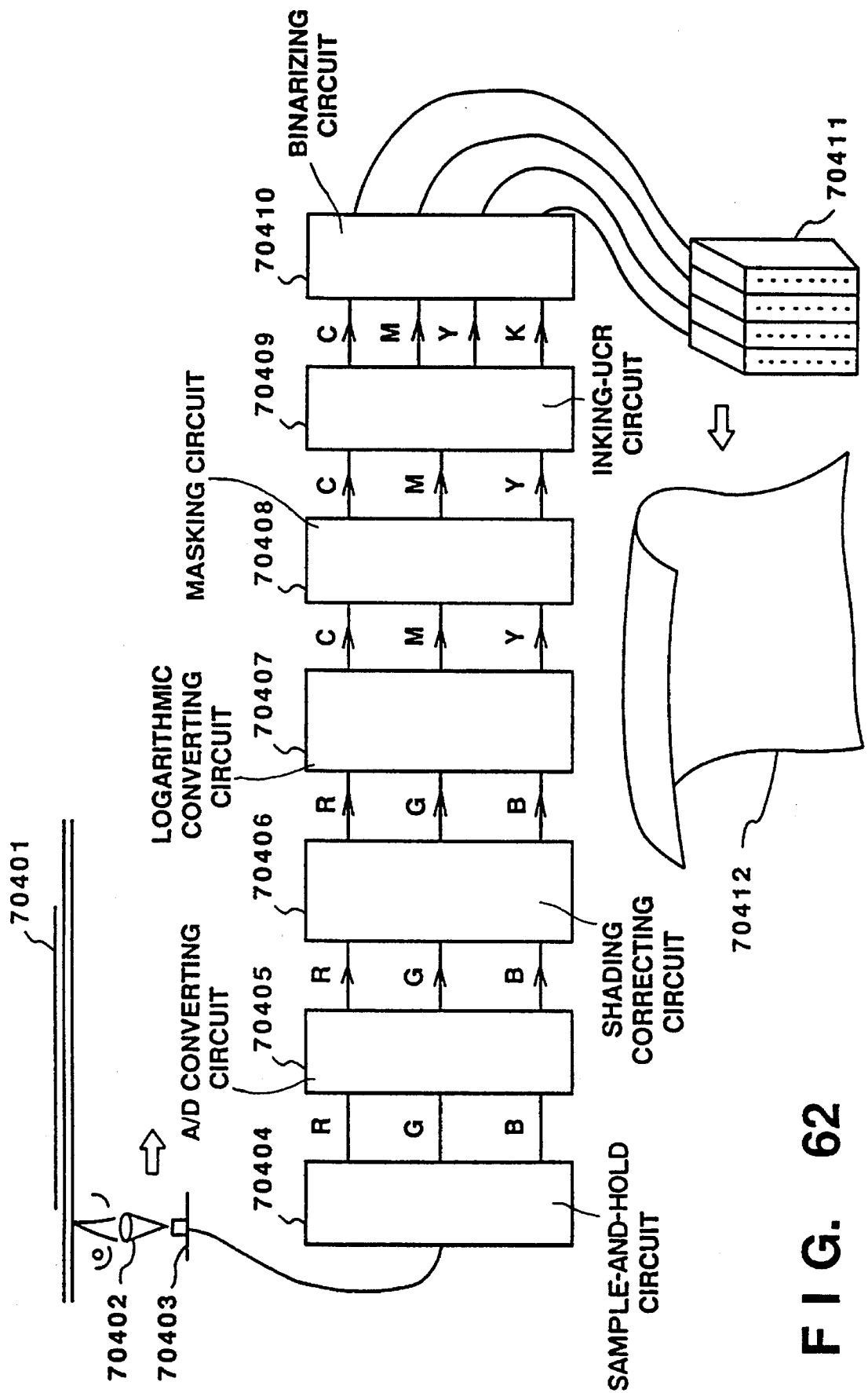
FIG. 62 is a diagram illustrating an example of the construction of a general color-original copying apparatus.

FIG. 62 is a diagram illustrating an example of the construction of a general color-original copying apparatus.

A color original 70401 placed upon a platen is imaged on a line sensor 70403 by an imaging lens 70402. The line sensor 70403 is coated with three color filters for R, G, B, and a color-separation signal indicative of an original is outputted every pixel. The output of the line sensor 70403 is converted into a digital signal by a sample-and-hold circuit 70404 and an A/D converting circuit 70405. Irregularities in the sensitivity and illumination of the line sensor are eliminated by a shading correcting circuit 70406.

Numeral 70407 denotes a logarithmic converting circuit for converting the R, G, B signals into corrective C (cyan), M (magenta), Y (yellow) signals. A masking circuit 70408 is a matrix arithmetic circuit for correcting unnecessary coloring matter that is printed out. Numeral 70409 designates an inking and UCR (under-color rejecting) circuit which replaces the minimum values of Y, M, C by K (black) signals.

The Y, M, C, K signals obtained from the foregoing circuity are binarized by a binarizing circuit 70410 and then outputted to a driver circuit for driving printing heads 70411 for each color. The dither method or error diffusing method can be used as the binarizing processing, and the printing heads may be of the ink-jet or thermosensitive-transfer type. The printing heads 70411 are made to scan a transfer paper 70412 in the direction of the arrow to print and record an output image.

In a copying apparatus of the kind described above, it is desired that a copied image to be printed out be as faithful to the original image as possible. The above-described processing system is optimized for this purpose. However, in a case where bank notes, gift certificates or securities are used as the originals, the ability to reproduce these faithfully can lead to the crime of counterfeiting, and therefore such a capability is not desired.

Accordingly, an image processing apparatus will be described in which output for a case where a specific original such as a gift certificate or security is duplicated is capable of being controlled to a degree that will not allow the counterfeiting of such an original.

Figure 59A:
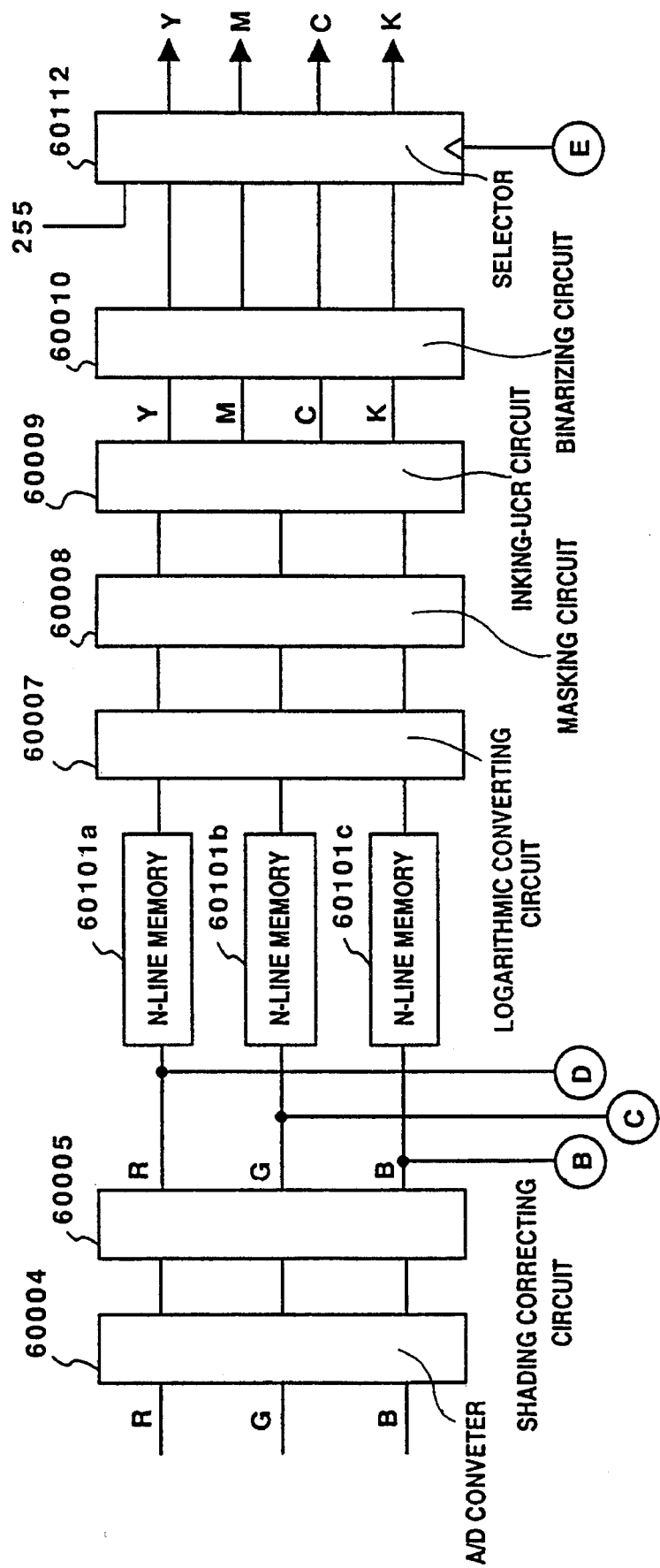
FIGS. 59A and 59B are block diagrams illustrating the construction of an image processing apparatus according to an 18th embodiment.
Figure 59B:
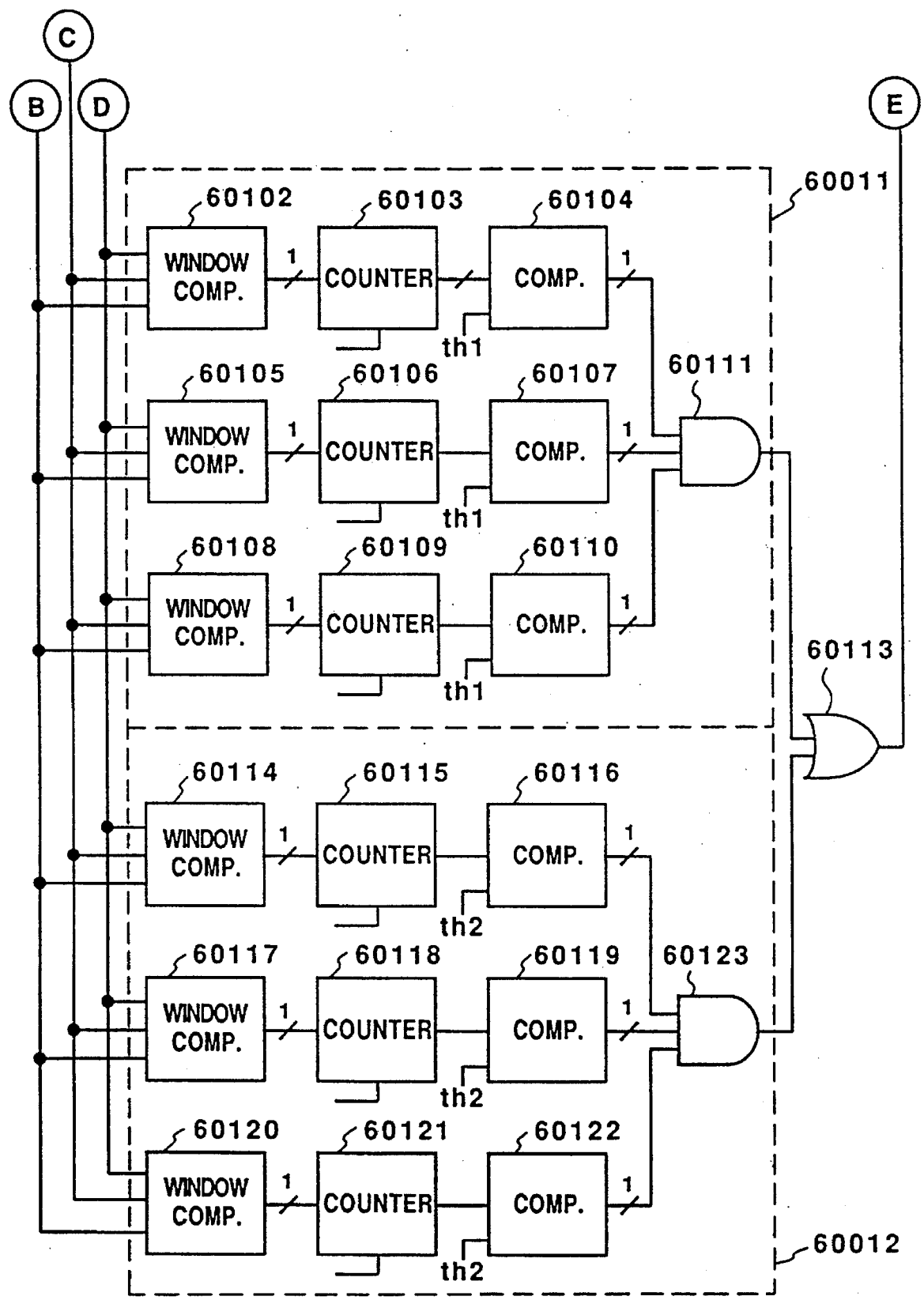

FIGS. 59A and 59B are block diagrams illustrating the construction of an image processing apparatus according to an 18th embodiment of the present invention. Numeral 60004 denotes an A/D converter for converting R, G, B analog signals sent from a CCD (not shown) into digital signals, and numeral 60005 represents a shading correcting circuit for applying a shading correction to the digital signals outputted by the A/D converter 60004. Shown at numerals 60101a, 60101b, 60101c are N-line memories for delaying, by N lines, each of the R, G, B signals that have been corrected for shading. The R, G, B signals outputted by the shading correcting circuit 60105 are accumulated in the N-line memories 60101a, 60101b, 60101c in order to achieve synchronization with the judgment processing of an M×N pixel block, described below. Numeral 60007 designates a logarithmic converter for converting the R, G, B signals, namely luminance signals, into density signals. A masking circuit 60008 masks the density signals from the logarithmic converter 60007, an inking-UCR circuit 60009 subjects the masked density signals to inking and under-color rejection, and a binarizing circuit 60010 binarizes the density signals that have been subjected to inking and under-color rejection. Numerals 60011, 60012 denote judging circuits corresponding to specific originals (first and second specific originals) which undergo different types of judgment.

Accordingly, a set of k-number (where is equal to or greater than 2) of each of R, G, B values is stored in advance in window comparators provided for determining whether the R, G, B values of an input image fall within a predetermined range with respect to the k-number of values, and counting means are provided for counting the results of the determinations (within an M× N pixel block). The signal processing circuit is changed over between one state in a case where the counts from the counting means exceed a certain threshold value with regard to all k-number of values, and another state in a case where the counts do not exceed the threshold value.

Figure 61A:
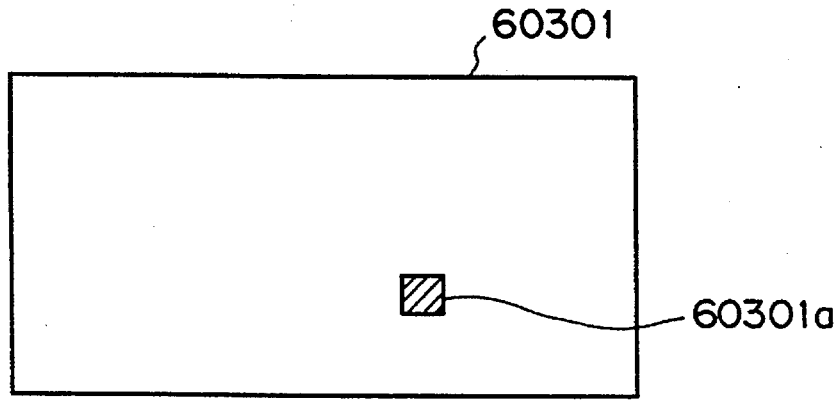
FIGS. 61A and 61B are diagrams for describing a method of judging an actual specific original according to the 18th embodiment.
Figure 61B:
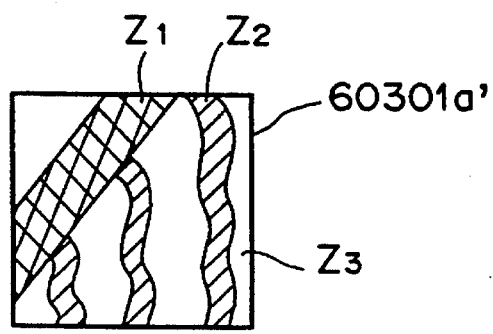

In the 18th embodiment described below, focus is directed toward the printing of securities or the like with a special coloring material. For example, when a portion of a security in FIG. 61A is enlarged, as illustrated in FIG. 61B, an area exists in which the red color of a seal impression, the white color of the ground coat and the light-green color-of the ground-coat pattern are mixed.

The judging circuit 60011 in FIG. 59B includes window comparators 60102, 60105, 60108 for comparing the R, G, B signals outputted by the shading correcting circuit 60005 with the k-number of each of the R, G, B values that have already been stored. Here k=3 holds, and therefore three window comparators are provided. Numerals 60103, 60106, 60109 denote resettable counters for counting the signals from the corresponding window comparators, numerals 60104, 60107, 60110 designate comparators for comparing the values from the corresponding counters and a predetermined threshold value $th_1$. An AND circuit 60111 takes the AND of the outputs from the comparators 60104, 60107, 60110.

Similarly, the judging circuit 60012 includes window comparators 60114, 60117, 60120, counters 60115, 60118, 60121, and comparators using a threshold value $th_2$ (different from $th_1$). An AND circuit 60123 takes the AND of the outputs from the comparators 60116, 60119, 60122.

Numeral 60113 denotes an OR circuit for taking the OR of the AND circuits 60111 and 60123, and 60112 denotes a selector for selecting either an output from the binarizing circuit 60010 or a fixed signal level (255 in this embodiment) in accordance with the output ("1" or "0") from the OR circuit 60113. In order to obtain an output in accordance with the results of the judgment made by judging circuit 60011 or 60012, control is executed in such a manner that the selector 60112 is made to select "255" in case of a specific original and the binarized data of the read original in case of an ordinary original.

The comparison operation performed by the window comparators is as follows, by way of example. Assume that the three values of each of the R, G, B signals registered in the judging circuit 60011 are $(R_1, G_1, B_1)$, $(R_2, G_2, B_2)$ and $(R_3, G_3, B_3)$. Then, by using a certain window width $-d_1$ with respect to the inputted R, G, signals, the window comparator 60102 outputs "1" when the following condition holds: $(R_1-d_1)\leq R\leq(R_1+d_1)$, $(G_1-d_1)\leq G\leq(G_1+d_1)$, $(B_1-d_1)\leq B\leq(B_1+d_1)$. The window comparator 60102 outputs "0" at all other times.

The window comparator 60105 outputs "1" when the following condition holds: $(R_2-d_1)\leq B\leq(R_2+d_1)$, $(G_2-d_1)\leq G\leq(G_2+d_1)$, $(B_2-d_1)\leq B\leq(B_2+d_1)$. The window comparator 60105 outputs "0" at all other times.

The window comparator 60108 outputs "1" when the following condition holds: $(R_3-d_1)\leq R\leq(R_3+d_1)$, $(G_3-d_1)\leq G\leq(G_3+d_1)$, $(B_3-d_1)\leq B\leq(B_3+d_1)$. The window comparator 60108 outputs "0" at all other times.

In other words, whether the R, G, B values of the input image fall within a range of $(\pm d_1)$ with respect to the three predetermined values of each of R, G, B is judged independently for each of the three R, G, B values, and "0" or "1" is outputted.

Likewise, the window comparators 60114, 60117, 60120 perform a comparison operation similar to the foregoing with regard to the values of each of R, G, B registered in advance as the colors of the second specific original.

The counters 60103, 60106, 60109 aggregate the outputs of the aforementioned window comparators in an M× N pixel block. These counters are reset at completion of all pixels in the block. For example, if M=N=5 holds, the outputs of the window comparators will be as shown in FIG. 60.

Figure 60:
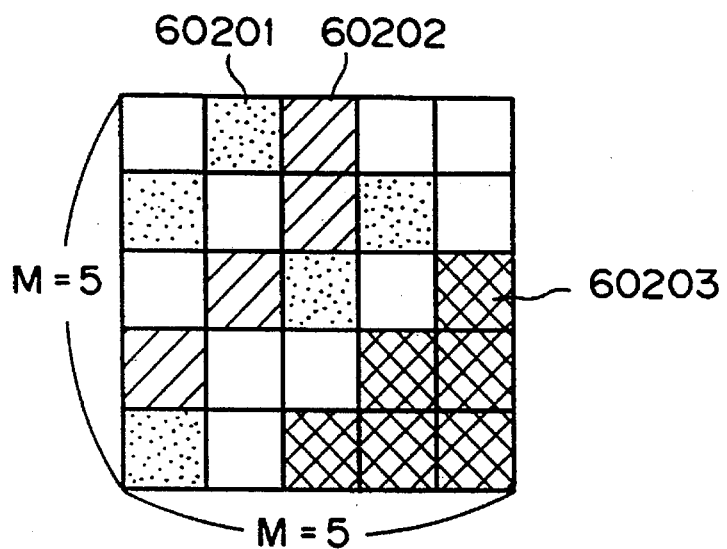
FIG. 60 is a diagram for describing a judging method according to the 18th embodiment.

FIG. 60 is a diagram for describing a judging method according to the 18th embodiment. In FIG. 60, numeral 60201 (a pixel indicated by a plurality of points) denotes a pixel (located at a total of five locations) at a position at which "1" is outputted by the window comparator 60102, numeral 60202 (a pixel indicated by slanted lines) denotes a pixel (located at a total of five locations) at a position at which "1" is outputted by the window comparator 60105, and numeral 60203 (a pixel indicated by intersecting lines) denotes a pixel (located at a total of five locations) at a position at which "1" is outputted by the window comparator 60108. In this cases, the counter outputs will be "5" from counter 60103, "4" from counter 60106 and "6" from counter 60109.

The comparators 60104, 60107, 60110 compare the corresponding counter outputs with the predetermined threshold value $th_1$ and output "1" if the corresponding counter output is greater than the threshold value $th_1$ and "0" if it is less. For example, if $th_1$=3 holds, then all of the comparators 60104, 60107, 60110 will output "1". The AND circuit 60111 takes the AND of these counter outputs and outputs "1" only when all of the inputs thereto are "1"; "0" is outputted at all other times.

The counters 60115, 60118, 60121, comparators 60116, 60119, 60122 and AND circuit 60123 of the judging circuit

60012 operate in the same manner as their counterparts in the judging circuit 60011. Here, however, the threshold value $th_2$ inputted to the comparators is set to a value different from $th_1$. For example, if $th_2 > th_1$ holds, the judgment regarding the second specific original will be such that the probability of obtaining a "1" output from the AND circuit 60123 will be lower than in the case of the first specific original.

By virtue of the foregoing operation, the AND circuit 60111 will output "1" only when the number of colors in a predetermined range is greater than a predetermined number (the number of $th_1$) with respect to all three of the colors predetermined for the first specific original within a block of interest. A similar signal is outputted by the AND circuit 60123 with regard to the second specific original.

The OR circuit 60113 takes the OR of the outputs from the AND circuits 60111 and 60123 and outputs "1" when at least one of the AND circuits 60111, 60123 delivers "1". The selector 60112 changes over its output signals depending upon the output from the OR circuit 60113. The selector 60112 delivers the Y, M, C, K image signals intact when the output of the OR circuit 60113 is "0". When the output of the OR circuit 60113 is "1", the selector 60112 changes over all of the Y, M, C, K signals to a fixed signal level (=255). More specifically, for a block in which either of the AND gates 60111, 60123 outputs "1", image signals are not delivered and an image of a solid color is outputted.

FIGS. 61A and 61B are diagrams for describing a method of judging an actual specific original according to the 18th embodiment.

For example, it will be assumed that FIG. 61A is the first specific original. If the three types of R, G, B values of a red ($Z_1$), light-green ($Z_2$) and white ($Z_3$) portions in FIG. 61B are read in advance and set as the threshold values of the window comparators 60102, 60105, 60108, the normal output of an image will be prevented for a block which includes all three of these values. Instead, the image outputted will be totally black. Operation would be similar for the second specific original.

In the foregoing, the threshold values $th_1$, $th_2$ for the two specific originals are each made different. Therefore, if $th_1 < th_2$ is adopted, a judgment to the effect that the first specific original exists becomes easier to make while such a judgment with regard to the second specific original becomes more difficult to make. In other words, by changing the value of th in conformity with the importance of a specific original, the probability of making the judgment can be controlled.

Thus, as described above, when it is judged whether an original image contains a specific original, a parameter setting is changed in conformity with the importance of the specific original, thereby making it possible to raise the probability of making a judgment with respect to an important specific original.

Furthermore, inconveniences caused by erroneous judgment can be prevented by arranging it so that the probability of making a judgment is not raised with respect to a specific original having a low level of importance.

In the 18th embodiment described above, $th_1$ and $th_2$ have different values. However, if the window widths d of the window comparators 60102, 60105, 60108 and 60114, 60117, 60120 which extract 0only specific hues from the R, G, B values of the input original are made different values, the probability that "1" will be outputted from these window comparators is raised or lowered, and therefore the same effects can be obtained.

More specifically, if the value of window width d of the window comparators 60102, 60105, 60108 is made $d_1$, the the value of window width d of the window comparators 60114, 60117, 60120 is made $d_2$ and $d_1 > d_2$ holds, for example, the probability that "1" will be outputted by the window comparators is raised with regard to the first specific original and, in effect, it becomes easier to make the judgment that a specific original exists.

In the above-described embodiment, comparison operations by the window comparators are carried out with regard to each of the R, G and B signals. However, it is permissible to adopt an arrangement in which $C_1 = R-G$, $C_2 = G-B$ are first obtained from R, G, B and a comparison operation is then applied to $C_1$ and $C_2$. In this case, it becomes possible to make a judgment based solely upon hue if an original is in a soiled condition. Thus, the accuracy of judgment is raised.

Instead of using the window comparators 60102, 60105, 60108, look-up tables for outputting "0" or "1" with respect to R, G, B inputs can be employed.

Further, the location from which the output of the AND circuit 60111 is fed back is not limited to that shown in FIGS. 59A and 59B. The matrix coefficients can be altered by providing feedback from the masking circuit, or the binarizing system may be changed over by providing feedback to the binarizing circuit.

It should be noted that the present invention may be applied to a system composed of a plurality of devices or to an apparatus comprising one device. It goes without saying that the present invention can be applied also to a case where the above-mentioned effects is attained by supplying a program to a system or apparatus.

Scanner may be applied not only to a type of RGB parallel output but also to a type of RGB dot-sequential output.

SV or VTR may be applied to a type of S terminal output or composite output.

Color component can be made not only to RGB, YMCBk or L*a*b* but also YIQ, Yuv, YCrCb, L*u*v* or the like. Input can be made not only to frame-sequential, dot-sequential, parallel but also to line-sequential or block-sequential.

As many apparently widely different embodiments of the present invention can be made without departing from the spirit and scope thereof, it is to be understood that the invention is not limited to the specific embodiments thereof except as defined in the appended claims.

Specially, combination of the specific embodiments can be made without departing from the spirit and scope thereof.

What is claimed is:

1. An apparatus for controlling an image processing unit based on a content of an image, and supplying a control signal indicating whether a faithful output of the image should be prevented, comprising:

input means for inputting image data representing the image;

first discriminating means for discriminating whether the image represented by the input image data is a first predetermined image having a first color pattern, the first color pattern having a predetermined color located in a coordinate color space;

second discriminating means for discriminating whether the image represented by the input image data is a second predetermined image having a second color pattern, the second color pattern having a predetermined color located in the color coordinate space and different from the first color pattern; and output means for combining discrimination results of said first discriminating means and said second discriminating means, and outputting the control signal so as to prevent the image processing unit from outputting a faithful output of the image;

wherein said first discriminating means and said second discriminating means perform respective discriminations in parallel.

2. An apparatus according to claim 1, wherein said input means comprises an image reader for scanning an original and generating image data.

3. An apparatus according to claim 1, wherein said first and second discriminating means discriminate in accordance with color distribution of the image data input by said input means.

4. An apparatus according to claim 3, wherein said first or second discriminating means respectively includes memory means for storing color distribution of the first or second predetermined image.

5. An image processing method of controlling an image processing unit based on a content of an image, and supplying a control signal indicating whether a faithful output of the image should be prevented, comprising:

an input step of inputting image data representing the image;

a first discriminating step of discriminating whether the image represented by the input image data is a first predetermined image having a first color pattern, the first color pattern having a predetermined color located in a color coordinate space;

a second discriminating step of discriminating whether the image represented by the input image data is a second predetermined image having a second color pattern, the second color pattern having a predetermined color located in the color coordinate space and different from the first color pattern; and an output step of combining discrimination results in said first discriminating step and said second discriminating step, and outputting the control signal so as to prevent the image processing unit from outputting a faithful output of the image;

wherein said first discriminating step and said second discriminating step are performed in parallel.

* * * * *

UNITED STATES PATENT AND TRADEMARK OFFICE
CERTIFICATE OF CORRECTION

PATENT NO. : 5,463,469

DATED : October 31, 1995

INVENTORS : Funada et al.

It is certified that error appears in the above-identified patent and that said Letters Patent is hereby corrected as shown below:

COLUMN 4

Line 35, "FIG. 23 is a diagram" should read --FIGs. 23A and 23B are diagrams--; and
Line 39, "FIG. 25 shows" should read --FIGs. 25A and 25B show--.

COLUMN 5

Line 43, "FIG. 50 is a flowchart" should read --FIGs. 50A and 50B are flowcharts--.

COLUMN 10

Line 50, "is" should read --it--.

COLUMN 12

Line 14, "signal v" should read --signal V--.

COLUMN 14

Line 12, "signal" (second occurrence) should be deleted; and
Line 48, "4307 4309" should read --4307-4309--.

COLUMN 15

Line 61, "$y_i x\beta$" should read --$y_{i-1} x\beta$--.

UNITED STATES PATENT AND TRADEMARK OFFICE
CERTIFICATE OF CORRECTION

PATENT NO. : 5,463,469

DATED : October 31, 1995

INVENTORS : Funada et al.

It is certified that error appears in the above-identified patent and that said Letters Patent is hereby corrected as shown below:

COLUMN 18

Line 59, "4601a4601c," should read --4601a-4601c,--.

COLUMN 24

Line 18, "the" should read --it--.

COLUMN 25

Line 48, "FIG. 2 to" should read --FIG.2 but in--; and
Line 63, "signal" (second occurrence) should be deleted.

COLUMN 27

Line 48, "(2<n)." should read --(2$\leq$n)--; and
Line 52, "there" should read --the--.

UNITED STATES PATENT AND TRADEMARK OFFICE
CERTIFICATE OF CORRECTION

PATENT NO. : 5,463,469

DATED : October 31, 1995

INVENTORS : Funada et al.

It is certified that error appears in the above-identified patent and that said Letters Patent is hereby corrected as shown below:

COLUMN 29

Line 27, "(where" should read --(which--.

COLUMN 30

Line 13, "G," should read --G, B--; and
Line 19, "$(R_2-d_1) \leq B \leq (R_2+d_1),$" should read --$(R_2-d_1) \leq R \leq (R_2+d_1),$--.

Signed and Sealed this

Thirtieth Day of July, 1996

Attest:

BRUCE LEHMAN

*Attesting Officer*       *Commissioner of Patents and Trademarks*